US012786737B2

(12) United States Patent
Ma et al.

(10) Patent No.: US 12,786,737 B2
(45) Date of Patent: Nov. 3, 2026

(54) METHOD AND APPARATUS FOR PERFORMING CENTRAL COORDINATION FUNCTION

(71) Applicant: Huawei Technologies Co., Ltd., Shenzhen (CN)

(72) Inventors: Mengyao Ma, Shenzhen (CN); Sheng Sun, Ottawa (CA); Yan Xin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 840 days.

(21) Appl. No.: 18/165,050

(22) Filed: Feb. 6, 2023

(65) Prior Publication Data

US 2023/0189015 A1 Jun. 15, 2023

Related U.S. Application Data

(63) Continuation of application No. PCT/CN2021/105438, filed on Jul. 9, 2021.

(30) Foreign Application Priority Data

Aug. 7, 2020 (CN) ........................ 202010790549.0

(51) Int. Cl.
*H04W 16/26* (2009.01)
*H04W 16/28* (2009.01)

(52) U.S. Cl.
CPC .......... *H04W 16/26* (2013.01); *H04W 16/28* (2013.01)

(58) Field of Classification Search
CPC ..... H04W 16/26; H04W 16/28; H04W 24/04; H04W 84/12; H04W 84/20; H04W 24/02
See application file for complete search history.

(56) References Cited

U.S. PATENT DOCUMENTS

2020/0076552 A1* 3/2020 Cherian ................ H04L 5/0035
2020/0404500 A1 12/2020 Sun et al.
2023/0328622 A1* 10/2023 Park ...................... H04W 16/28 370/328

FOREIGN PATENT DOCUMENTS

CN 104486744 A 4/2015
CN 104753703 A 7/2015

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, IEEE Computer Society, Sponsored by the LAN/MAN Standards Committee, IEEE Std 802. 11ad-2012, Dec. 28, 2012, 628 pages.

* cited by examiner

*Primary Examiner* — Eric Myers
(74) *Attorney, Agent, or Firm* — Conley Rose, P.C.

(57) ABSTRACT

A method for performing a central coordination function includes that when a first central coordinator node cannot perform a central coordination function, a candidate central coordinator node may send, to another node, a first change request message used to request to change a node parameter, and receive a change request response message of the first change request message sent by the another node.

20 Claims, 8 Drawing Sheets

METHOD AND APPARATUS FOR PERFORMING CENTRAL COORDINATION FUNCTION

CROSS-REFERENCE TO RELATED APPLICATION

This is a continuation of International Patent Application No. PCT/CN2021/105438 filed on Jul. 9, 2021, which claims priority to Chinese Patent Application No. 202010790549.0 filed on Aug. 7, 2020. The disclosure of the aforementioned applications are hereby incorporated by reference in their entireties.

TECHNICAL FIELD

This application relates to the communication field, and more specifically, to a method and an apparatus for performing a central coordination function.

BACKGROUND

Communication on a high frequency band is one of hot research technologies of fifth-generation (5G) and a Wi-Fi communication system. In high-frequency transmission, a narrow radiation beam with a high antenna gain needs to be used to overcome a defect of a high path loss of millimeter wave transmission, that is, a beamforming technology. In the beamforming technology, an optimal path from a transmitter to a receiver needs to be calculated. Therefore, the receiver needs to feed back certain information to the transmitter. The transmitter may calculate best transmit antenna and beam parameters based on the information.

A Wi-Fi standard for 60 gigahertz (GHz) high-frequency communication is used in the 802.11ad/ay version of the wireless network protocol standard. A beacon interval of the 802.11ad/ay version may be divided into a plurality of access periods, and all the periods have different purposes and access mechanisms. Further, a beacon header interval (BHI) includes a beacon transmission interval (BTI), association beamforming training (A-BFT), and an announcement transmission interval (ATI).

A communication architecture of personal basic service set (PBSS) control point (PCP)/access point (AP) clustering in the 802.11ad includes non-centralized PCP/AP clustering and centralized PCP/AP clustering. In the non-centralized PCP/AP clustering architecture, one BTI can be used in only one PCP/AP for data transmission. In the centralized PCP/AP clustering architecture, one BHI can be used in one PCP/AP for data transmission.

In a next-generation Wi-Fi standard based on 60 GHz high-frequency band communication, a basic service PCP/AP cluster (basic service set PCP/AP cluster (BPAC)) architecture is introduced. The BPAC architecture includes a plurality of PCPs/APs, and the plurality of PCPs/APs can simultaneously serve a plurality of stations (STAs). Therefore, how to perform coordination in the BPAC architecture needs to be resolved urgently.

SUMMARY

This application provides a method and an apparatus for performing a central coordination function to perform the central coordination function by using a candidate central coordinator node, thereby implementing node switching for the central coordination function.

According to a first aspect, a method for performing a central coordination function is provided. The method is applied to a system including a plurality of nodes and a first central coordinator node. There is a communication channel between each of the plurality of nodes and the first central coordinator node. The method includes that when it is determined that the first central coordinator node does not perform a central coordination function, a candidate central coordinator node in the plurality of nodes sends a first change request message to other nodes other than the candidate central coordinator node in the plurality of nodes. The first change request message is used to request a node to change a node parameter. The candidate central coordinator node receives a change request response message from a second node in the other nodes. The change request response message indicates that the second node receives the first change request message. The candidate central coordinator node performs the central coordination function when a change request response message from each of the other nodes is received.

When the first central coordinator node cannot perform the central coordination function, the candidate central coordinator node may send, to another node, a change request message used to request to change a node parameter, and receive a change request response message sent by the other node. Therefore, the candidate central coordinator node performs the central coordination function, thereby helping implement node switching for the central coordination function.

In some possible implementations, the method further includes that the candidate central coordinator node starts a first timer when it is determined that the first central coordinator node does not perform the central coordination function. That the candidate central coordinator node performs the central coordination function when a change request response message from each of the other nodes is received includes: The candidate central coordinator node performs the central coordination function when the change request response message from each of the other nodes is received and the first timer expires.

In some possible implementations, the first change request message includes at least one of a reason for changing the node parameter, a to-be-changed operation mode of the candidate central coordinator node, effective time at which the candidate central coordinator node performs the central coordination function, information about a station served by the first central coordinator node, or a beamforming training duration between the station served by the first central coordinator node and the plurality of nodes.

In some possible implementations, that a candidate central coordinator node sends a first change request message to other nodes other than the candidate central coordinator node in the plurality of nodes includes:

The candidate central coordinator node sends the first change request message to the second node. The first change request message is used to request the second node to change the node parameter.

In some possible implementations, the first change request message is used to request each of the other nodes to change the node parameter.

In some possible implementations, before the candidate central coordinator node sends the first change request message to the other nodes other than the candidate central coordinator node in the plurality of nodes, the method further includes as follows.

The candidate central coordinator node receives a node operation mode switching message from the first central coordinator node. The node operation mode switching message indicates that a node operation mode of the first central coordinator node is switched to skipping performing the central coordination function.

When the node operation mode switching message is received, the candidate central coordinator node determines that the first central coordinator node does not perform the central coordination function.

In some possible implementations, the node operation mode switching message includes at least one of context parameters of the plurality of nodes, the to-be-changed operation mode of the candidate central coordinator node, the effective time at which the candidate central coordinator node performs the central coordination function, a to-be-changed operation mode of the first central coordinator node, the information about a station served by the first central coordinator node, or the beamforming training duration between the station served by the first central coordinator node and the plurality of nodes.

In some possible implementations, the method further includes that the candidate central coordinator node receives a second change request message. The second change request message includes at least one of the information about the station served by the first central coordinator node and the beamforming training duration between the station served by the first central coordinator node and the plurality of nodes. The candidate central coordinator node performs, based on the information about the station served by the first central coordinator node and the beamforming training duration between the station served by the first central coordinator node and the plurality of nodes, beamforming training with the station served by the first central coordinator node.

In some possible implementations, before a candidate central coordinator node sends a first change request message to the other nodes other than the candidate central coordinator node in the plurality of nodes, the method further includes as follows.

The candidate central coordinator node starts a second timer when a detection message from the first central coordinator node is received.

When the second timer expires, the candidate central coordinator node determines that the first central coordinator node does not perform the central coordination function.

In some possible implementations, the candidate central coordinator node is any one of a node in an inactive state, a member node, a node that performs a function of an earlier version, or a backup central coordinator node in the plurality of nodes.

According to a second aspect, an operation mode switching method is provided. The method is applied to a system including a plurality of nodes and a central coordinator node. There is a communication channel between each of the plurality of nodes and the central coordinator node. The method includes as follows.

A target node in the plurality of nodes receives an operation mode switching message from the central coordinator node. The operation mode switching message indicates the target node to be switched from a first operation mode to a second operation mode.

The target node is switched from the first operation mode to the second operation mode based on the operation mode switching message.

In some possible implementations, the operation mode switching message further indicates effective time at which the target node is switched from the first operation mode to the second operation mode. The method further includes as follows.

The target node starts a first timer when the operation mode switching message from the central coordinator node is received.

That the target node is switched from the first operation mode to the second operation mode based on the operation mode switching message includes as follows.

The target node is switched from the first operation mode to the second operation mode when the first timer reaches the effective time.

In some possible implementations, the method further includes as follows.

The target node sends an operation mode switching response message to the central coordinator node. The operation mode switching response message is used to notify the central coordinator node that the target node is to be switched from the first operation mode to the second operation mode.

In some possible implementations, the first operation mode is a backup central coordinator node mode. The second operation mode is a member node mode.

In some possible implementations, the first operation mode is a backup central coordinator node mode or a member node mode. The second operation mode is a mode of a node that performs a function of an earlier version.

In some possible implementations, the first operation mode is a member node mode. The second operation mode is a backup central coordinator node mode.

According to a third aspect, an operation mode switching method is provided. The method is applied to a system including a plurality of nodes and a central coordinator node. There is a communication channel between each of the plurality of nodes and the central coordinator node. The method includes as follows.

The central coordinator node determines a target node whose operation mode is to be switched in the plurality of nodes.

The central coordinator node sends an operation mode switching message to the target node. The operation mode switching message indicates the target node to be switched from a first operation mode to a second operation mode.

In some possible implementations, the operation mode switching message further indicates effective time at which the target node is switched from the first operation mode to the second operation mode.

In some possible implementations, the method further includes as follows.

The central coordinator node receives the operation mode switching response message from the target node. The operation mode switching response message indicates that the target node is to be switched from the first operation mode to the second operation mode.

The central coordinator node sends a change request message to a node other than the target node in the plurality of nodes. The change request message is used to request the node to change a node parameter.

In some possible implementations, the change request message includes a reason for switching an operation mode and/or effective time of the second operation mode.

In some possible implementations, the first operation mode is a backup central coordinator node mode. The second operation mode is a member node mode.

In some possible implementations, the first operation mode is a backup central coordinator node mode or a member node mode. The second operation mode is a mode of a node that performs a function of an earlier version.

In some possible implementations, the first operation mode is a member node mode. The second operation mode is a backup central coordinator node mode.

According to a fourth aspect, an apparatus is provided. The apparatus may be a candidate central coordinator node, or may be a chip in the candidate central coordinator node. The apparatus has a function of implementing the first aspect and the possible implementations. The function may be implemented by hardware, or may be implemented by hardware executing corresponding software. The hardware or the software includes one or more modules corresponding to the function.

In a possible design, the apparatus includes a transceiver module and a processing module. The transceiver module includes a receiving module and a sending module. The transceiver module may be, for example, at least one of a transceiver, a receiver, or a transmitter. The receiving module and the sending module may include a radio frequency circuit or an antenna. The processing module may be a processor. Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module such that the apparatus performs the communication method according to the first aspect and the possible implementations.

In another possible design, when the apparatus is the chip, the chip includes a transceiver module and a processing module. The transceiver module includes a receiving module and a sending module. The receiving module and the sending module may be, for example, an input/output interface, a pin, a circuit, or the like on the chip. The processing module may be, for example, a processor. The processing module may execute instructions such that the chip in the terminal performs the communication method according to any one of the first aspect and the possible implementations thereof. Optionally, the processing module may execute instructions in a storage module. The storage module may be a storage module inside the chip, for example, a register or a cache. The storage module may alternatively be located inside a communication device but outside the chip, for example, a read-only memory (ROM) or another type of static storage device that can store static information and instructions, or a random-access memory (RAM).

The processor mentioned anywhere above may be a general-purpose central processing unit (CPU), a microprocessor, an application-specific integrated circuit (ASIC), or one or more integrated circuits configured to control program execution of the communication methods according to the foregoing aspects.

According to a fifth aspect, an operation mode switching apparatus is provided. The apparatus may be a node (for example, a target node), or may be a chip in the target node. The apparatus has a function of implementing the second aspect and the possible implementations. The function may be implemented by hardware, or may be implemented by hardware executing corresponding software. The hardware or the software includes one or more modules corresponding to the function.

In a possible design, the apparatus includes a transceiver module and a processing module. The transceiver module includes a receiving module and a sending module. The receiving module and the sending module may be, for example, at least one of a transceiver, a receiver, or a transmitter. The transceiver module may include a radio frequency circuit or an antenna. The processing module may be a processor.

Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module such that the apparatus performs the method according to any one of the second aspect or the implementations of the second aspect.

In another possible design, when the apparatus is the chip, the chip includes a transceiver module and a processing module. The transceiver module includes a receiving module and a sending module. The receiving module and the sending module may be, for example, an input/output interface, a pin, a circuit, or the like on the chip. The processing module may be, for example, a processor. The processing module may execute instructions such that the chip in the terminal performs the communication method according to any one of the second aspect and the possible implementations thereof.

Optionally, the processing module may execute instructions in the storage module. The storage module may be a storage module inside the chip, for example, a register or a cache. The storage module may alternatively be located inside a communication device but outside the chip, for example, a ROM or another type of static storage device that can store static information and instructions, or a RAM.

The processor mentioned anywhere above may be a general-purpose CPU, a microprocessor, an ASIC, or one or more integrated circuits configured to control program execution of the communication methods according to the foregoing aspects.

According to a sixth aspect, an operation mode switching apparatus is provided. The apparatus may be a central coordinator node, or may be a chip in the central coordinator node. The apparatus has a function of implementing the third aspect and the possible implementations thereof. The function may be implemented by hardware, or may be implemented by hardware executing corresponding software. The hardware or the software includes one or more modules corresponding to the function.

In a possible design, the apparatus includes a transceiver module and a processing module. The transceiver module includes a receiving module and a sending module. The receiving module and the sending module may be, for example, at least one of a transceiver, a receiver, or a transmitter. The transceiver module may include a radio frequency circuit or an antenna. The processing module may be a processor.

Optionally, the apparatus further includes a storage module. The storage module may be, for example, a memory. When the storage module is included, the storage module is configured to store instructions. The processing module is connected to the storage module, and the processing module may execute the instructions stored in the storage module or instructions from another module such that the apparatus performs the method according to any one of the third aspect or the possible implementations of the third aspect.

In another possible design, when the apparatus is the chip, the chip includes a transceiver module and a processing module. The transceiver module includes a receiving module and a sending module. The receiving module and the sending module may be, for example, an input/output interface, a pin, a circuit, or the like on the chip. The processing module may be, for example, a processor. The processing module may execute instructions such that the chip in the terminal performs the communication method according to any one of the third aspect and the possible implementations thereof.

Optionally, the processing module may execute instructions in the storage module. The storage module may be a storage module inside the chip, for example, a register or a cache. The storage module may alternatively be located inside a communication device but outside the chip, for example, a ROM or another type of static storage device that can store static information and instructions, or a RAM.

The processor mentioned anywhere above may be a general-purpose CPU, a microprocessor, an ASIC, or one or more integrated circuits configured to control program execution of the communication methods according to the foregoing aspects.

According to a seventh aspect, a computer storage medium is provided. The computer storage medium stores program code, and the program code is used to indicate instructions for performing the method according to any one of the first aspect and the possible implementations of the first aspect.

According to an eighth aspect, a computer storage medium is provided. The computer storage medium stores program code, and the program code is used to indicate instructions for performing the method according to any one of the second aspect and the possible implementations of the second aspect.

According to a ninth aspect, a computer storage medium is provided. The computer storage medium stores program code, and the program code is used to indicate instructions for performing the method according to any one of the third aspect and the possible implementations thereof.

According to a tenth aspect, a computer program product including instructions is provided. When the computer program product runs on a computer, the computer is enabled to perform the method according to any one of the first aspect or the possible implementations of the first aspect.

According to an eleventh aspect, a computer program product including instructions is provided. When the computer program product runs on a computer, the computer is enabled to perform the method according to any one of the second aspect or the possible implementations of the second aspect.

According to a twelfth aspect, a computer program product including instructions is provided. When the computer program product runs on a computer, the computer is enabled to perform the method according to any one of the third aspect or the possible implementations of the third aspect.

Based on the foregoing technical solutions, when a first central coordinator node cannot perform a central coordination function, a candidate central coordinator node may send, to another node, a change request message used to request to change a node parameter, and receive a change request response message sent by the other node. Therefore, the candidate central coordinator node performs the central coordination function, thereby helping implement node switching for the central coordination function.

DESCRIPTION OF EMBODIMENTS

The following describes technical solutions of this application with reference to accompanying drawings.

Figure 1:
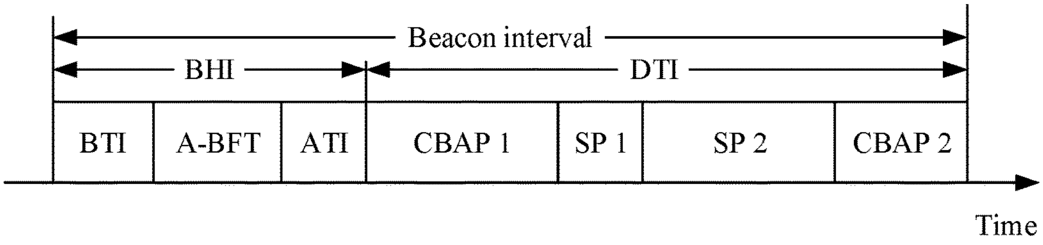
FIG. 1 is a schematic diagram of a beacon interval.

FIG. 1 is a schematic diagram of a beacon interval. A beacon interval includes a beacon header interval (BHI) and a data transfer interval (DTI). The BHI includes a BTI, A-BFT, and an ATI.

1. BTI

A PCP/AP may broadcast one or more beacon frames in one BTI. Further, the PCP/AP may send these beacon frames in different sector directions. The beacon frame carries an antenna identifier (ID) and a sector ID that are used by the PCP/AP to send the beacon frame.

2. A-BFT

BFT includes a training process in a beam direction from a plurality of STAs to a PCP/AP and a corresponding beam feedback process. In an A-BFT process, the STA may sweep different transmit beam sectors and antennas. Alternatively, the STA may use fixed transmit beam sectors and antennas, and the PCP/AP sweeps receive sectors and antennas. A-BFT includes one or more sector sweep (SSW) slots. A STA in each SSW slot may be configured to send at least one SSW frame, and a length of one SSW slot is a SSSlotTime. In each A-BFT, the STA randomly selects one SSW slot to send the SSW frame. A number of SSW frames sent in one SSW slot cannot exceed a number indicated by the PCP/AP (indicated by an FSS field in a DMG beacon frame). If SSW frames to be sent by the STA cannot be sent in the SSW slot, the STA may continue to send the SSW frame in a next SSW slot. After the STA sends one or more SSW frames in one SSW slot, the PCP/AP replies an SSW-feedback frame to the STA based on an SSW frame detection result. The SSW-feedback frame is replied at the end of one SSW slot. Reply time of the SSW-feedback frame needs to ensure that a maximum of FSS SSW frames sent by the STA have been sent.

3. DTI

A DTI includes any number of service periods (SPs) in any order and any number of contention-based access periods (CBAPs) in any order. The SP is an access period allocated to a pair of STAs. In this period, only the specified STA pair can perform communication, and other STAs cannot preempt channels. The CBAP is an access period allocated to all (or a pair of) STAs. In this period, the STAs needs to access channels through contention.

4. Non-Centralized PCP/AP Clustering

Figure 2:
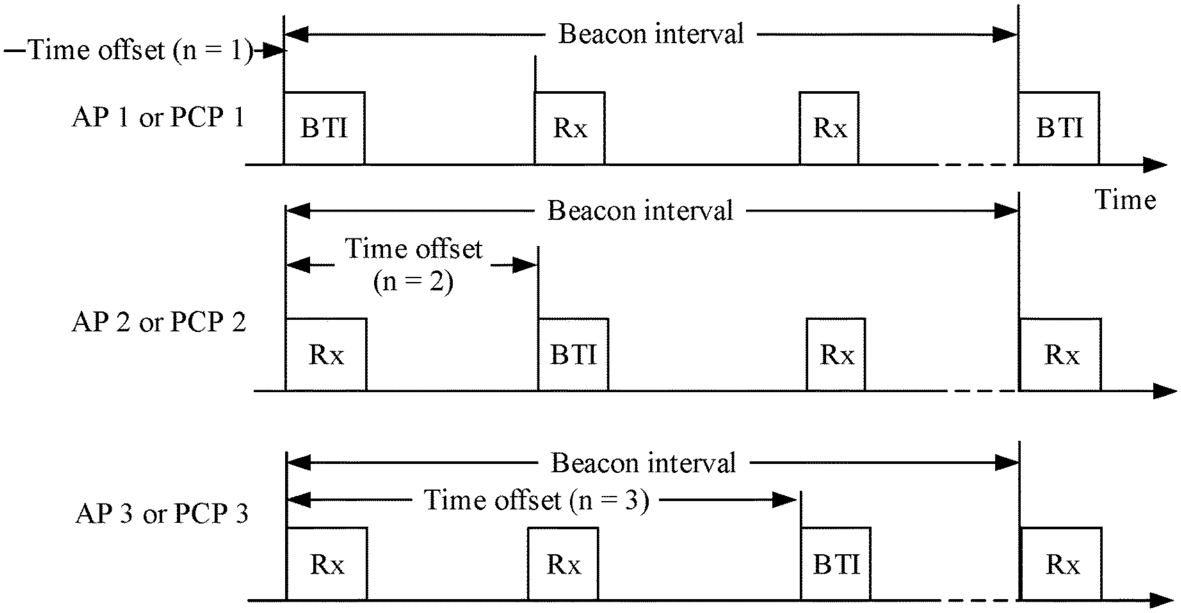
FIG. 2 is a schematic diagram of a beacon interval of a synchronization PCP/AP.

All APs in a cluster are coordinated by a synchronization PCP/AP (S-PCP/AP). In addition to the synchronization PCP/AP, other PCPs/APs are referred to as member PCPs/APs. All APs have a same beacon interval length but different start locations. The beacon interval of the synchronization PCP/AP is divided into N equal parts. The synchronization PCP/AP selects the beginning part of a first equal part as its BTI, and each of the other member PCPs/APs selects the beginning of an unoccupied equal part as its BTI (by detecting whether there is a beacon sent by another member PCP/AP at the beginning of each equal part). As shown in FIG. 2, the synchronization PCP/AP selects a first BTI location in a first row, an AP 2 selects a second BTI location in a second row, and an AP 3 selects a third BTI location in a third row. In addition, each PCP/AP further schedules a beacon service period (SP) at a BTI location of another PCP/AP. In the beacon service period, the STA cannot send data, and the PCP/AP cannot send data either, as shown by a location of an Rx in FIG. 2. In this way, BTIs of different PCPs/APs in a cluster appear at different locations (that is, are staggered in time), and a beacon service period protects each BTI, to prevent the BTI from being interfered by a BTI of another PCP/AP or a signal sent by a STA.

It may be understood that there is no channel for direct communication between the member PCP/AP and the synchronization PCP/AP.

5. Centralized Clustering

Figure 3:
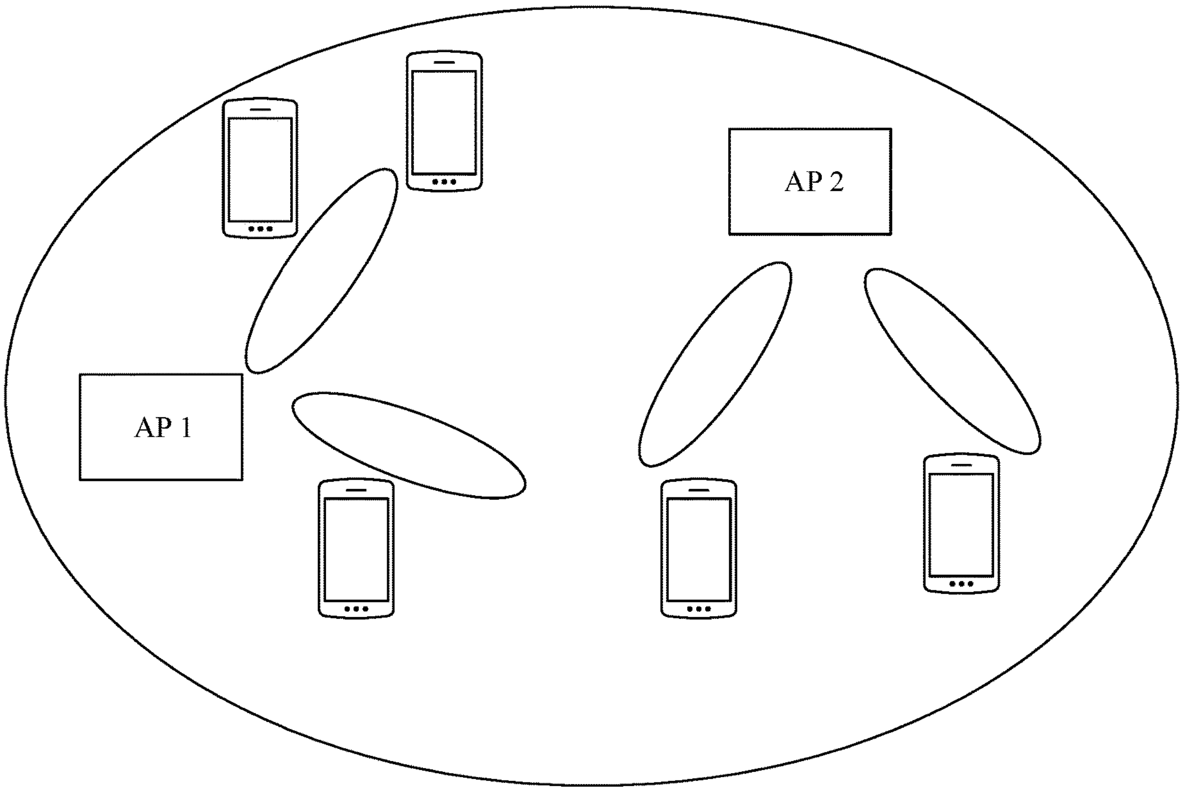
FIG. 3 is a schematic diagram of BTI scheduling.

A BTI scheduling result of centralized clustering is similar to a result shown in FIG. 3. Main differences are as follows.

(1) A cluster includes a plurality of synchronization PCPs/APs.

(2) A protection range of a beacon SP is a BHI (BHI=BTI+A-BFT+ATI), not only a BTI.

(3) All synchronization PCPs/APs in a cluster are coordinated by a centralized coordination service root. Functions of the centralized coordination service root include configuring a beacon interval, configuring a length of a beacon service period, aligning time of all synchronization PCPs/APs, providing occupation of BTIs in all equal parts of the beacon interval, and the like. If a PCP/AP intends to become a member PCP/AP in a cluster, the PCP/AP is first associated, as a non-PCP/AP STA, with a synchronization PCP/AP to obtain a related parameter of the cluster, and then becomes a member PCP/AP.

6. BPAC

A BPAC may also be referred to as a virtual PCP/AP (V-PCP/AP). A V-PCP/AP may be considered as an independent PCP/AP that provides services such as association, authentication, and communication scheduling to a STA, and is managed by a central coordination PCP/AP. A plurality of PCPs/APs in the BPAC may serve a plurality of STAs at the same time, to increase a system capacity. For example, a BPAC architecture shown in FIG. 3 may also be referred to as a BPAC system in the following embodiments.

In addition, the central coordination PCP/AP (C-PCP/AP) in the BPAC is similar to the synchronization PCP/AP in non-centralized PCP/AP clustering, but has more functions. The central coordination PCP/AP manages the virtual PCP/AP, establish and maintain the BPAC, and coordinates, synchronizes, and schedules a PCP/AP in the BPAC. Other PCPs/APs in the BPAC are referred to as member "PCPs/APs" (M-PCPs/APs).

It may be understood that there is no channel for direct communication between the M-PCP/AP and the central coordination PCP/AP in the BPAC. If the M-PCP/AP communicates with the central coordination PCP/AP through an air interface, a beamforming link has been established between the member PCP/AP and the central coordination PCP/AP.

It may be further understood that a beacon interval of the BPAC further includes a PCP/AP coordination interval. The coordination interval is used to exchange beam sweeping information and scheduling information between PCPs/APs.

It may be further understood that a node in embodiments of this application may be a device having a wireless transceiver function, and may be referred to as a terminal, user equipment (UE), a mobile station (MS), a mobile terminal (MT), a vehicle-mounted terminal, a remote station, a remote terminal, or the like. A specific form of the terminal may be a mobile phone, a cellular phone, a cordless phone, a session initiation protocol (SIP) phone, a wearable device, a tablet computer (pad), a desktop computer, a notebook computer, an all-in-one machine, a vehicle-mounted terminal, a wireless local loop (WLL) station, a personal digital assistant (PDA), or the like. The terminal may be used in the following scenarios: virtual reality (VR), augmented reality (AR), industrial control, self-driving, remote medical surgery, a smart grid, transportation safety, a smart city, a smart home, and the like. The terminal may be fixed or mobile. It should be noted that the terminal may support at least one wireless communication technology, for example, Long-Term Evolution (LTE), new radio (NR), or wideband code-division multiple access (WCDMA).

A communication architecture of PCP/AP clustering in the 802.11ad includes non-centralized PCP/AP clustering and centralized PCP/AP clustering. In the non-centralized PCP/AP clustering architecture, one BTI can be used in only one PCP/AP for data transmission. In the centralized PCP/AP clustering architecture, one BHI can be used in one PCP/AP for data transmission. In a next-generation Wi-Fi standard based on 60 GHz high-band communication, a BPAC architecture is introduced. The BPAC architecture includes a plurality of PCPs/APs, and the plurality of PCPs/APs can simultaneously serve a plurality of STAs.

Therefore, how to perform coordination in the BPAC architecture needs to be resolved urgently.

The following describes messages in this application.

| ID | Message name | Description |
|---|---|---|
| 1 | BPAC_JOIN_REQ | Message that a PCP/AP (new member PCP/AP) requests to join a PCP/AP cluster (for example, a BPAC). |
| 2 | BPAC_JOIN_RSP | Feedback message of a C-PCP/AP for the preceding message |
| 3 | BPAC_JOIN_CFM | Confirmation message of a new member PCP/AP for the preceding message |
| 4 | BPAC_LEAVE_REQ | Message that a member PCP/AP requests to leave a PCP/AP cluster (for example, a BPAC). |
| 5 | BPAC_LEAVE_RSP | Feedback message of a C-PCP/AP for the preceding message |
| 6 | BPAC_UPDATE_REQ | This message being used by a C-PCP/AP to indicate a member PCP/AP to change parameters of a PCP/AP cluster (for example, a BPAC) |
| 7 | BPAC_UPDATE_RSP | Feedback message of a member PCP/AP for the preceding message |
| 8 | AP_MODE_CHANGE_REQ | This message being used by a C-PCP/AP to indicate a member PCP/AP to change an AP operation mode |
| 9 | AP_MODE_CHANGE_RSP | Feedback message of a member PCP/AP for the preceding message |
| 10 | AP_MODE_CHANGE_IND | This message being used by a member PCP/AP to indicate a change of an AP operation mode |
| 11 | AP_MODE_CHANGE_CFM | Feedback message of a C-PCP/AP for the preceding message |
| 12 | HEART_BEAT_MSG | Heartbeat message |

It should be noted that a PCP/AP operation mode may also be referred to as a PCP/AP state. Correspondingly, MODE CHANGE in the foregoing message may be replaced with STATE_CHANGE. The following content is similar, and details are not described again.

Details of messages exchanged between nodes are as follows.

(1) PCP/AP Cluster Access Request Message BPAC_JOIN_REQ

A message that a PCP/AP (new member PCP/AP) requests to join the PCP/AP cluster (for example, the BPAC).

This message is sent by the new member PCP/AP (AP 1) to the C-PCP/AP (AP 2) to request an access request to join the PCP/AP cluster (for example, the BPAC). The message includes a transmitter address/identifier, a receiver address/identifier, message type (PCP/AP cluster access request), a PCP/AP capability, and a requested AP mode (PCP/AP mode after joining). The transmitter address/identifier, the receiver address/identifier, and the message type are mandatory parameters, and other parameters are optional.

The PCP/AP cluster access request message BPAC_JOIN_REQ is defined in a manner as follows (a parameter sequence is not limited):

| Transmitter address/ identifier | Receiver address/ identifier | Message type (PCP/AP cluster access request) | PCP/AP capability | Requested AP mode |
|---|---|---|---|---|

(a) The transmitter address/identifier indicates the new member PCP/AP (AP 1), and may be a media access control (MAC) address of the AP 1, an association ID AID, an ID defined by the PCP/AP cluster (for example, the BPAC), or the like.

(b) The receiver address/identifier indicates the C-PCP/AP (AP 2), and may be a MAC address of the AP 2, an association ID AID, an ID defined by the PCP/AP cluster (for example, the BPAC), or the like.

(c) The message type indicates a type/purpose of the message, and indicates that the AP 1 requests to join the PCP/AP cluster (for example, the BPAC) in this example.

(d) Optionally, the PCP/AP capability is included, to indicate a capability of the AP 1 (for example, a PCP/AP mode that may be supported), and may be specifically represented in a bit map manner, an enumeration manner, or another manner.

(e) Optionally, the requested AP mode is included, to indicate a PCP/AP mode (recommended value) after the AP 1 joins the PCP/AP cluster (for example, the BPAC).

(2) PCP/AP Cluster Access Response Message BPAC_JOIN_RSP

A feedback message of the C-PCP/AP for the PCP/AP cluster access request message BPAC_JOIN_REQ.

This message is sent by the C-PCP/AP (AP 2) to the new member PCP/AP (AP 1) to feed back a request for the AP 1 to join the PCP/AP cluster (for example, the BPAC). The message includes a transmitter address/identifier, a receiver address/identifier, a message type (feedback for joining the PCP/AP cluster), a result code (joining result), a C-AP AID (C-PCP/AP AID), an AP AID (newly allocated ID), an AP mode (a PCP/AP mode after joining), an AP rank, a C-PCP/AP active timer base value (C-AP active timer base value), a C-PCP/AP active timer offset unit (C-AP active timer offset unit), BPAC parameters (PCP/AP cluster and BPAC parameters), and the like. The transmitter address/identifier, the receiver address/identifier, and the message type are mandatory parameters, and other parameters are optional.

The PCP/AP cluster access response message BPAC_JOIN_RSP is defined in a manner as follows (a parameter sequence is not limited).

| Transmitter address/identifier | Receiver address/identifier | Message type (feedback for joining a PCP/AP cluster) | Result code | C-AP AID | AP AID | Optional AP mode |
|---|---|---|---|---|---|---|
| AP rank | C-PCP/AP active timer base value | C-PCP/AP active timer offset unit | | BPAC parameters | | |

The PCP/AP cluster access response message BPAC_JOIN_RSP is defined in another manner as follows (the C-PCP/AP active timer base value and the C-PCP/AP active timer offset unit, as sub-elements, are included in the BPAC parameters).

| | Receiver address/identifier | Message type (feedback for joining a PCP/AP cluster) | Result code | C-AP AID | AP AID | Optional AP mode |
|---|---|---|---|---|---|---|
| AP rank | BPAC parameters (including parameters, such as a C-PCP/AP active timer base value rank and a C-PCP/AP active timer offset unit) | | | | | |

The PCP/AP cluster access response message BPAC_JOIN_RSP is defined in another manner as follows (the C-AP AID, the C-PCP/AP active timer base value and the C-PCP/AP active timer offset unit, as sub-elements, are included in the BPAC parameters).

| Transmitter address/identifier | Receiver address/identifier | Message type (feedback for joining a PCP/AP cluster) | Result code | AP AID | Optional AP mode |
|---|---|---|---|---|---|
| AP rank | BPAC parameters (including parameters, such as a C-AP AID, a C-PCP/AP active timer base value and a C-PCP/AP active timer offset unit) | | | | |

(a) The transmitter address/identifier indicates the C-PCP/AP (AP 2), and may be a MAC address of the AP 2, an association ID AID, an ID defined by the PCP/AP cluster (for example, the BPAC), or the like.

(b) The receiver address/identifier indicates the new member PCP/AP (AP 1), and may be a MAC address of the AP 1, an association ID AID, an ID defined by the PCP/AP cluster (for example, the BPAC), or the like.

(c) The message type indicates a type/purpose of the message, and indicates feedback of the AP 2 for that the AP 1 requests to join the PCP/AP cluster (for example, the BPAC) in this example.

(d) The result code indicates a feedback result of the AP 2 to that the AP 1 requests to join the PCP/AP cluster (for example, the BPAC). For example, 1 indicates YES/SUCCESS/success, and 0 indicates NO/FAILURE/failure.

(e) The C-AP AID indicates the C-PCP/AP AID or an ID defined by the PCP/AP cluster (for example, the BPAC), and is valid when the result code is YES/SUCCESS/success.

(f) The AP AID indicates the newly allocated AID of the AP 1 or an ID defined by the PCP/AP cluster (for example, the BPAC), and is valid when the result code is YES/SUCCESS/success.

(g) Optionally, the AP mode is included, to indicate a PCP/AP mode after the AP 1 joins the PCP/AP cluster (for example, the BPAC). A value may be the same as or different from that of the requested AP mode in BPAC_JOIN_REQ. Alternatively, if the C-PCP/AP uses the requested AP mode included in BPAC_JOIN_REQ as the AP mode, this parameter may be omitted.

(h) The AP rank indicates a rank of the AP 1, and is valid when the result code is YES/SUCCESS/success.

(i) The C-PCP/AP active timer base value is the C-AP active timer base value, and is valid when the result code is YES/SUCCESS/success. The C-PCP/AP active timer base value is used to calculate a basic value of a C-PCP/AP active timer (C-AP active timer), as shown in Embodiment 3.

(j) The C-PCP/AP active timer offset unit is the C-AP active timer offset unit, and is valid when the result code is YES/SUCCESS/success. The C-PCP/AP active timer offset unit is used to calculate an offset value of a C-PCP/AP active timer (C-AP active timer), as shown in Embodiment 3.

(k) The BPAC parameters indicate other parameters of the PCP/AP cluster (for example, the BPAC), such as AIDs of other member PCPs/APs or an ID and a rank defined by the PCP/AP cluster (for example, the BPAC). The BPAC parameters are valid when the result code is YES/SUCCESS/success.

It should be noted that some common parameters of the PCP/AP cluster (for example, the BPAC), such as one or more of the C-AP AID, the C-PCP/AP active timer base value and the C-PCP/AP active timer offset unit, as sub-elements may also be included in the BPAC parameters. Parameters of the AP 1, such as the AP AID and the AP rank, as sub-elements may also be included in the BPAC parameters, for example, encapsulated in the sub-elements together with an AP AID and an AP rank of another PCP/AP in the PCP/AP cluster (for example, the BPAC).

(3) PCP/AP Cluster Access Confirmation Message BPAC_JOIN_CFM

A confirmation message of the new member PCP/AP (AP 1) to the PCP/AP cluster access response message BPAC_JOIN_RSP. This message is sent by the new member PCP/AP (AP 1) to the C-PCP/AP (AP 2) to confirm that feedback for joining the PCP/AP cluster (for example, the BPAC) from the AP 2 is received. The message includes a transmitter AID/address/identifier, a receiver AID/address/identifier, a message type (confirmation for joining the PCP/AP cluster), and the like.

The PCP/AP cluster access confirmation message BPAC_JOIN_CFM is defined in a manner as follows (a parameter sequence is not limited).

| Transmitter AID/address/ identifier | Receiver AID/address/ identifier | Message type (confirmation for joining a PCP/AP cluster) |
|---|---|---|

(a) The transmitter AID/address/identifier indicates the new member PCP/AP (AP 1), and may be an AID of the AP 1, a MAC address, an ID defined by the PCP/AP cluster (for example, the BPAC), or the like.

(b) The receiver AID/address/identifier indicates the C-PCP/AP (AP 2), and may be an AID of the AP 2, a MAC address, an ID defined by the PCP/AP cluster (for example, the BPAC), or the like.

(c) The message type indicates a type/purpose of the message, and indicates that the AP 1 confirms to join the PCP/AP cluster (for example, the BPAC) in this example.

(4) PCP/AP Cluster Exit Request Message BPAC_LEAVE_REQ

A message that the member PCP/AP (AP 1) requests to leave the PCP/AP cluster (for example, the BPAC).

This message is sent by the member PCP/AP (AP 1) to the C-PCP/AP (AP 2) to request to leave the PCP/AP cluster (for example, the BPAC). The message includes a transmitter AID/address/identifier, a receiver AID/address/identifier, a message type (a PCP/AP cluster exit request), and the like.

The PCP/AP cluster exit request message BPAC_LEAVE_REQ is defined in a manner as follows (a parameter sequence is not limited).

| Transmitter AID/address/identifier | Receiver AID/address/identifier | Message type (PCP/AP cluster exit request) |
|---|---|---|

(a) The transmitter AID/address/identifier indicates the member PCP/AP (AP 1), and may be an AID of the AP 1, a MAC address, an ID defined by the PCP/AP cluster (for example, the BPAC), or the like.

(b) The receiver AID/address/identifier indicates the C-PCP/AP (AP 2), and may be an AID of the AP 2, a MAC address, an ID defined by the PCP/AP cluster (for example, the BPAC), or the like.

(c) The message type indicates a type/purpose of the message, and indicates that the AP 1 requests to leave the PCP/AP cluster (for example, the BPAC) in this example.

(5) PCP/AP Cluster Exit Response Message BPAC_LEAVE_RSP

A feedback message of the C-PCP/AP for the PCP/AP cluster exit request message BPAC_LEAVE_REQ.

This message is sent by the C-PCP/AP (AP 2) to the member PCP/AP (AP 1) that requests to leave, to feed back a request for the AP 1 to leave the PCP/AP cluster (for example, the BPAC). The message includes a transmitter AID/address/identifier, a receiver AID/address/identifier, a message type (a PCP/AP cluster exit response), a beamforming/beamforming training (BF) timer, and the like. The transmitter AID/address/identifier, the receiver AID/address/identifier, and the message type are mandatory parameters, and other parameters are optional.

The PCP/AP cluster exit response message BPAC_LEAVE_RSP is defined in a manner as follows (a parameter sequence is not limited).

| Transmitter AID/address/ identifier | Receiver AID/address/ identifier | Message type (PCP/AP cluster exit response) | BF timer |
|---|---|---|---|

(a) The transmitter AID/address/identifier indicates the C-PCP/AP (AP 2), and may be an AID of the AP 2, a MAC address, an ID defined by the PCP/AP cluster (for example, the BPAC), or the like.

(b) The receiver AID/address/identifier indicates the leaving member PCP/AP (AP 1), and may be an AID of the AP 1, a MAC address, an ID defined by the PCP/AP cluster (for example, the BPAC), or the like.

(c) The message type indicates a type/purpose of the message, and indicates feedback of the AP 2 for that the AP 1 requests to leave the PCP/AP cluster (for example, the BPAC) in this example.

(d) The BF timer is a beamforming/beamforming training timer, and indicates a beamforming/beamforming duration between a STA originally served by the AP 1 and a new serving PCP/AP. A special value (for example, 0) may indicate that the AP 1 may immediately leave the PCP/AP cluster (for example, the BPAC), to be specific, the STA originally served by the AP 1 does not need beamforming/beamforming training.

(6) PCP/AP Cluster Change Request Message BPAC_UPDATE_REQ

This message being used by the C-PCP/AP to indicate the member PCP/AP to change the parameters of the PCP/AP cluster (for example, the BPAC).

This message is sent to one or more member PCPs/APs (AP 1) by the C-PCP/AP or the PCP/AP (AP 2) that is to become the C-PCP/AP, to indicate changes of the parameters of the PCP/AP cluster (for example, the BPAC). The message includes a transmitter AID/address/identifier, a receiver AID/address/identifier, a message type (PCP/AP cluster parameter change), a reason code (PCP/AP cluster parameter change reason), an old AP mode (original mode of a PCP/AP whose mode is changed), a new AP mode (new mode of the PCP/AP whose mode is changed), an AP AID (AID of the PCP/AP whose mode is changed), mode change effective time (effective time of the new mode), a beamforming training (BF) timer, STA INFO (information about a STA served by a leaving PCP/AP), updated BPAC parameters (PCP/AP cluster and BPAC parameters), and the like. The transmitter AID/address/identifier, the receiver AID/address/identifier, the message type, and the reason code are mandatory parameters, and other parameters are optional.

The PCP/AP cluster change request message BPAC_UPDATE_REQ may be defined in a plurality of manners, such as manners A, B, C, D, and E. A message format is first described, and then a message parameter is described.

The manner A is used as an example. BPAC_UPDATE_REQ is defined in a manner as follows (a parameter sequence is not limited, and an underlined font indicates that corresponding parameters are invalid or do not exist in some conditions).

(1) When the reason code is a PCP/AP mode change,

| | | | | | |
|---|---|---|---|---|---|
| Transmitter AID/address/identifier | Receiver AID/address/identifier | Message type (PCP/AP cluster parameter change) | Reason code | Old AP mode | New AP mode |
| APID | Mode change effective timer | BF timer | STA INFO | Updated BPAC parameters | |

(2) When the reason code is a param change,

| | | | | | |
|---|---|---|---|---|---|
| Transmitter AID/address/identifier | Receiver AID/address/identifier | Message type (PCP/AP cluster parameter change) | Reason code | Old AP mode | New AP mode |
| APID | Mode change effective timer | BF timer | STA INFO | Updated BPAC parameters | |

When BPAC_UPDATE_REQ indicates one or more parameter change reasons, BPAC_UPDATE_REQ may include one or more reason codes. The manner A is used as an example. There are two definition manners as follows.

(1) Manner 1: A reason code num is included, to indicate a number of change reasons (an underlined parameter is not displayed for clarity).

| | | | | | |
|---|---|---|---|---|---|
| Transmitter address/ identifier | Message type (PCP/AP cluster parameter change) | Reason code num | Reason code 1 | Old AP mode 1 | New AP mode 1 |
| AP AID 1 | Mode change effective time 1 | . . . | Old AP mode N | AP AID N | Mode change effective time N |

(2) Manner 2: More reason codes are included, to indicate whether there are more change reasons. For example, 0 may indicate that there are no more parameter change reasons, and 1 may indicate that there are subsequent parameter change reasons.

| | | | | | | | |
|---|---|---|---|---|---|---|---|
| Transmitter AID/address/ identifier | Receiver AID/address/ identifier | Message type PCP/AP cluster parameter change) | Reason code 1 | Old AP mode 1 | New AP mode 1 | AP AID 1 | |
| Mode change effective time 1 | More reason codes | . . . | Old AP mode N | New AP mode N | AP AID N | Mode change effective time N | More reason codes |

or

| | | | | | | | |
|---|---|---|---|---|---|---|---|
| Trans-mitter AID/ address/ identifier | Receiver AID/ address/ identifier | Message type (PCP/ AP cluster para-meter change) | More reason codes | Reason code 1 | Old AP mode 1 | New AP mode 1 | AP AID 1 |
| Mode change effective time 1 | . . . | More reason codes | Old AP mode N | New AP mode N | AP AID N | Mode change effective time N | |

When BPAC_UPDATE_REQ indicates one or more parameter change reasons (reason code), other definition manners such as manners B, C, D, and E are used. Extension of BPAC_UPDATE_REQ is similar, and details are not described herein again. The following describes different definition manners in detail when BPAC_UPDATE_REQ includes one reason code.

Manner A

BPAC_UPDATE_REQ is defined in a manner as follows (a parameter sequence is not limited, and an underlined font indicates that corresponding parameters are invalid or do not exist in some conditions).

(1) When the reason code is a PCP/AP mode change, only one PCP/AP mode changes.

| Transmitter AID/address/identifier | Receiver AID/address/identifier | Message type (PCP/AP cluster parameter change) | Reason code | Old AP mode | New AP mode |
|---|---|---|---|---|---|

| APID | Mode change effective timer | BF timer | STA INFO | Updated BPAC parameters |
|---|---|---|---|---|

Particularly, when the new AP mode is inactive, a definition may be as follows:

| Transmitter AID/address/identifier | Receiver AID/address/identifier | Message type (PCP/AP cluster parameter change) | Reason code | Old AP mode | New AP mode |
|---|---|---|---|---|---|

| AP AID | Mode change effective time | BF timer | STA INFO | Updated BPAC parameters |
|---|---|---|---|---|

Alternatively, if at least one PCP/AP mode changes, a PCP/AP mode change num indicates a number of changed PCPs/APs (an underlined parameter is not displayed for clarity).

| Transmitter AID/address/identifier | Receiver AID/address/identifier | Message type (PCP/AP cluster parameter change) | Reason codes | PCP/AP mode change num | Old AP mode 1 | New AP mode 1 |
|---|---|---|---|---|---|---|
| AP AID 1 | Mode change effective time 1 | . . . | Old AP mode N | New AP mode N | AP AID N | Mode change effective time N |

Alternatively, if at least one PCP/AP mode changes, more PCP/AP mode changes indicate whether there are more PCPs/APs whose modes are changed (positions of more PCP/AP mode changes may be front or back).

| Transmitter AID/address/identifier | Receiver AID/address/identifier | Message type (PCP/AP cluster parameter change) | Reason code | More PCP/AP mode changes | Old AP mode 1 | New AP mode 1 |
|---|---|---|---|---|---|---|

| AP AID 1 | Mode change effective time 1 | . . . | More PCP/AP mode changes | Old AP mode N | New AP mode N | AP AID N | Mode change effective time N |
|---|---|---|---|---|---|---|---|

(2) When the reason code is a param change,

| Transmitter AID/address/identifier | Receiver AID/address/identifier | Message type (PCP/AP cluster parameter change) | Reason code | Old AP mode | New AP mode |
|---|---|---|---|---|---|

| AP AID | Mode change effective time | BF timer | STA INFO | Updated BPAC parameters, |
|---|---|---|---|---|

or

| Transmitter AID/address/identifier | Receiver AID/address/identifier | Message type (PCP/AP cluster parameter change) | Reason code | PCP/AP mode change num | Old AP mode 1 | New AP mode 1 |
|---|---|---|---|---|---|---|
| AP AID 1 | Mode change effective time 1 | BF timer 1 | STA INFO 1 | . . . | Old AP mode N | New AP mode N | AP AID N |
| Mode change effective time N | BF timer N | STA INFO N | Updated BPAC parameters | | | |

Manner B

BPAC_UPDATE_REQ is defined in a manner as follows (a parameter sequence is not limited, and an underlined font indicates that corresponding parameters are invalid or do not exist in some conditions):

(1) When the reason code is new PCP/AP join,

| Transmitter AID/address/identifier | Receiver AID/address/identifier | Message type (PCP/AP cluster parameter change) | Reason code | New AP mode | AP AID |
|---|---|---|---|---|---|
| Mode change effective time | BF timer | STA INFO | Updated BPAC parameters | | |

(2) When the reason code is PCP/AP leave (mode change to inactive),

| Transmitter AID/address/identifier | Receiver AID/address/identifier | Message type (PCP/AP cluster parameter change) | Reason code | AP AID |
|---|---|---|---|---|
| Mode change effective time | BF timer | STA INFO | Updated BPAC parameters | |

(3) When the reason code is PCP/AP mode change to L-AP, PCP/AP mode change to M-AP, PCP/AP mode change to SC-AP, or PCP/AP mode change to C-AP,

| Transmitter AID/address/identifier | Receiver AID/address/identifier | Message type (PCP/AP cluster parameter change) | Reason code | AP AID |
|---|---|---|---|---|
| Mode change effective time | BF timer | STA INFO | Updated BPAC parameters | |

(4) When the reason code is a param change,

| Transmitter AID/address/identifier | Receiver AID/address/identifier | Message type (PCP/AP cluster parameter change) | Reason code | AP AID |
|---|---|---|---|---|
| Mode change effective time | BF timer | STA INFO | Updated BPAC parameters | Param effective time |

Manner C

BPAC_UPDATE_REQ is defined in a manner as follows (a parameter sequence is not limited, and an underlined font indicates that corresponding parameters are invalid or do not exist in some conditions).

(1) When the reason code is new PCP/AP join or a PCP/AP mode change,

| Transmitter AID/address/identifier | Receiver AID/address/identifier | Message type (PCP/AP cluster parameter change) | Reason code | New AP mode | AP AID |
|---|---|---|---|---|---|
| Mode change effective time | BF timer | STA INFO | Updated BPAC parameters | | |

(2) When the reason code is PCP/AP leave (mode change to inactive),

| Transmitter AID/address/identifier | Receiver AID/address/identifier | Message type (PCP/AP cluster parameter change) | Reason code | AP AID |
|---|---|---|---|---|
| Mode change effective time | BF timer | STA INFO | Updated BPAC parameters | |

(3) When the reason code is a param change,

| Transmitter AID/address/identifier | Receiver AID/address/identifier | Message type (PCP/AP cluster parameter change) | Reason code | AP AID |
|---|---|---|---|---|
| Mode change effective time | BF timer | STA INFO | Updated BPAC parameters | Param effective time |

(4) Optionally, when there is at least one PCP/AP whose mode is changed, a PCP/AP mode change num may indicate a number of changed PCPs/APs, or more PCP/AP mode changes may indicate whether there are more PCPs/APs whose modes are changed, which is similar to an example of the manner A. Details are not described herein.

Manner D

BPAC_UPDATE_REQ is defined in a manner as follows (a parameter sequence is not limited, and an underlined font indicates that corresponding parameters are invalid or do not exist in some conditions):

(1) When the reason code is new PCP/AP join or a PCP/AP mode change,

| Transmitter AID/address/identifier | Receiver AID/address/identifier | Message type (PCP/AP cluster parameter change) | Reason code | New AP mode | AP AID |
|---|---|---|---|---|---|
| Mode change effective time | BF timer | STA INFO | Updated BPAC parameters | | |

Particularly, when the reason code is a PCP/AP mode change and a new AP mode is inactive, a definition may be as follows.

| Transmitter AID/address/ identifier | Receiver AID/address/ identifier | Message type (PCP/AP cluster parameter change) | Reason code | New AP mode | AP AID |
|---|---|---|---|---|---|
| Mode change effective time | BF timer | STA INFO | Updated BPAC parameters | | |

(2) When the reason code is a param change,

| Transmitter AID/address/ identifier | Receiver AID/address/ identifier | Message type (PCP/AP cluster parameter change) | Reason code | New AP mode | AP AID |
|---|---|---|---|---|---|
| Mode change effective time | BF timer | STA INFO | Updated BPAC parameters | Param effective time | |

(3) Optionally, when there is at least one PCP/AP whose mode is changed, a PCP/AP mode change num may indicate a number of changed PCPs/APs, or more PCP/AP mode changes may indicate whether there are more PCPs/APs whose modes are changed, which is similar to an example of the manner A. Details are not described herein.

Manner E

BPAC_UPDATE_REQ is defined in a manner as follows (a parameter sequence is not limited, and an underlined font indicates that corresponding parameters are invalid or do not exist in some conditions).

(1) When the reason code is inactive to C-AP, inactive to M-AP, inactive to L-AP, L-AP to C-AP, L-AP to M-AP, L-AP to inactive, M-AP to C-AP, M-AP to SC-AP, M-AP to L-AP, M-AP to inactive, SC-AP to C-AP, SC-AP to M-AP, SC-AP to L-AP, SC-AP to inactive, C-AP to SC-AP, C-AP to M-AP, C-AP to L-AP, or C-AP to inactive,

| Transmitter AID/address/ identifier | Receiver AID/address/ identifier | Message type (PCP/AP cluster parameter change) | Reason code | AP AID |
|---|---|---|---|---|
| Mode change effective time | BF timer | STA INFO | Updated BPAC parameters | |

Particularly, when the reason code is a PCP/AP mode change and a new AP mode is inactive, a definition may be as follows.

| Transmitter AID/address/ identifier | Receiver AID/address/ identifier | Message type (PCP/AP cluster parameter change) | Reason code | AP AID |
|---|---|---|---|---|
| Mode change effective time | BF timer | STA INFO | Updated BPAC parameters | |

(2) When the reason code is a param change,

| Transmitter AID/address/ identifier | Receiver AID/address/ identifier | Message type (PCP/AP cluster parameter change) | Reason code | AP AID |
|---|---|---|---|---|
| Mode change effective time | BF timer | STA INFO | Updated BPAC parameters | Param effective time |

Description of message structures of the plurality of definition manners A, B, C, D, and E of BPAC_UPDATE_REQ is ended.

It should be noted that the plurality of definition manners A, B, C, D, and E of BPAC_UPDATE_REQ may also be replaced with another definition manner as follows (some or all of the changed parameters are encapsulated as sub-elements in a structure of the updated BPAC parameters, to be specific, some or all of the old AP mode, the new AP mode, the AP AID, the mode change effective time, the BF timer and the STA INFO are encapsulated as sub-elements in the updated BPAC parameters).

| Transmitter AID/address/ identifier | Receiver AID/address/ identifier | Message type (PCP/AP cluster parameter change) | Reason code | Updated BPAC parameters |
|---|---|---|---|---|

or (the reason code is also included in the updated BPAC parameters)

| Transmitter AID/address/ identifier | Receiver AID/address/ identifier | Message type (PCP/AP cluster parameter change) | Updated BPAC parameters |
|---|---|---|---|

It should be noted that, when the AP 1 sends the message to a plurality of APs 2, the sending may be performed in a separate manner, a sequential manner, a broadcast manner, a multicast manner, or a parallel manner (similar to a DL MU-MIMO manner).

In the preceding message structures:

(a) The transmitter AID/address/identifier indicates the C-PCP/AP or the PCP/AP (AP 2) that is to become the C-PCP/AP, and may be an AID of the AP 2, a MAC address, an ID defined by the PCP/AP cluster (for example, the BPAC), or the like.

(b) The receiver AID/address/identifier indicates the member PCP/AP (AP 1), and may be an AID of the AP 1, a MAC address, an ID defined by the PCP/AP cluster (for example, the BPAC), or the like. When the AP 1 sends the message to the plurality of APs 2, if the sending is performed in a broadcast manner, the receiver AID/address/identifier may be a broadcast AID/address/identifier, or if the sending is performed in a multicast manner, the receiver AID/address/identifier may be a multicast AID/address/identifier.

(c) The message type indicates a type/purpose of the message, and indicates the PCP/AP cluster (for example, the BPAC) parameter change in this example.

(d) Optionally, the reason code num is included, to be specific, there is one or more parameter change reasons (reason code).

(e) Optionally, more reason codes are included, to indicate that there are more parameter change reasons. For example, 0 may indicate that there are no more parameter change reasons, and 1 may indicate that there are subsequent parameter change reasons.

Manner A (f) The reason code indicates the PCP/AP cluster (for example, the BPAC) parameter change reason. The reason includes {PCP/AP mode change, param change}. The reason may be specifically represented in a bit map manner, an enumeration manner (for example, reason code=0 indicates the PCP/AP mode change, and reason code=1 indicates the param change), or another manner.

(g) The old AP mode indicates the original mode of the PCP/AP whose mode is changed. The old AP mode is valid only when the reason code is the PCP/AP mode change. Otherwise, the old AP mode is invalid or this field does not exist. A meaning of the old AP mode may be {inactive, L-AP, M-AP, SC-AP, C-AP}. The old AP mode may be specifically represented in a bit map manner (for example, a length of the old AP mode is 5 bits, bit 0 is set to 1 to indicate inactive, and bit 1 is set to 1 to indicate L-AP), an enumeration manner (for example, old AP mode=0 indicates inactive, and old AP mode=1 indicates L-AP), or another manner. Note: If there is no optional mode or only some modes are used, a value of the old AP mode decreases accordingly.

(h) The new AP mode indicates the new mode of the PCP/AP whose mode is changed. The new AP mode is valid only when the reason code is the PCP/AP mode change. Otherwise, the new AP mode is invalid or this field does not exist. A meaning of the new AP mode may be {inactive, L-AP, M-AP, SC-AP, C-AP}. The new AP mode may be specifically represented in a bit map manner, an enumeration manner, or another manner (same as above). Note: If there is no optional mode or only some modes are used, a value of the new AP mode decreases accordingly.

(i) The AP AID indicates an AID of a new member PCP/AP, or an AID of the PCP/AP whose mode is changed, or an AID of the leaving PCP/AP. The AP AID is valid when the reason code is the PCP/AP mode change. Otherwise, the AP AID is invalid or this field does not exist. A meaning of AP AID is related to the meanings of the old AP mode and the new AP mode. The following table lists a correspondence (that is, mapping between the modes). Note: If there is no optional mode or only some modes are used, the following correspondence is reduced accordingly.

| Old AP mode value | New AP mode value | Meaning of an AP AID |
|---|---|---|
| Inactive | C-AP | AID of a new member PCP/AP |
| Inactive | M-AP | AID of a new member PCP/AP |
| Inactive | L-AP | AID of a new member PCP/AP |
| L-AP | C-AP | AID of a PCP/AP whose mode is changed |
| L-AP | M-AP | AID of a PCP/AP whose mode is changed |
| L-AP | Inactive | AID of a leaving PCP/AP |
| M-AP | C-AP | AID of a PCP/AP whose mode is changed |
| M-AP | SC-AP | AID of a PCP/AP whose mode is changed |
| M-AP | L-AP | AID of a PCP/AP whose mode is changed |
| M-AP | Inactive | AID of a leaving PCP/AP |
| SC-AP | C-AP | AID of a PCP/AP whose mode is changed |
| SC-AP | M-AP | AID of a PCP/AP whose mode is changed |
| SC-AP | L-AP | AID of a PCP/AP whose mode is changed |
| SC-AP | Inactive | AID of a leaving PCP/AP |
| C-AP | SC-AP | AID of a PCP/AP whose mode is changed |
| C-AP | M-AP | AID of a PCP/AP whose mode is changed |
| C-AP | L-AP | AID of a PCP/AP whose mode is changed |
| C-AP | Inactive | AID of a leaving PCP/AP |

(j) Optionally, the PCP/AP mode change num is included, to indicate a number of PCPs/APs whose modes are changed.

(k) Optionally, more PCP/AP mode changes are included, to indicate that there are more PCPs/APs whose modes are changed. For example, 0 may indicate that there are no more PCPs/APs whose modes are changed, and 1 may indicate that there are subsequent PCPs/APs whose modes are changed.

Manner B (d) The reason code indicates the PCP/AP cluster (for example, the BPAC) parameter change reason. The reason includes {new PCP/AP join, PCP/AP leave (mode change to inactive), PCP/AP mode change to L-AP, PCP/AP mode change to M-AP, PCP/AP mode change to SC-AP, PCP/AP mode change to C-AP, param change}. Further, the reason code may be represented in a bit map manner (for example, a length of the reason code is 3 bits, bit 0 is set to 1 to indicate the new PCP/AP join, and bit 1 is set to 1 to indicate the PCP/AP leave or mode change to inactive), an enumeration manner (for example, reason code=0 indicates the new PCP/AP join, and reason code=1 indicates the PCP/AP leave or mode change to inactive), or another manner.

(e) The new AP mode indicates a new mode of a PCP/AP that newly joins. The new AP mode is valid only when the reason code is the new PCP/AP join. Otherwise, the new AP mode is invalid or this field does not exist. A meaning of the new AP mode may be {L-AP, M-AP, SC-AP, C-AP}. The new AP mode may be specifically represented in a bit map manner, an enumeration manner, or another manner (same as above). Note: If there is no optional mode or only some modes are used, a value of the new AP mode decreases accordingly.

(f) The AP AID indicates an AID of a new member PCP/AP, or an AID of the PCP/AP whose mode is changed, or an AID of the leaving PCP/AP. The AP AID is valid when the reason code is new PCP/AP join, PCP/AP leave (mode change to inactive), PCP/AP mode change to L-AP, PCP/AP mode change to M-AP, PCP/AP mode change to SC-AP, or PCP/AP mode change to C-AP. Otherwise, the AP AID is invalid or this field does not exist. A meaning of the AP AID is related to a meaning of the reason code. When the reason code is the new PCP/AP join, the AP AID indicates the AID of the new member PCP/AP. When the reason code is the PCP/AP leave (mode change to inactive), the AP AID indicates the AID of the leaving PCP/AP. Otherwise, the AP AID indicates the AID of the PCP/AP whose mode is changed.

Manner C (d) The reason code indicates the PCP/AP cluster (for example, the BPAC) parameter change reason. The reason includes {new PCP/AP join, PCP/AP leave (mode change to inactive), PCP/AP mode change, param change}. Further, the reason code may be represented in a bit map manner (for example, a length of the reason code is 2 bits, bit 0 is set to 1 to indicate the new PCP/AP join, and bit 1 is set to 1 to indicate the PCP/AP leave or mode change to inactive), an enumeration manner (for example, reason code=0 indicates the new PCP/AP join, and reason code=1 indicates the PCP/AP leave or mode change to inactive), or another manner.

(e) The new AP mode indicates a new mode of a PCP/AP that newly joins or indicates a new mode of the PCP/AP whose mode is changed. The new AP mode is valid when the reason code is the new PCP/AP join or PCP/AP mode change. Otherwise, the new AP mode is invalid or this field does not exist. A meaning of the new AP mode may be {L-AP, M-AP, SC-AP, C-AP}. The new AP mode may be specifically represented in a bit map manner, an enumeration manner, or another manner (same as above). Note: If there is no optional mode or only some modes are used, a value of the new AP mode decreases accordingly.

(f) The AP AID indicates an AID of a new member PCP/AP, or an AID of the PCP/AP whose mode is changed, or an AID of the leaving PCP/AP. The AP AID is valid when the reason code is the new PCP/AP join, the PCP/AP leave (mode change to inactive), or the PCP/AP mode change. Otherwise, the AP AID is invalid or this field does not exist. A meaning of the AP AID is related to a meaning of the reason code. When the reason code is the new PCP/AP join, the AP AID indicates the AID of the new member PCP/AP. When the reason code is the PCP/AP leave (mode change to inactive), the AP AID indicates the AID of the leaving PCP/AP. Otherwise, the AP AID indicates the AID of the PCP/AP whose mode is changed.

(g) Optionally, the PCP/AP mode change num is included, to indicate a number of PCPs/APs whose modes are changed.

(h) Optionally, more PCP/AP mode changes are included, to indicate that there are more PCPs/APs whose modes are changed. For example, 0 may indicate that there are no more PCPs/APs whose modes are changed, and 1 may indicate that there are subsequent PCPs/APs whose modes are changed Manner D (d) The reason code indicates the PCP/AP cluster (for example, the BPAC) parameter change reason. The reason includes {new PCP/AP join, PCP/AP mode change, param change}. Specifically, the reason code may be represented in a bit map manner (for example, a length of the reason code is 2 bits, bit 0 is set to 1 to indicate the new PCP/AP join, and bit 1 is set to 1 to indicate the PCP/AP mode change), an enumeration manner (for example, reason code=0 indicates the new PCP/AP join, and reason code=1 indicates the PCP/AP mode change), or another manner.

(e) The new AP mode indicates a new mode of a PCP/AP that newly joins or indicates a new mode of the PCP/AP whose mode is changed. The new AP mode is valid when the reason code is the new PCP/AP join or PCP/AP mode change. Otherwise, the new AP mode is invalid or this field does not exist. A meaning of the new AP mode may be {inactive, L-AP, M-AP, SC-AP, C-AP}. The new AP mode may be specifically represented in a bit map manner, an enumeration manner, or another manner (same as above). Note: If there is no optional mode or only some modes are used, a value of the new AP mode decreases accordingly.

(f) The AP AID indicates an AID of a new member PCP/AP or an AID of the PCP/AP whose mode is changed (including an AID of the leaving PCP/AP, to be specific, a mode is changed to inactive). The AP AID is valid when the reason code is the new PCP/AP join or the PCP/AP mode change. Otherwise, the AP AID is invalid or this field does not exist. A meaning of the AP AID is related to a meaning of the reason code. When the reason code is the new PCP/AP join, the AP AID indicates the AID of the new member PCP/AP. Otherwise, the AP AID indicates the AID of the PCP/AP whose mode is changed (including the AID of the leaving PCP/AP, to be specific, the mode is changed to inactive).

(g) Optionally, the PCP/AP mode change num is included, to indicate a number of PCPs/APs whose modes are changed.

(h) Optionally, more PCP/AP mode changes are included, to indicate that there are more PCPs/APs whose modes are changed. For example, 0 may indicate that there are no more PCPs/APs whose modes are changed, and 1 may indicate that there are subsequent PCPs/APs whose modes are changed.

Manner E (d) The reason code indicates the PCP/AP cluster (for example, the BPAC) parameter change reason. The reason includes {inactive to C-AP, inactive to M-AP, inactive to L-AP, L-AP to C-AP, L-AP to M-AP, L-AP to inactive, M-AP to C-AP, M-AP to SC-AP, M-AP to L-AP, M-AP to inactive, SC-AP to C-AP, SC-AP to M-AP, SC-AP to L-AP, SC-AP to inactive, C-AP to SC-AP, C-AP to M-AP, C-AP to L-AP, C-AP to inactive, param change}.

(e) The AP AID indicates an AID of a new member PCP/AP or an AID of the PCP/AP whose mode is changed (including an AID of the leaving PCP/AP, to be specific, a mode is changed to inactive). The AP AID is valid when the reason code is inactive to C-AP, inactive to M-AP, inactive to L-AP, L-AP to C-AP, L-AP to M-AP, L-AP to inactive, M-AP to C-AP, M-AP to SC-AP, M-AP to L-AP, M-AP to inactive, SC-AP to C-AP, SC-AP to M-AP, SC-AP to L-AP, SC-AP to inactive, C-AP to SC-AP, C-AP to M-AP, C-AP to L-AP, or C-AP to inactive. Otherwise, the AP AID is invalid or this field does not exist. A meaning of the AP AID is related to a meaning of the reason code. When the reason code is inactive to C-AP, inactive to M-AP, or inactive to L-AP, the AP AID indicates the AID of the new member PCP/AP. Otherwise, the AP AID indicates the AID of the PCP/AP whose mode is changed (including the AID of the leaving PCP/AP, to be specific, the mode is changed to inactive).

(l) The mode change effective time indicates the effective time of the new mode when there is a PCP/AP whose mode is changed. The mode change effective time is valid when the reason code (and other parameters) indicates that there is the PCP/AP whose mode is changed (depending on specific implementations A to E, for example, if the manner A is used, the mode change effective time is valid when the reason code is the PCP/AP mode change; for example, if the manner C is used, the mode change effective time is valid when the reason code is the new PCP/AP join, the PCP/AP leave (mode change to inactive), or the PCP/AP mode change; and details are not described herein). A special value (for example, 0 or IMMEDIATE) may indicate that a mode change takes effect immediately.

(m) The BF timer is the beamforming/beamforming training timer, and indicates a beamforming/beamforming training duration between a STA served by the leaving PCP/AP and a new serving PCP/AP. The BF timer is valid when the reason code (and other parameters) indicates that a PCP/AP leaves or a PCP/AP is changed to the L-AP mode (depending on specific implementations A to E, for example, if the manner A is used, the BF timer is valid when the reason code is the PCP/AP mode change and the new AP mode is inactive; for example, if the manner B is used, the BF timer is valid only when the reason code is the PCP/AP leave (mode change to inactive); and details are not described herein). A special value (for example, 0) may indicate that the STA originally served by the PCP/AP does not need beamforming/beamforming training when the PCP/AP leaves the PCP/AP cluster (for example, the BPAC), that is, the PCP/AP may leave immediately.

(n) The STA INFO indicates the information about the STA served by the leaving PCP/AP. The STA INFO is valid when the reason code indicates that the PCP/AP leaves or the PCP/AP is changed to the L-AP mode (depending on specific implementations A to E, and details are not described herein again).

(o) The updated BPAC parameters (PCP/AP cluster and BPAC parameters) indicate the changed parameters of the PCP/AP cluster (for example, the BPAC), such as the C-PCP/AP active timer base value, the C-PCP/AP active timer offset unit, and the AP rank of each member PCP/AP. The updated BPAC parameters are valid when the reason code is the param change. Optionally, the updated BPAC parameters may carry a parameter, namely, the param effective time to indicate effective time of a parameter change. A special value (for example, 0 or IMMEDIATE) may indicate that the parameter change takes effect immediately.

(7) Response Message BPAC_UPDATE_RSP to the PCP/AP Cluster Change Request Message A feedback message of the member PCP/AP (AP 1) for the PCP/AP cluster change request message BPAC_UPDATE_REQ.

This message is sent by the member PCP/AP (AP 1) to the C-PCP/AP or a PCP/AP (AP 2) that is to become the C-PCP/AP, to confirm that a PCP/AP cluster (for example, the BPAC) change request from the AP 2 is received. The message includes a transmitter AID/address/identifier, a receiver AID/address/identifier, a message type (PCP/AP cluster change feedback), STA INFO (information about a STA served by a leaving PCP/AP), and the like. The transmitter AID/address/identifier, the receiver AID/address/identifier, and the message type are mandatory parameters, and other parameters are optional.

The response message BPAC_UPDATE_RSP to the PCP/AP cluster change request message is defined in a manner as follows (a parameter sequence is not limited):

| Transmitter AID/address/identifier | Receiver AID/address/identifier | Message type (PCP/AP cluster change feedback) | STA INFO |
|---|---|---|---|

(a) The transmitter AID/address/identifier indicates the member PCP/AP (AP 1), and may be an AID of the AP 1, a MAC address, an ID defined by the PCP/AP cluster (for example, the BPAC), or the like.

(b) The receiver AID/address/identifier indicates the C-PCP/AP or the PCP/AP (AP 2) that is to become the C-PCP/AP, and may be an AID of the AP 2, a MAC address, an ID defined by the PCP/AP cluster (for example, the BPAC), or the like.

(c) The message type indicates a type/purpose of the message, and indicates feedback of the AP 1 for the PCP/AP cluster (for example, the BPAC) change request in this example.

(d) The STA INFO indicates the information about the STA that is originally served by the PCP/AP and that has established a BF link with the member PCP/AP (AP 1). The STA INFO is valid when the reason code (and other parameters) in BPAC_UPDATE_REQ indicates that the AP 1 leaves (depending on specific implementations A to E of BPAC_UPDATE_REQ, for example, if the manner A is used, the STA INFO is valid when the reason code is the PCP/AP mode change and the new AP mode is inactive; if the manner B is used, the STA INFO is valid when the reason code is PCP/AP leave (mode change to inactive); and details are not described herein).

It should be noted that, when a plurality of APs 2 sends the message to the AP 1, the sending may be performed in a separate manner, a sequential manner, a multicast manner, or a parallel manner (similar to a UL MU-MIMO manner).

(8) PCP/AP Operation Mode Switching Message AP_MODE_CHANGE_REQ

This message being used by the C-PCP/AP to indicate a member PCP/AP to change an AP operation mode.

This message is sent by the C-PCP/AP (AP 2) to one or more member PCPs/APs (AP 1), to indicate the AP 1 to change the AP operation mode. The message includes a transmitter AID/address/identifier, a receiver AID/address/identifier, a message type (AP mode change request), a new AP mode (new mode of a PCP/AP whose mode is changed), mode change effective time (effective time of the new mode), a BF timer (beamforming timer, beamforming/beamforming training timer), BPAC contexts (PCP/AP cluster and BPAC context parameters), a C-PCP/AP next mode, and the like. The transmitter AID/address/identifier, the receiver AID/address/identifier, and the message type are mandatory parameters, and other parameters are optional.

The PCP/AP operation mode switching message AP_MODE_CHANGE_REQ is defined in a manner as follows (a parameter sequence is not limited):

| Transmitter AID/address/identifier | Receiver AID/address/identifier | Message type (PCP/AP mode change request) | New AP mode | Mode change effective time | BPAC contexts | C-PCP/AP next mode |
|---|---|---|---|---|---|---|

The PCP/AP operation mode switching message AP_MODE_CHANGE_REQ is defined in another manner as follows (for example, it only indicates that a receiving PCP/AP becomes the C-PCP/AP, that is, the new AP mode has only one value, which may be omitted):

| Transmitter AID/address/identifier | Receiver AID/address/identifier | Message type (PCP/AP mode change) |
|---|---|---|

(a) The transmitter AID/address/identifier indicates the C-PCP/AP (AP 2), and may be an AID of the AP 2, a MAC address, an ID defined by the PCP/AP cluster (for example, the BPAC), or the like.

(b) The receiver AID/address/identifier indicates the member PCP/AP (AP 1), and may be an AID of the AP 1, a MAC address, an ID defined by the PCP/AP cluster (for example, the BPAC), or the like. When the AP 1 sends the message to a plurality of APs 2, if the sending is performed in a broadcast manner, the receiver AID/address/identifier may be a broadcast AID/address/identifier, or if the sending is performed in a multicast manner, the receiver AID/address/identifier may be a multicast AID/address/identifier.

(c) The message type indicates a type/purpose of the message, and indicates the PCP/AP mode change request in this example.

(d) The new AP mode indicates the new mode of the PCP/AP (AP 1) whose mode is changed. A meaning of the new AP mode may be {inactive, L-AP, M-AP, SC-AP, C-AP}. The new AP mode may be specifically represented in a bit map manner (for example, a length of the new AP mode is 5 bits, bit 0 is set to 1 to indicate inactive, and bit 1 is set to 1 to indicate L-AP), an enumeration manner (for example, new AP mode=0 indicates inactive, and new AP mode=1 indicates L-AP), or another manner. Note: If there is no optional mode or only some modes are used, a value of the new AP mode decreases accordingly.

(e) The mode change effective time indicates the effective time of the new mode of the AP 1. A special value (for example, 0 or IMMEDIATE) may indicate that the new mode takes effect immediately.

(f) The BF timer is a beamforming/beamforming training timer, and indicates a beamforming/beamforming training duration between a STA served by the AP 1 and a new serving PCP/AP. The BF timer is valid when the new AP mode is L-AP or inactive.

(g) The BPAC contexts indicate PCP/AP cluster (for example, the BPAC) context parameters, such as BPAC configuration parameters and information about all current PCPs/APs and STAs. The BPAC contexts are valid when the new AP mode is C-AP or SC-AP.

(h) Optionally, the C-PCP/AP next mode is included, to indicate a mode subsequently used by the original C-PCP/AP. A meaning of the C-PCP/AP next mode may be {inactive, L-AP, M-AP, SC-AP}. The C-PCP/AP next mode may be further represented in a bit map manner, an enumeration manner, or another manner (same as the new AP mode). Note: If there is no optional mode or only some modes are used, a value of the C-PCP/AP next mode decreases accordingly.

It should be noted that, when the AP 1 sends the message to a plurality of APs 2, the sending may be performed in a separate manner, a sequential manner, a broadcast manner, a multicast manner, or a parallel manner (similar to a DL MU-MIMO manner).

It should be noted that AP_MODE_CHANGE_REQ may also be implemented as a sub-content of BPAC_UPDATE_REQ (when the reason code is the PCP/AP mode change). For details, refer to the definition of the BPAC_UPDATE_REQ. Details are not described herein again.

(9) PCP/AP Operation Mode Switching Response Message AP_MODE_CHANGE_RSP

A feedback message of the member PCP/AP (AP 1) for the PCP/AP operation mode switching message AP_MODE_CHANGE_REQ.

This message is sent by the new member PCP/AP (AP 1) to the C-PCP/AP (AP 2) to confirm that an operation mode switching message from the AP 2 is received. The message includes a transmitter AID/address/identifier, a receiver AID/address/identifier, a message type (PCP/AP mode change feedback), and the like.

The PCP/AP operation mode switching response message AP_MODE_CHANGE_RSP is defined in a manner as follows (a parameter sequence is not limited).

| Transmitter AID/address/identifier | Receiver AID/address/identifier | Message type (PCP/AP mode change feedback) |
|---|---|---|

(a) The transmitter AID/address/identifier indicates the member PCP/AP (AP 1), and may be an AID of the AP 1, a MAC address, an ID defined by the PCP/AP cluster (for example, the BPAC), or the like.

(b) The receiver AID/address/identifier indicates the C-PCP/AP (AP 2), and may be an AID of the AP 2, a MAC address, an ID defined by the PCP/AP cluster (for example, the BPAC), or the like.

(c) The message type indicates a type/purpose of the message, and indicates feedback of the AP 1 for the PCP/AP mode change request in this example.

It should be noted that, when a plurality of APs 2 sends the message to the AP 1, the sending may be performed in a separate manner, a sequential manner, a multicast manner, or a parallel manner (similar to a UL MU-MIMO manner).

It should be noted that AP_MODE_CHANGE_RSP may also be implemented as sub-content of BPAC_UPDATE_RSP (when the reason code of BPAC_UPDATE_REQ is the PCP/AP mode change). Details are not described herein again.

(10) PCP/AP Operation Mode Switching Notification Message AP_MODE_CHANGE_IND

The member PCP/AP (AP 1) notifies/indicates the C-PCP/AP that its mode needs to be changed. This message is sent by the member PCP/AP (AP 1) to the C-PCP/AP (AP 2) to notify/indicate the C-PCP/AP AP 1 that the mode needs to be changed. The message includes a transmitter AID/address/identifier, a receiver AID/address/identifier, a message type (PCP/AP mode change indication), a new AP mode (a new mode of the AP 1), and the like. The transmitter AID/address/identifier, the receiver AID/address/identifier, and the message type are mandatory parameters, and other parameters are optional.

The PCP/AP operation mode switching notification message AP_MODE_CHANGE_IND is defined in a manner as follows (a parameter sequence is not limited).

| Transmitter AID/address/identifier | Receiver AID/address/identifier | Message type (PCP/AP mode change indication) | New AP mode |
|---|---|---|---|

(a) The transmitter AID/address/identifier indicates the member PCP/AP (AP 1), and may be an AID of the AP 1, a MAC address, an ID defined by the PCP/AP cluster (for example, the BPAC), or the like.

(b) The receiver AID/address/identifier indicates the C-PCP/AP (AP 2), and may be an AID of the AP 2, a MAC address, an ID defined by the PCP/AP cluster (for example, the BPAC), or the like.

(c) The message type indicates a type/purpose of the message, and indicates an AP 1 mode change indication in this example.

(d) The new AP mode indicates the new mode of the PCP/AP (AP 1) whose mode is changed. A meaning of the new AP mode may be {inactive, L-AP, M-AP, SC-AP}. The new AP mode may be further represented in a bit map manner (for example, a length of the new AP mode is 4 bits, bit 0 is set to 1 to indicate inactive, and bit 1 is set to 1 to indicate L-AP), an enumeration manner (for example, new AP mode=0 indicates inactive, and new AP mode=1 indicates L-AP), or another manner. Note: If there is no optional mode or only some modes are used, a value of the new AP mode decreases accordingly.

(11) PCP/AP Operation Mode Switching Confirmation Message AP_MODE_CHANGE_CFM

A confirmation message of the C-PCP/AP for a member PCP/AP mode change indication. This message is sent by the C-PCP/AP (AP 2) to the member PCP/AP (AP 1) to confirm that the operation mode switching notification message AP_MODE_CHANGE_IND from the AP 1 is received. The message includes a transmitter AID/address/identifier, a receiver AID/address/identifier, a message type (AP mode change confirmation), mode change effective time (effective time of a new mode), a BF timer (beamforming timer, beamforming/beamforming training timer), BPAC contexts (PCP/AP cluster and BPAC context parameters), and the like. The transmitter AID/address/identifier, the receiver AID/address/identifier, and the message type are mandatory parameters, and other parameters are optional.

The PCP/AP operation mode switching confirmation message AP_MODE_CHANGE_CFM is defined in a manner as follows (a parameter sequence is not limited).

| Transmitter AID/address/ identifier | Receiver AID/address/ identifier | Message type (PCP/AP mode change confirmation) | Mode change effective time | BPAC contexts |
|---|---|---|---|---|

(a) The transmitter AID/address/identifier indicates the C-PCP/AP (AP 2), and may be an AID of the AP 2, a MAC address, an ID defined by the PCP/AP cluster (for example, the BPAC), or the like.
(b) The receiver AID/address/identifier indicates the member PCP/AP (AP 1), and may be an AID of the AP 1, a MAC address, an ID defined by the PCP/AP cluster (for example, the BPAC), or the like.
(c) The message type indicates a type/purpose of the message, and indicates the PCP/AP mode change confirmation in this example.
(d) Optionally, the mode change effective time may be included to indicate the effective time of the new mode of the AP 1. A special value (for example, 0 or IMMEDIATE) may indicate that the new mode takes effect immediately.
(e) The BF timer is a beamforming/beamforming training timer, and indicates a beamforming/beamforming training duration between a STA served by the AP 1 and a new serving PCP/AP. The BF timer is valid when the new AP mode in AP_MODE_CHANGE_IND is L-AP or inactive.
(f) The BPAC contexts indicate PCP/AP cluster (for example, the BPAC) context parameters, such as BPAC configuration parameters and information about all current PCPs/APs and STAs. The BPAC contexts are valid only when the corresponding new AP mode in the PCP/AP operation mode switching notification message AP_MODE_CHANGE_IND is SC-AP.

(12) Heartbeat Message HEART_BEAT_MSG

This message is used by the C-PCP/AP as a heartbeat message of the member PCP/AP. This message is sent by the C-PCP/AP (AP 2) to one or more member PCPs/APs (AP 1) as the heartbeat message (indicating that the C-PCP/AP and the AP cluster/BPAC are properly operating). The message includes a transmitter AID/address/identifier, a receiver AID/address/identifier, a message type (heartbeat message), and the like.

The heartbeat message HEART_BEAT_MSG is defined in a manner as follows (a parameter sequence is not limited).

| Transmitter AID/address/ identifier | Receiver AID/address/ identifier | Message type (heartbeat message) |
|---|---|---|

(a) The transmitter AID/address/identifier indicates the C-PCP/AP (AP 2), and may be an AID of the AP 2, a MAC address, an ID defined by the PCP/AP cluster (for example, the BPAC), or the like.
(b) The receiver AID/address/identifier indicates the member PCP/AP (AP 1), and may be an AID of the AP 1, a MAC address, an ID defined by the PCP/AP cluster (for example, the BPAC), or the like. When the AP 1 sends the message to a plurality of APs 2, if the sending is performed in a broadcast manner, the receiver AID/address/identifier may be a broadcast AID/address/identifier, or if the sending is performed in a multicast manner, the receiver AID/address/identifier may be a multicast AID/address/identifier.
(c) The message type indicates a type/purpose of the message, and indicates the heartbeat message in this example.

It should be noted that, when the AP 1 sends the message to a plurality of APs 2, the sending may be performed in a separate manner, a sequential manner, a broadcast manner, a multicast manner, or a parallel manner (similar to a downlink multiuser multiple input multiple output (DL MU-MIMO) manner).

To avoid repetition, details are not described below again.

Figure 4:
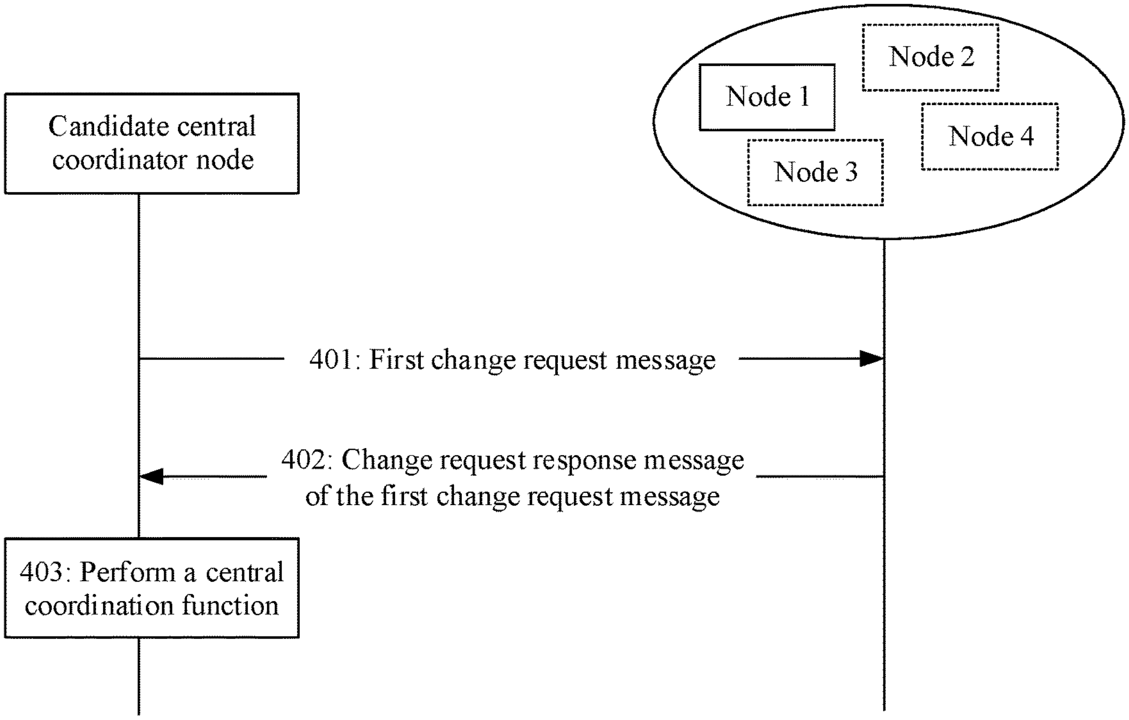
FIG. 4 is a schematic flowchart of a method for performing a central coordination function according to an embodiment of this application.

FIG. 4 is a schematic flowchart of a method for performing a central coordination function according to an embodiment of this application.

The method is applied to a system including a plurality of nodes. The plurality of nodes can simultaneously operate.

Optionally, there is a channel for direct communication between any two nodes of the plurality of nodes in the system. For example, the system may correspond to the BPAC system shown in FIG. 3.

It may be understood that the "node" in this embodiment of this application may be a "PCP" or an "AP". This is not limited in this application.

Figure 5:
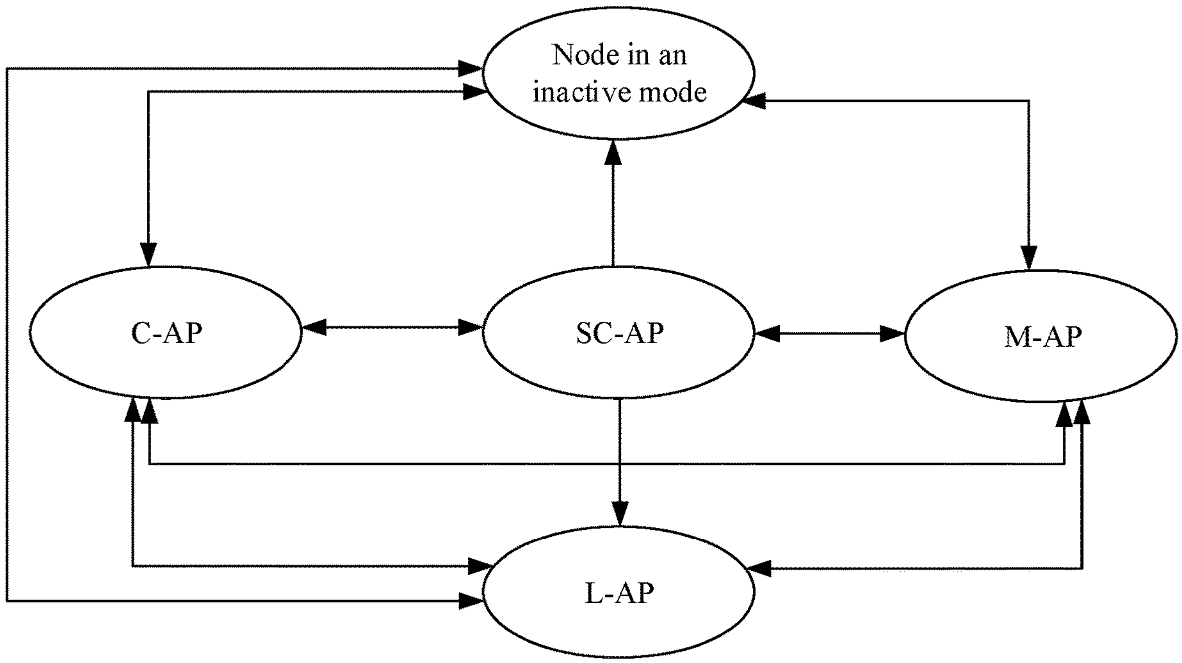
FIG. 5 is a schematic diagram of a structure of a BPAC system.

Further, the BPAC system may include the following five types of nodes (as shown in FIG. 5).

1. Node in an inactive mode: A PCP/AP is in a listening or power-saving mode.

Further, the inactive mode is generally a default initial state, and all PCPs/APs start with this mode. In this mode, the PCP/AP is mainly in a listening, scanning, or energy-saving state, that is, some functions are not enabled. A PCP/AP in the inactive mode can still be associated with other PCPs/APs in a BPAC architecture.

It may be understood that the node in the inactive mode may be that a current operation mode of the node is the inactive mode. The operation mode of the node may also be referred to as a "state (state) of the node". This is not limited in this application.

2. Central coordinator node (coordination AP, C-AP). The C-AP performs a central coordination function.

Further, a PCP/AP may be directly switched from an inactive mode to a C-AP mode, especially when a new BPAC architecture is established, for example, a node in the inactive mode may be switched to a C-AP.

It may be understood that the C-AP may also be referred to as a "node in a central coordination mode".

3. Second central coordinator node (second C-AP, SC-AP). The SC-AP performs a backup function of central coordination.

Further, there may be one or more SC-APs in one BPAC architecture. A PCP/AP can only be switched from an M-AP or a C-AP mode to an SC-AP mode.

It may be understood that the SC-AP may also be referred to as a "node in a backup central coordination mode" or a "backup central coordinator node".

4. Member node (member AP, M-AP). The M-AP performs functions of a member PCP/AP.

Further, when a PCP/AP joins a BPAC architecture, if the PCP/AP is neither a C-AP nor an SC-AP, the PCP/AP may be an M-AP.

It may be understood that the M-AP may also be referred to as a "node in a member node mode".

5. Node (legacy AP, L-AP) that performs a function of an earlier version: The L-AP performs a function of an earlier-version PCP/AP, and is used to serve an earlier-version station (STA).

Further, to maintain backward compatibility with the earlier-version STA, a BPAC architecture may include the PCP/AP, namely the L-AP, that performs the function of the earlier-version PCP/AP and that serves the earlier-version STA.

It may be understood that the L-AP may also be referred to as a "node in an earlier version mode".

Figure 6:
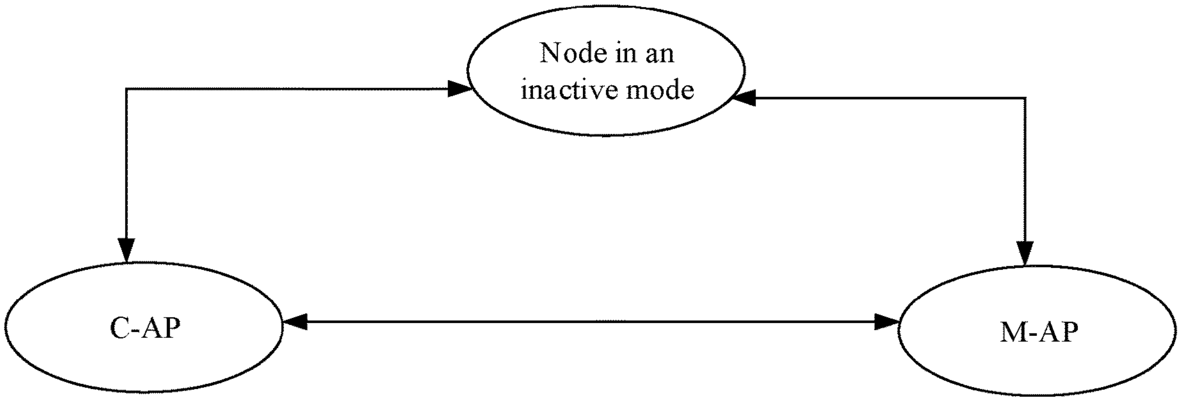
FIG. 6 is a schematic diagram of another structure of a BPAC system.

Optionally, the BPAC system may include one or more nodes in the inactive mode, one or more C-APs, and one or more M-APs, for example, as shown in FIG. 6.

Figure 7:
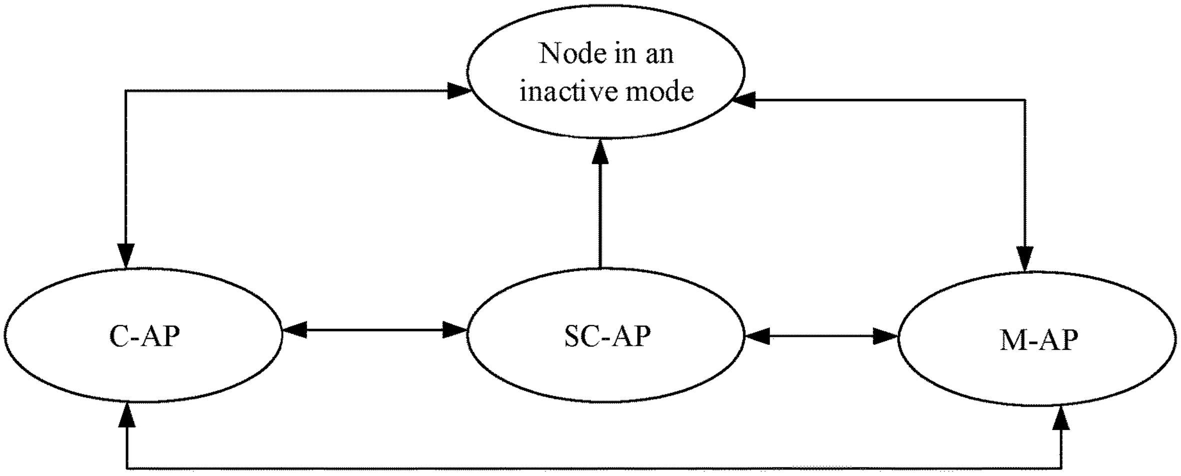
FIG. 7 is a schematic diagram of still another structure of a BPAC system.

Optionally, the BPAC system may include one or more nodes in the inactive mode, one or more C-APs, one or more SC-APs, and one or more M-APs, for example, as shown in FIG. 7.

Figure 8:
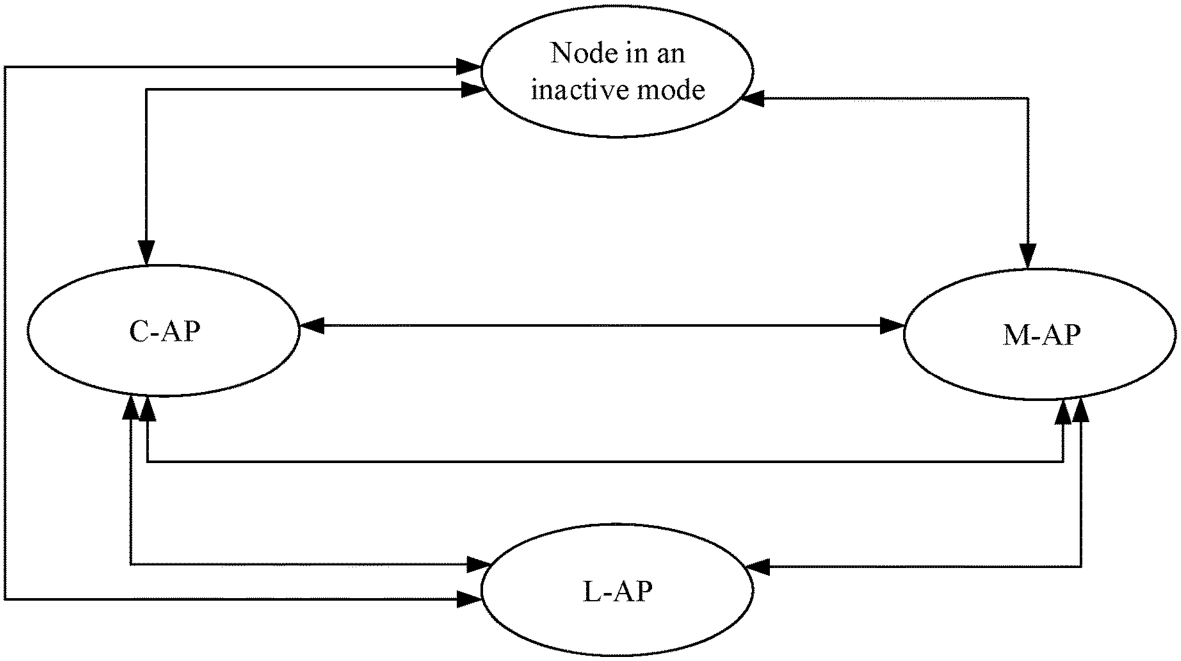
FIG. 8 is a schematic diagram of yet another structure of a BPAC system.

Optionally, the BPAC system may include one or more nodes in the inactive mode, one or more C-APs, one or more M-APs, and one or more L-APs, for example, as shown in FIG. 8.

It may be further understood that the node in this embodiment of this application may be the AP or the PCP. For ease of description, one node may be used as an example for description in this application, but this application is not limited thereto.

401: When it is determined that a first central coordinator node does not perform a central coordination function, a candidate central coordinator node in the plurality of nodes sends a first change request message to other nodes other than the candidate central coordinator node in the plurality of nodes. The first change request message is used to request a node to change a node parameter.

Further, in a BPAC architecture-based system, there is one central coordinator node (which may be referred to as the "first central coordinator node" below) in the plurality of nodes in the system. When the first central coordinator node cannot perform the central coordination function, the candidate central coordinator node may be enabled to perform the central coordination function, thereby helping implement node switching for the central coordination function.

It may be understood that the plurality of nodes in the step 401 do not include the first central coordinator node. The first central coordinator node may be configured to coordinate the plurality of nodes in the step 401. The first central coordinator node and the plurality of nodes in the step 401 may operate at the same time, or may not operate at the same time. This is not limited in this application. For ease of description, descriptions are provided by using an example in which the plurality of nodes do not include the first central coordinator node in the following embodiment. The node cluster may include the plurality of nodes and the first central coordinator node, or may include only the plurality of nodes. This is not limited in this application.

It may be further understood that the first change request message may be "BPAC_UPDATE_REQ".

It may be further understood that the "candidate central coordinator node" in this embodiment may be the "backup central coordinator node", or may be the member node.

Optionally, when a node in the C-AP mode hands over coordination rights and all association information of the node cluster to another node (for example, the candidate central coordinator node), has a fault, or is released by the node cluster, the node may hand over the central coordination function to the candidate central coordinator node, and a mode of the central coordinator node may be switched from the C-AP mode to the inactive mode.

Optionally, the candidate central coordinator node is any one of a node in an inactive state (inactive), a member node, a node that performs a function of an earlier version, or a backup central coordinator node in the plurality of nodes.

Further, the candidate central coordinator node may be an SC-AP or an M-AP in the plurality of nodes. If the plurality of nodes includes one or more SC-APs, one SC-AP in the one or more SC-APs is used as a new central coordinator node. If there is no SC-AP in the plurality of nodes, but there are one or more M-APs, one M-AP in the one or more M-APs is used as a new central coordinator node, namely, the candidate central coordinator node (candidate C-PCP/AP). The candidate central coordinator node needs to establish beamforming (BF) links with all other member PCPs/APs before serving as the central coordinator node.

It may be understood that the "node in the inactive state" may also be referred to as an "inactive node".

In an embodiment, the step 401 may be specifically that the candidate central coordinator node sends the first change request message to a second node. The first change request message is used to request the second node to change the node parameter.

Specifically, the candidate central coordinator node sending the first change request message to other nodes other than the candidate central coordinator node in the plurality of nodes may be sending different change request messages to different nodes. In other words, the candidate central coordinator node sends a change request message corresponding to the candidate central coordinator node to each node.

For example, the candidate central coordinator node sends, to the second node, the first change request message used to request the second node to change the node parameter. The candidate central coordinator node sends, to a third node, the first change request message used to request the third node to change the node parameter.

In another embodiment, the step 401 may be specifically that the first change request message indicates each of the other nodes to change the node parameter.

Specifically, the step 401 may be sending the same first change request message to each of the other nodes other than the candidate central coordinator node in the plurality of nodes. The first change request message is used to request each of the other nodes to change the node parameter.

It may be understood that the node in this embodiment of this application may implement function change by changing the node parameter. For example, the SC-AP may be converted into the M-AP by adjusting the node parameter, or another node may be converted. This is not limited in this application.

Optionally, the first change request message includes at least one of a reason for changing the node parameter, a to-be-changed operation mode of the candidate central coordinator node, or effective time at which the candidate central coordinator node performs the central coordination function.

Specifically, the reason for changing the node parameter may be that: the central coordination function is changed from being performed by the original first central coordinator node to being performed by the candidate central coordinator node. In other words, the node parameter is changed because the central coordinator node is replaced. Alternatively, the reason for changing the node parameter may be a parameter change of the node cluster.

For example, the first change request message may include a reason code field. The reason code field may be implemented in a bitmap manner or an enumeration manner. For example, if a value of the reason code field is "0", it indicates that the node parameter is changed because the central coordinator node is replaced or the operation mode of the node needs to be changed. If a value of the reason code field is "1", it indicates that the node parameter is changed because parameters of the entire node cluster are changed.

The to-be-changed operation mode (namely, a new operation mode (new AP mode)) of the candidate central coordinator node. In this embodiment, the new operation mode is an operation mode in which the central coordination function is performed.

The effective time (mode change effective time) at which the candidate central coordinator node performs the central coordination function may be effective time of the new mode. To be specific, the new operation mode of the candidate central coordinator node may be effective immediately, or may be effective when the effective time arrives after the first change request message is received.

It may be understood that the first change request message may further carry a transmitter identifier, a receiver identifier, and a type of the first change request message. The transmitter identifier may be a transmitter association identity (AID), a transmitter address, or a transmitter identity (ID). For example, in the embodiment shown in FIG. 4, the transmitter AID is an AID of the candidate central coordinator node.

Optionally, each member PCP/AP that receives the first change request message (BPAC_UPDATE_REQ) starts a timer based on mode change effective time, and replies a response message (BPAC_UPDATE_RSP) of the first change request message to the candidate central coordinator node.

In an embodiment, before the step 401, the candidate central coordinator node receives a node operation mode switching message (AP_MODE_CHANGE_REQ) from the first central coordinator node. The node operation mode switching message indicates that a node operation mode of the first central coordinator node is switched to skipping performing the central coordination function. When the node operation mode switching message is received, the candidate central coordinator node determines that the first central coordinator node does not perform the central coordination function.

Further, when determining that the first central coordinator node cannot perform the central coordination function, the first central coordinator node may send the node operation mode switching message to the plurality of nodes. The node operation mode switching message may indicate that the node operation mode of the first central coordinator node is switched to skipping performing the central coordination function. In other words, the first central coordinator node may actively switch the node operation mode. When receiving the node operation mode switching message, the candidate central coordinator node may learn that the first central coordinator node does not perform the central coordination function. This helps the candidate central coordinator node perform the central coordination function, to implement node switching for the central coordination function.

It may be understood that the node operation mode switching message may further include an operation mode that is to be performed after the first central coordinator node does not perform the central coordination function.

Optionally, after receiving the AP_MODE_CHANGE_REQ message, the candidate central coordinator node starts a timer (BF timer) based on the mode change effective time in the message, and sends the BPAC_UPDATE_REQ message to other member PCPs/APs, to notify that the candidate central coordinator node is about to perform a C-PCP/AP function. In addition, when the candidate central coordinator node receives response messages (BPAC_UPDATE_RSP) of the first change request messages of all the member PCPs/APs, the candidate central coordinator node sends an AP_MODE_CHANGE_RSP message to the first central coordinator node (that is, a C-PCP/AP that is about to leave).

In a possible implementation, the changed operation mode of the first central coordinator node is inactive.

Further, in this case, before sending the operation mode switching message, the first central coordinator node may further send "BPAC_UPDATE_REQ" (that is, a second change request message) to all nodes in the node cluster, to indicate that the first central coordinator node is about to leave.

Further, BPAC_UPDATE_REQ sent by the first central coordinator node includes at least one of a reason code, a to-be-changed operation mode of the candidate central coordinator node, effective time at which the candidate central coordinator node performs the central coordination function, a to-be-changed operation mode of the first central coordinator node, information about a station served by the first central coordinator node, and a beamforming training duration between the station served by the first central coordinator node and the plurality of nodes.

Further, the information (STA INFO) about the station served by the first central coordinator node may be one or more stations that establish a beam connection to the first central coordinator node.

The beamforming training duration between the station served by the first central coordinator node and the plurality of nodes may be further timed by using a BF training timer. Correspondingly, if the second change request message is sent to another node (for example, the second node) in the plurality of nodes, the BF timer in the second change request message may be a beamforming training duration between the second node and the station served by the first central coordinator node.

It may be understood that the station served by the first central coordinator node may be a station which currently accesses the node cluster. To be specific, a station that has left the first central coordinator node does not need to perform beamforming training with the central coordinator node.

It may be further understood that, if a beam link connection has been established between the station served by the first central coordinator node and some of the plurality of nodes, beamforming training may not be performed.

It may be understood that the station served by the first central coordinator node may be a station which currently accesses the node cluster. To be specific, a station that has left the first central coordinator node does not need to perform beamforming training with the candidate central coordinator node.

For example, a structure of BPAC_UPDATE_REQ (that is, the second change request message) sent by the first central coordinator node is as follows.

Manner A
(a) reason code: PCP/AP mode change
(b) old AP mode: C-AP
(c) new AP mode: inactive
(d) AP AID: AID of a leaving PCP/AP
(e) optionally, PCP/AP mode change num=1, or more PCP/AP mode changes=0
(f) BF timer (beamforming timer): a beamforming/beamforming training timer, where BF timer=0 indicates that BF training is not needed, for example, when the leaving PCP/AP does not serve any STA, a BF training process may be omitted
(g) STA INFO: information about a STA served by the leaving PCP/AP Manner B
(a) reason code: PCP/AP leave (mode change to inactive)
(b) new AP mode: is invalid or does not exist
(c) AP AID: AID of a leaving PCP/AP
(d) BF timer (beamforming timer): a beamforming/beamforming training timer, where BF timer=0 indicates that BF training is not needed, for example, when the leaving PCP/AP does not serve any STA, a BF training process may be omitted
(e) STA INFO: information about a STA served by the leaving PCP/AP Manner C
(a) reason code: PCP/AP leave (mode change to inactive)
(b) new AP mode: is invalid or does not exist
(c) AP AID: AID of a leaving PCP/AP
(d) optionally, PCP/AP mode change num=1, or more PCP/AP mode changes=0
(e) BF timer (beamforming timer): a beamforming/beamforming training timer, where BF timer=0 indicates that BF training is not needed, for example, when the leaving PCP/AP does not serve any STA, a BF training process may be omitted
(f) STA INFO: information about a STA served by the leaving PCP/AP Manner D
(a) reason code: PCP/AP mode change
(b) new AP mode: inactive
(c) AP AID: AID of a leaving PCP/AP
(d) optionally, PCP/AP mode change num=1, or more PCP/AP mode changes=0
(e) BF timer (beamforming timer): a beamforming/beamforming training timer, where BF timer=0 indicates that BF training is not needed, for example, when the leaving PCP/AP does not serve any STA, a BF training process may be omitted
(f) STA INFO: information about a STA served by the leaving PCP/AP Manner E
(a) reason code: C-AP to inactive
(b) AP AID: AID of a leaving PCP/AP
(c) BF timer (beamforming timer): a beamforming/beamforming training timer, where BF timer=0 indicates that BF training is not needed, for example, when the leaving PCP/AP does not serve any STA, a BF training process may be omitted
(d) STA INFO: information about a STA served by the leaving PCP/AP Optionally, the central coordinator node may receive a response message (BPAC_UPDATE_RSP) of the second change request message from another node.

Further, each member PCP/AP (including the candidate C-PCP/AP) that receives the second change request message (BPAC_UPDATE_REQ) starts the BF timer indicated by the message, and then performs BF training with a STA served by the C-PCP/AP that is about to leave. When the BF timer indicated by the second change request message expires, the node that receives the second change request sends BPAC_UPDATE_RSP to the central coordinator node.

Optionally, the response message of the second change request message includes station information (STA INFO).

Further, another node in the node cluster may perform beamforming training with the station served by the central coordinator node to establish a BF link. For example, the second node is used as a member node of the central coordinator node. A BF link may be established between the second node and the station served by the central coordinator node. When the central coordination function is changed from being performed by the central coordinator node to being performed by the candidate central coordinator node, the BF link is established between the member node and the station served by the central coordinator node, and station information of a station that has established a BF link with the member node is reported to the central coordinator node.

Optionally, when the central coordinator node receives response messages fed back by all member nodes in the node cluster, the central coordinator node may release a station that has not established a BF link with another node.

It may be understood that the central coordinator node may be switched to the inactive mode after leaving the node cluster.

Correspondingly, if the changed operation mode of the central coordinator node is inactive, a message format of the first change request message may include the following structures.

(a) transmitter AID/address/identifier: indicates the candidate C-PCP/AP

Manner A
(b) reason code num=1 or more reason codes=0
(c) reason code 1: PCP/AP mode change
(d) old AP mode 1: SC-AP or M-AP
(e) new AP mode 1: C-AP
(f) AP AID 1: AID of a candidate PCP/AP
(g) PCP/AP mode change num=2 // or more PCP/AP mode changes=1
(h) old AP mode 2: C-AP
(i) new AP mode 2: inactive
(j) AP AID 2: AID of a leaving C-PCP/AP
(k) // or more PCP/AP mode changes=0
(l) mode change effective time: is determined by mode change effective time in AP_MODE_CHANGE_REQ Manner A (in a Case in which PCP/AP Mode Change Num=1, that is, the C-PCP/AP is not Indicated Again to Leave)
(b) reason code num=1 or more reason codes=0
(c) reason code 1: PCP/AP mode change
(d) old AP mode 1: SC-AP or M-AP
(e) new AP mode 1: C-AP
(f) AP AID 1: AID of a candidate PCP/AP
(g) optionally, AP mode change num=1, or more PCP/AP mode changes=0
(h) mode change effective time: is determined by mode change effective time in AP_MODE_CHANGE_REQ Manner B
(a) reason code num=2 // or more reason codes=1
(b) reason code 1: PCP/AP mode change to C-AP
(c) new AP mode 1: is invalid or does not exist
(d) AP AID 1: AID of a candidate C-PCP/AP (e) reason code 2: PCP/AP leave (mode change to inactive)

(f) new AP mode 2: is invalid or does not exist (g) AP AID 2: AID of a leaving C-PCP/AP (h) // or more PCP/AP mode changes=0

(i) mode change effective time: is determined by mode change effective time in AP_MODE_CHANGE_REQ Manner B (in a Case in which Reason Code Num=1, that is, the C-PCP/AP is not Indicated Again to Leave)

(b) reason code num=1 or more reason codes=0

(c) reason code 1: PCP/AP mode change to C-AP (d) new AP mode 1: is invalid or does not exist (e) AP AID 1: AID of a candidate C-PCP/AP (f) mode change effective time: is determined by mode change effective time in AP_MODE_CHANGE_REQ Manner C (in a Case in which PCP/AP Mode Change Num=1, that is, the C-PCP/AP is not Indicated Again to Leave, the Embodiment is Shown in the Manner A and Details are not Described Again)

(a) reason code num=1 or more reason codes=0

(b) reason code 1: PCP/AP mode change (c) new AP mode 1: C-AP (d) AP AID 1: AID of a candidate PCP/AP (e) optionally, the following parameters are further included:

(f) PCP/AP mode change num=2 // or more PCP/AP mode changes=1

(g) reason code 2: PCP/AP leave (mode change to inactive)

(h) new AP mode 2: is invalid or does not exist (i) AP AID 2: AID of a leaving C-PCP/AP (j) // or more PCP/AP mode changes=0

(k) mode change effective time: is determined by mode change effective time in AP_MODE_CHANGE_REQ Manner D (in a Case in which PCP/AP Mode Change Num=1, that is, the C-PCP/AP is not Indicated Again to Leave, the Embodiment is Shown in the Manner A and Details are not Described Again)

(a) reason code num=1 or more reason codes=0

(b) reason code 1: PCP/AP mode change (c) new AP mode 1: C-AP (d) AP AID 1: AID of a candidate PCP/AP (e) optionally, the following parameters are further included:

(f) PCP/AP mode change num=2 // or more PCP/AP mode changes=1

(g) reason code 2: PCP/AP mode change (h) new AP mode 2: inactive (i) AP AID 2: AID of a leaving C-PCP/AP (j) // or more PCP/AP mode changes=0

(k) mode change effective time: is determined by mode change effective time in AP_MODE_CHANGE_REQ Manner E (in a Case in which Reason Code Num=1, that is, the C-PCP/AP is not Indicated Again to Leave, the Embodiment is Shown in the Manner B and Details are not Described Again)

(b) reason code num=2 // or more reason codes=1

(c) reason code 1: SC-AP to C-AP or M-AP to C-AP (d) AP AID 1: AID of a candidate C-PCP/AP (e) reason code 2: C-AP to inactive (f) AP AID 2: AID of a leaving C-PCP/AP (g) // or more PCP/AP mode changes=0

(h) mode change effective time: is determined by mode change effective time in AP_MODE_CHANGE_REQ For example, if the changed operation mode of the first central coordinator node is inactive, a format of the node operation mode switching message (AP_MODE_CHANGE_REQ) may be shown as follows:

(a) new AP mode=C-AP (b) mode change effective time (time for the candidate C-PCP/AP to enable the C-AP function)

(c) BPAC contexts (used by the candidate C-PCP/AP to get the BPAC contexts)

(d) optionally, C-PCP/AP next mode=inactive (next state of the old C-PCP/AP)

In a possible implementation, the changed operation mode of the first central coordinator node is an SC-AP mode or an M-AP mode.

Optionally, when the changed operation mode of the first central coordinator node is the SC-AP mode or the M-AP mode, the operation mode switching message of the node may be AP_MODE_CHANGE_REQ.

Specifically, a structure of AP_MODE_CHANGE_REQ may specifically include:

(a) new AP mode=C-AP (b) mode change effective time (time for the candidate C-PCP/AP to enable the C-AP function)

(c) BPAC contexts (used by the candidate C-PCP/AP to get the BPAC contexts)

(d) C-PCP/AP next mode=M-AP or SC-AP (next state of the old C-PCP/AP)

Optionally, after receiving AP_MODE_CHANGE_REQ, the candidate central coordinator node may start a timer based on the mode change effective time in AP_MODE_CHANGE_REQ, and sends the BPAC_UPDATE_REQ message to other PCPs/APs, to notify that the candidate central coordinator node is about to perform a C-PCP/AP function.

Correspondingly, if the changed operation mode of the central coordinator node is the SC-AP mode or the M-AP mode, a message format of the first change request message may include the following parameters:

(a) transmitter AID/address/identifier: indicates the candidate C-PCP/AP

Manner A (b) reason code num=1 or more reason codes=0

(c) reason code 1: PCP/AP mode change (d) old AP mode 1: SC-AP or M-AP (e) new AP mode 1: C-AP (f) AP AID 1: AID of a candidate PCP/AP (g) PCP/AP mode change num=2 // or more PCP/AP mode changes=1

(h) old AP mode 2: C-AP (i) new AP mode 2: SC-AP or M-AP (j) AP AID 2: AID of the C-PCP/AP (k) // or more PCP/AP mode changes=0

(l) mode change effective time: is determined by the mode change effective time in AP_MODE_CHANGE_REQ Manner B (b) reason code num=2 // or more reason codes=1

(c) reason code 1: PCP/AP mode change to C-AP (d) new AP mode 1: is invalid or does not exist (e) AP AID 1: AID of the candidate C-PCP/AP (f) reason code 2: PCP/AP mode change to M-AP or PCP/AP mode change to SC-AP (g) new AP mode 2: is invalid or does not exist (h) AP AID 2: AID of the C-PCP/AP (i) // or more PCP/AP mode changes=0

(j) mode change effective time: is determined by the mode change effective time in AP_MODE_CHANGE_REQ Manner C or Manner D (b) reason code num=1 or more reason codes=0

(c) reason code 1: PCP/AP mode change (d) new AP mode 1: C-AP
(e) AP AID 1: AID of a candidate PCP/AP
(f) PCP/AP mode change num=2 // or more PCP/AP mode changes=1
(g) reason code 2: PCP/AP mode change
(h) new AP mode 2: M-AP or SC-AP
(i) AP AID 2: AID of the C-PCP/AP
(j) // or more PCP/AP mode changes=0
(k) mode change effective time: is determined by the mode change effective time in AP_MODE_CHANGE_REQ Manner E
(b) reason code num=2 // or more reason codes=1
(c) reason code 1: SC-AP to C-AP or M-AP to C-AP
(d) AP AID 1: AID of a candidate C-PCP/AP
(e) reason code 2: C-AP to SC-AP or C-AP to M-AP
(f) AP AID 2: AID of the C-PCP/AP
(g) // or more PCP/AP mode changes=0
(h) mode change effective time: is determined by mode change effective time in AP_MODE_CHANGE_REQ It may be further understood that, when the candidate central coordinator node may be a node in the L-AP mode, a structure of the first change request message may be the same as a structure in which the candidate central coordinator node is a node in the SC-AP mode or a node in the M-AP mode, and only the SC-AP or the M-AP needs to be changed to the L-AP. Before the candidate C-PCP/AP (originally the L-AP) is switched to the C-AP mode, the candidate C-PCP/AP needs to release all legacy STAs (if any). To avoid repetition, details are not described herein.

In another embodiment, before the step 401, the candidate central coordinator node starts a second timer when receiving a detection message from the first central coordinator node, and determines that the first central coordinator node does not perform the central coordination function when the second timer expires.

Specifically, when performing the central coordination function, the first central coordinator node may first send the detection message to another node in the BPAC system. The other node may determine, based on whether the detection message is received, whether the first central coordinator node is active. For example, when receiving the detection message, the other node may start a timer (referred to as the "second timer" below). If the detection message is received before the second timer expires, it is considered that the first central coordinator node normally runs. If no detection message is received before the second timer expires, it is considered that the first central coordinator node has a fault or fails. In other words, the candidate central coordinator node may actively detect whether the first central coordinator node performs the central coordination function, and further determine whether the candidate central coordinator node can perform the central coordination function, thereby helping implement node switching for the central coordination function.

It may be understood that the candidate central coordinator node may be a node in the SC-AP mode or a node in the M-AP mode.

It may be further understood that the candidate central coordinator node may be a node in the L-AP mode.

Optionally, timing of the second timer may be obtained in the following manner:

a. Obtain a C-PCP/AP active timer base value and a C-PCP/AP active timer offset unit parameter from the last received BPAC_JOIN_RSP or BPAC_UPDATE_REQ (reason code=param change) message.
b. C-PCP/AP active timer offset=C-PCP/AP active timer offset unit*AP rank of the PCP/AP.

It should be noted that a manner of calculating the AP rank may be pre-defined (pre-defined), or an AP rank of each PCP/AP may be specified in the BPAC_JOIN_RSP or BPAC_UPDATE_REQ message.

c. Calculate a length of a C-PCP/AP active timer.

Length of C-PCP/AP active timer=C-PCP/AP active timer base value+C-PCP/AP active timer offset.

Optionally, the detection message may be any one of a BPAC discovery frame (discovery frame), a heartbeat message, and a BPAC management frame.

Specifically, the heartbeat message (HEART_BEAT_MSG) may include the transmitter identifier, the receiver identifier, and the message type. In a format of the heartbeat message, a sequence of the transmitter identifier, the receiver identifier, and the message type is not limited in this application. The transmitter identifier may be any one of the transmitter AID, the transmitter address, or the transmitter ID. The receiver identifier may be any one of a receiver AID, a receiver address, or a receiver ID.

It may be understood that the transmitter address may be a transmitter IP address, or may be a transmitter MAC address. The receiver address may be a receiver IP address, or may be a receiver MAC address.

It may be further understood that, if a transmitter performs sending in a broadcast manner, the receiver identifier may be any one of a broadcast AID, a broadcast address, or a broadcast ID. If a transmitter performs sending in a multicast manner, the receiver identifier may be any one of a multicast AID, a multicast address, or a multicast ID.

It may be understood that the broadcast AID may be used in a specific ID to indicate broadcast information. For example, AID=0 or AID=255.

In other words, the transmitter may separately send the heartbeat messages to different receivers, or may send the heartbeat message in a broadcast manner, or may send the heartbeat messages in a multicast manner, or may send the heartbeat messages in a parallel manner (for example, a DL MU-MIMO manner). This is not limited in this application.

Correspondingly, when the candidate central coordinator node may be the node in the SC-AP mode or the node in the M-AP mode, a structure of the first change request message may include the following parameters:

(a) transmitter AID/address/identifier: indicates the candidate C-PCP/AP

Manner A
(b) reason code num=1 or more reason codes=0
(c) reason code 1: PCP/AP mode change
(d) old AP mode 1: SC-AP or M-AP
(e) new AP mode 1: C-AP
(f) AP AID 1: AID of a candidate PCP/AP
(g) PCP/AP mode change num=2 // or more PCP/AP mode changes=1
(h) old AP mode 2: C-AP
(i) new AP mode 2: inactive
(j) AP AID 2: AID of a leaving C-PCP/AP
(k) // or more PCP/AP mode changes=0
(l) mode change effective time: effective time of a new PCP/AP Manner B
(b) reason code num=2 // or more reason codes=1
(c) reason code 1: PCP/AP mode change to C-AP
(d) new AP mode 1: is invalid or does not exist
(e) AP AID 1: AID of the candidate C-PCP/AP
(f) reason code 2: PCP/AP leave (mode change to inactive)

(g) new AP mode 2: is invalid or does not exist
(h) AP AID 2: AID of a leaving C-PCP/AP
(i) // or more PCP/AP mode changes=0
(j) mode change effective time: effective time of a new PCP/AP Manner C (b) reason code num=1 or more reason codes=0
(c) reason code 1: PCP/AP mode change
(d) new AP mode 1: C-AP
(e) AP AID 1: AID of a candidate PCP/AP
(f) optionally, the following parameters are further included:
(g) PCP/AP mode change num=2 // or more PCP/AP mode changes=1
(h) reason code 2: PCP/AP leave (mode change to inactive)
(i) new AP mode 2: is invalid or does not exist
(j) AP AID 2: AID of a leaving C-PCP/AP
(k) // or more PCP/AP mode changes=0
(l) mode change effective time: effective time of a new PCP/AP Manner D (b) reason code num=1 or more reason codes=0
(c) reason code 1: PCP/AP mode change
(d) new AP mode 1: C-AP
(e) AP AID 1: AID of a candidate PCP/AP
(f) optionally, the following parameters are further included:
(g) PCP/AP mode change num=2 // or more PCP/AP mode changes=1
(h) reason code 2: PCP/AP mode change
(i) new AP mode 2: inactive
(j) AP AID 2: AID of a leaving C-PCP/AP
(k) // or more PCP/AP mode changes=0
(l) mode change effective time: effective time of a new PCP/AP Manner E (b) reason code num=2 // or more reason codes=1
(c) reason code 1: SC-AP to C-AP or M-AP to C-AP
(d) AP AID 1: AID of the candidate C-PCP/AP
(e) reason code 2: C-AP to inactive
(f) AP AID 2: AID of a leaving C-PCP/AP
(g) // or more PCP/AP mode changes=0
(h) mode change effective time: effective time of a new PCP/AP It may be understood that, if mode change effective time included in BPAC_UPDATE_REQ=IMMEDIATE, the candidate PCP/AP is directly switched to the C-AP mode when sending the BPAC_UPDATE_REQ message to another member PCP/AP, and when receiving the BPAC_UPDATE_REQ message, the member PCP/AP knows that the PCP/AP that sends the message is in the C-AP mode.

It may be further understood that, when the candidate central coordinator node may be the node in the L-AP mode, the structure of the first change request message may be the same as a structure in which the candidate central coordinator node is the node in the SC-AP mode or the node in the M-AP mode, and only the SC-AP or the M-AP needs to be changed to the L-AP. Before the candidate C-PCP/AP (originally the L-AP) is switched to the C-AP mode, the candidate C-PCP/AP needs to release all legacy STAs (if any). To avoid repetition, details are not described herein.

In still another embodiment, before sending the operation mode switching message, the first central coordinator node may further send "BPAC_UPDATE_REQ" (second change request message) to all nodes in the node cluster, to indicate that the operation mode of the first central coordinator node is to be switched.

Specifically, if a C-PCP/AP (demoted C-PCP/AP) is to be switched to an L-AP mode for some reasons, and there is a PCP/AP in an SC-AP mode, the PCP/AP in the SC-AP mode is selected as a candidate PCP/AP in a BPAC management mechanism. If there is no PCP/AP in an SC-AP mode in a BPAC, a PCP/AP in an M-AP mode is selected as the candidate C-PCP/AP in a BPAC management mechanism. It should be noted that the candidate C-PCP/AP needs to establish BF links with all other member PCPs/APs at specified time before. Then, the C-PCP/AP sends the BPAC_UPDATE_REQ message to the selected candidate C-PCP/AP and all other member PCPs/APs, to indicate that the C-PCP/AP is about to leave.

It may be understood that the changed mode of the first central coordinator node is the L-AP mode. The candidate central coordinator node may be a node in the SC-AP mode or the M-AP mode.

Optionally, the central coordinator node may receive a response message (BPAC_UPDATE_RSP) of the second change request message from another node.

Specifically, each member PCP/AP (including the candidate C-PCP/AP) that receives the second change request message (BPAC_UPDATE_REQ) starts a BF timer indicated by the message, and then performs BF training with a STA served by the C-PCP/AP that is about to leave. When the BF timer indicated by the second change request message expires, a node that receives the second change request sends BPAC_UPDATE_RSP to the central coordinator node.

Optionally, the response message of the second change request message includes station information (STA INFO).

Further, another node in the node cluster may perform beamforming training with the station served by the central coordinator node, to establish a BF link. For example, the second node is used as a member node of the central coordinator node. A BF link may be established between the second node and the station served by the central coordinator node. When the central coordination function is changed from being performed by the central coordinator node to being performed by the candidate central coordinator node, the BF link is established between the member node and the station served by the central coordinator node, and station information of a station that has established a BF link with the member node is reported to the central coordinator node.

Optionally, when the central coordinator node receives response messages fed back by all member nodes in the node cluster, the central coordinator node may release a station that has not established a BF link with another node.

For example, a structure of BPAC_UPDATE_REQ may include the following parameters:

Manner A (h) reason code: PCP/AP mode change
(i) old AP mode: C-AP
(j) new AP mode: L-AP
(k) AP AID: AID of the demoted PCP/AP
(l) optionally, PCP/AP mode change num=1, or more PCP/AP mode changes=0
(m) BF timer (beamforming timer): a beamforming/beamforming training timer, where BF timer=0 indicates that BF training is not needed, for example, when the leaving PCP/AP does not serve any STA, a BF training process may be omitted
(n) STA INFO: information about a STA served by the demoted C-PCP/AP Manner B (f) reason code: PCP/AP mode change to L-AP (g) new AP mode: is invalid or does not exist (h) AP AID: AID of the demoted PCP/AP (i) BF timer (beamforming timer): a beamforming/beamforming training timer, where BF timer=0 indicates that BF training is not needed, for example, when the leaving PCP/AP does not serve any STA, a BF training process may be omitted (j) STA INFO: information about a STA served by the demoted C-PCP/AP Manner C (g) reason code: PCP/AP mode change (h) new AP mode: L-AP (i) AP AID: AID of the demoted PCP/AP (j) optionally, PCP/AP mode change num=1, or more PCP/AP mode changes=0

(k) BF timer (beamforming timer): a beamforming/beamforming training timer, where BF timer=0 indicates that BF training is not needed, for example, when the leaving PCP/AP does not serve any STA, a BF training process may be omitted (l) STA INFO: information about a STA served by the demoted C-PCP/AP Manner D (g) reason code: PCP/AP mode change (h) new AP mode: L-AP (i) AP AID: AID of the demoted PCP/AP (j) optionally, PCP/AP mode change num=1, or more PCP/AP mode changes=0

(k) BF timer (beamforming timer): a beamforming/beamforming training timer, where BF timer=0 indicates that BF training is not needed, for example, when the leaving PCP/AP does not serve any STA, a BF training process may be omitted (l) STA INFO: information about a STA served by the demoted C-PCP/AP Manner E (a) reason code: C-AP to L-AP (b) AP AID: AID of the demoted PCP/AP (c) mode change effective time (d) BF timer (beamforming timer): a beamforming/beamforming training timer, where BF timer=0 indicates that BF training is not needed, for example, when the leaving PCP/AP does not serve any STA, a BF training process may be omitted.

(e) STA INFO: information about a STA served by the demoted C-PCP/AP

Correspondingly, the AP_MODE_CHANGE_REQ message includes the following parameters:

(a) new AP mode=C-AP (b) mode change effective time (time for the candidate C-PCP/AP to enable the C-AP function)

(c) BPAC contexts (used by the candidate C-PCP/AP to get the BPAC contexts)

(d) optionally, C-PCP/AP next mode=L-AP (next state of the old C-PCP/AP)

After sending the BPAC_UPDATE_REQ message, the first central coordinator node receives the response message (BPAC_UPDATE_RSP) of BPAC_UPDATE_REQ. BPAC_UPDATE_RSP includes as follows.

(b) STA INFO: information about a STA that is originally served by the leaving PCP/AP and that has established a BF link with the member PCP/AP When the demoted C-PCP/AP receives BPAC_UPDATE_RSP from all member PCPs/APs (including the candidate PCP/AP), the demoted C-PCP/AP releases a STA (if any) that has not established BF links with other PCPs/APs. Then, the demoted C-PCP/AP determines effective time at which the candidate PCP/AP performs a C-PCP/AP function, and sends the AP_MODE_CHANGE_REQ message to the candidate C-PCP/AP. The AP_MODE_CHANGE_REQ message includes the following parameters.

(a) new AP mode=C-AP (b) mode change effective time (time for the candidate C-PCP/AP to enable the C-AP function)

(c) BPAC contexts (used by the candidate C-PCP/AP to get the BPAC contexts)

(d) optionally, C-PCP/AP next mode=L-AP (next state of the old C-PCP/AP)

Optionally, after receiving the AP_MODE_CHANGE_REQ message, the candidate central coordinator node starts a timer (BF timer) based on the mode change effective time in the message, and sends the BPAC_UPDATE_REQ message to other member PCPs/APs, to notify that the candidate central coordinator node is about to perform the C-PCP/AP function. In addition, when the candidate central coordinator node receives response messages (BPAC_UPDATE_RSP) of the first change request messages of all the member PCPs/APs, the candidate central coordinator node sends an AP_MODE_CHANGE_RSP message to the first central coordinator node (that is, the demoted C-PCP/AP).

Optionally, the first change request message in the step 401 may include the following parameters.

(m) transmitter AID/address/identifier: indicates the candidate C-PCP/AP

Manner A (n) reason code num=1 or more reason codes=0

(o) reason code 1: PCP/AP mode change (p) old AP mode 1: SC-AP or M-AP (q) new AP mode 1: C-AP (r) AP AID 1: AID of a candidate PCP/AP (s) PCP/AP mode change num=2 // or more PCP/AP mode changes=1

(t) old AP mode 2: C-AP (u) new AP mode 2: L-AP (v) AP AID 2: AID of the demoted C-PCP/AP (w) // or more PCP/AP mode changes=0

(x) mode change effective time: is determined by the mode change effective time in AP_MODE_CHANGE_REQ Manner A (in a Case in which PCP/AP Mode Change Num=1, that is, the C-PCP/AP is not Indicated Again to Become the L-AP)

(i) reason code num=1 or more reason codes=0

(j) reason code 1: PCP/AP mode change (k) old AP mode 1: SC-AP or M-AP (l) new AP mode 1: C-AP (m) AP AID 1: AID of a candidate PCP/AP (n) optionally, AP mode change num=1, or more PCP/AP mode changes=0

Manner B (j) reason code num=2 // or more reason codes=1

(k) reason code 1: PCP/AP mode change to C-AP (l) new AP mode 1: is invalid or does not exist (m) AP AID 1: AID of the candidate C-PCP/AP (n) reason code 2: PCP/AP mode change to L-AP (o) new AP mode 2: is invalid or does not exist (p) AP AID 2: AID of the demoted C-PCP/AP (q) // or more PCP/AP mode changes=0

(r) mode change effective time: is determined by the mode change effective time in AP_MODE_CHANGE_REQ Manner B (in a Case in which Reason Code Num=1, that is, the C-PCP/AP is not Indicated Again to Become the L-AP)

(g) reason code num=1 or more reason codes=0
(h) reason code 1: PCP/AP mode change to C-AP
(i) new AP mode 1: is invalid or does not exist
(j) AP AID 1: AID of the candidate C-PCP/AP
(k) mode change effective time: is determined by the mode change effective time in AP_MODE_CHANGE_REQ Manner C (in a Case in which PCP/AP Mode Change Num=1, that is, the C-PCP/AP is not Indicated Again to Become the L-AP, the Embodiment is Shown in the Manner A and Details are not Described Again)

(l) reason code num=1 or more reason codes=0
(m) reason code 1: PCP/AP mode change
(n) new AP mode 1: C-AP
(o) AP AID 1: AID of a candidate PCP/AP
(p) optionally, the following parameters are further included:
(q) PCP/AP mode change num=2 // or more PCP/AP mode changes=1
(r) reason code 2: PCP/AP mode change
(s) new AP mode 2: L-AP
(t) AP AID 2: AID of the demoted C-PCP/AP
(u) // or more PCP/AP mode changes=0
(v) mode change effective time: is determined by the mode change effective time in AP_MODE_CHANGE_REQ Manner D (in a Case in which PCP/AP Mode Change Num=1, that is, the C-PCP/AP is not Indicated Again to Become the L-AP, the Embodiment is Shown in the Manner A and Details are not Described Again)

(l) reason code num=1 or more reason codes=0
(m) reason code 1: PCP/AP mode change
(n) new AP mode 1: C-AP
(o) AP AID 1: AID of a candidate PCP/AP
(p) optionally, the following parameters are further included:
(q) PCP/AP mode change num=2 // or more PCP/AP mode changes=1
(r) reason code 2: PCP/AP mode change
(s) new AP mode 2: L-AP
(t) AP AID 2: AID of the demoted C-PCP/AP
(u) // or more PCP/AP mode changes=0
(v) mode change effective time: is determined by the mode change effective time in AP_MODE_CHANGE_REQ Manner E (in a Case in which Reason Code Num=1, that is, the C-PCP/AP is not Indicated Again to Become the L-AP, the Embodiment is Shown in the Manner B and Details are not Described Again)

(h) reason code num=2 // or more reason codes=1
(i) reason code 1: SC-AP to C-AP or M-AP to C-AP
(j) AP AID 1: AID of the candidate C-PCP/AP
(k) reason code 2: C-AP to L-AP
(l) AP AID 2: AID of the demoted C-PCP/AP
(m) // or more PCP/AP mode changes=0
(n) mode change effective time: is determined by the mode change effective time in AP_MODE_CHANGE_REQ Optionally, each member PCP/AP that receives the first change request message (BPAC_UPDATE_REQ) starts a timer based on the mode change effective time, and replies the response message (BPAC_UPDATE_RSP) of the first change request message to the candidate central coordinator node.

It may be further understood that, when the changed mode of the central coordinator node is the L-AP mode, the structure of the first change request message may be the same as a structure in which the central coordinator node is the node in the SC-AP mode or the node in the M-AP mode, and only the SC-AP or the M-AP needs to be changed to the L-AP. Before the candidate C-PCP/AP (originally the L-AP) is switched to the C-AP mode, the candidate C-PCP/AP needs to release all legacy STAs (if any). To avoid repetition, details are not described herein.

402: The candidate central coordinator node receives a change request response message (BPAC_UPDATE_RSP) of the first change request from the second node of the other nodes. The change request response message of the first change request indicates that the second node receives the first change request message.

Further, each node that receives the first change request message may feed back the change request response message to the candidate central coordinator node.

Optionally, the change request response message includes the transmitter identifier, the receiver identifier, and the message type.

Further, the first change request message sent to the second node is used as an example. In the embodiment shown in FIG. 4, the transmitter identifier in the change request response message is an identifier of the second node, and the receiver identifier is an identifier of the candidate central coordinator node. The message type is that the message is used to feed back the first change request message.

It may be understood that the identifier of the node may be any one of an AID, an address, or an ID.

403: The candidate central coordinator node performs the central coordination function when the change request response message from each of the other nodes is received.

Optionally, the candidate central coordinator node may start a first timer when it is determined that the first central coordinator node does not perform the central coordination function. In this way, the step 403 may be further that the candidate central coordinator node performs the central coordination function when the change request response message from each of the other nodes is received and the first timer expires.

It may be understood that a specified duration of the first timer may be agreed upon in advance.

It may be further understood that the candidate central coordinator node may immediately start the first timer when it is determined that the first central coordinator node does not perform the central coordination function, or may start the first timer after a preset time threshold. This is not limited in this application. For example, the step 401 and the candidate central coordinator node starting the first timer may be performed at a same moment.

Figure 9:
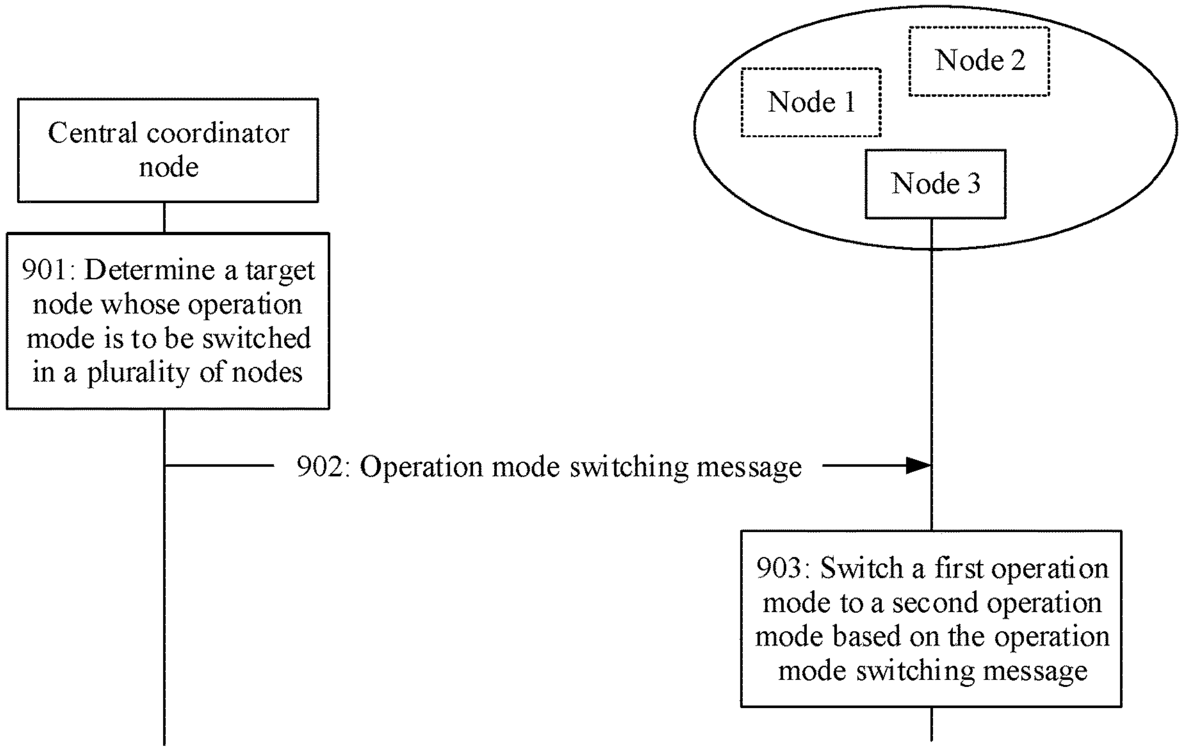
FIG. 9 is a schematic flowchart of operation mode switching according to an embodiment of this application.

FIG. 9 is a schematic flowchart of operation mode switching according to an embodiment of this application.

FIG. 9 may be applied to a system including a plurality of nodes and a central coordinator node. There is a communication channel between each of the plurality of nodes and the central coordinator node. The system may be the systems shown in FIG. 3 and FIG. 5 to FIG. 8. This is not limited in this application.

901: The central coordinator node determines a target node whose operation mode is to be switched in the plurality of nodes.

Further, a BPAC management mechanism may determine that a PCP/AP (referred to as the "target node" below) originally in an SC-AP mode needs to be changed to an M-AP mode, and notify the center coordinator node. Alternatively, the central coordinator node determines the target node whose operation mode is to be switched.

It should be noted that a candidate C-PCP/AP needs to establish BF links with all other member PCPs/APs at specified time before.

It may be understood that there may be one or more target nodes. This is not limited in this application. For ease of description, the following uses an example in which the target node is one node for description. For example, the target node may be a node 3 in FIG. 9.

902: The target node receives an operation mode switching message from the central coordinator node. The operation mode switching message indicates the target node to be switched from a first operation mode to a second operation mode. Correspondingly, the central coordinator node sends the operation mode switching message to the target node.

Further, the central coordinator node sends the operation mode switching message (AP_MODE_CHANGE_REQ) to the target node. The operation mode switching message indicates the target node to be switched from the first operation mode to the second operation mode.

Optionally, the operation mode switching message may include a transmitter identifier, a receiver identifier, and a message type.

Further, in the embodiment shown in FIG. 9, the transmitter identifier is an identifier of the central coordinator node, and the receiver identifier is an identifier of the target node. The message type may be used by the target node to identify, after receiving this message, that this message is the operation mode switching message.

Optionally, the operation mode switching message may further include a new operation mode, effective time of mode switching, and context parameters of the plurality of nodes.

Further, in the embodiment shown in FIG. 9, the new operation mode is the second operation mode, and the effective time of mode switching is effective time at which the target node uses the second operation mode. The context parameters of the plurality of nodes may be configuration parameters of a node cluster in which the plurality of nodes is located, all nodes currently included in the node cluster, and information about a station that can be served by the node cluster.

Optionally, the first operation mode is a backup central coordinator node mode. The second operation mode is a member node mode.

Further, the operation mode of the target node may be switched from the backup central coordinator node mode to the member node mode.

Optionally, the first operation mode is a backup central coordinator node mode. The second operation mode is a central coordinator node mode.

Optionally, the first operation mode is the backup central coordinator node mode. The second operation mode is a mode of a node that performs a function of an earlier version.

Further, the operation mode of the target node may be switched from the backup central coordinator node mode to the mode of a node that performs a function of an earlier version.

For example, when a C-PCP/AP has a fault, or it is determined, in a management procedure of the node cluster, to upgrade a PCP/AP in an SC-AP mode to a C-AP mode, the PCP/AP in the SC-AP mode is switched to the C-AP mode.

When it is determined, in a management procedure of the node cluster, to hand over a backup function of a PCP/AP in an SC-AP mode to another PCP/AP (for example, a new PCP/AP is selected to the SC-AP mode), the PCP/AP in the SC-AP mode is switched to an M-AP mode.

When it is determined, in a management procedure of the node cluster if necessary, to hand over a backup function of a PCP/AP in an SC-AP mode to another node (for example, a new PCP/AP is selected to the SC-AP mode), and to switch the PCP/AP to an L-AP mode to serve an earlier-version STA, the PCP/AP in the SC-AP mode is switched to the L-AP mode.

When a node in an SC-AP mode hands over a backup function to another node in the SC-AP mode, releases the backup function, has a fault, or is released by the node cluster, the node is switched from the SC-AP mode to an inactive mode.

Optionally, the first operation mode is a member node mode. The second operation mode is a mode of a node that performs a function of an earlier version.

Further, the operation mode of the target node may be switched from the member node mode to the mode of a node that performs a function of an earlier version.

Optionally, the first operation mode is a member node mode. The second operation mode is a central coordinator node mode.

Optionally, the first operation mode is a member node mode. The second operation mode is a backup central coordinator node mode.

Further, the operation mode of the target node may be switched from the member node mode to the backup central coordinator node mode.

For example, when a C-PCP/AP has a fault, or it is determined, in a management procedure of the node cluster, to upgrade a PCP/AP in an M-AP mode to a C-AP mode, a node in the M-AP mode is switched to the C-AP mode.

When it is determined, in a management procedure of the node cluster, to provide a backup function to a node in an M-AP mode, the node in the M-AP mode is switched to an SC-AP mode.

When it is determined, in a management procedure of the node cluster if necessary, to switch a PCP/AP in an M-AP mode to an L-AP mode to serve an earlier-version STA, a node in the M-AP mode is switched to the L-AP mode.

When a node in an M-AP mode has a fault or is released by the node cluster, the node is switched from the M-AP mode to an inactive mode.

Optionally, the first operation mode is a mode of a node that performs a function of an earlier version. The second operation mode is a central coordinator node mode.

Optionally, the first operation mode is a mode of a node that performs a function of an earlier version. The second operation mode is a backup central coordinator node mode.

Optionally, the first operation mode is a mode of a node that performs a function of an earlier version. The second operation mode is a member node mode.

For example, when a node in an L-AP mode establishes a new node cluster, or when a C-PCP/AP has a fault, or when it is determined, in a management procedure of the node cluster, to upgrade a PCP/AP in the L-AP mode to a C-AP mode, the PCP/AP is switched from the L-AP mode the C-AP mode.

When it is determined, in a management procedure of the node cluster, to switch a node in an L-AP mode to an M-AP mode, a PCP/AP in the L-AP mode is switched to the M-AP mode.

When a node in an L-AP mode has a fault or is released by the node cluster, the node is switched from the L-AP mode to an inactive mode.

Optionally, the first operation mode is a central coordinator node mode. The second operation mode is a backup central coordinator node mode.

Optionally, the first operation mode is a central coordinator node mode. The second operation mode is a mode of a node that performs a function of an earlier version.

Optionally, the first operation mode is a central coordinator node mode. The second operation mode is a member node mode.

For example, when a node in a C-AP mode hands over coordination rights and all association information of the node cluster to another node and obtains/has a backup function (for example, a C-PCP/AP exchanges a function with a PCP/AP in an SC-AP mode), the node is switched from the C-AP mode to the SC-AP mode.

When a node in a C-AP mode hands over coordination rights and all association information of the node cluster to another node, (for example, when it is determined, in a management procedure of the node cluster, to select another PCP/AP as a C-PCP/AP), has no backup function, and does not serve an earlier-version STA, an original C-PCP/AP is switched from the C-AP mode to an M-AP mode.

When a node in a C-AP mode hands over coordination rights and all association information of the node cluster to another PCP/AP and starts to serve an earlier-version STA, the original C-PCP/AP is switched from the C-AP mode to an L-AP mode.

When a node in a C-AP mode hands over coordination rights and all association information of the node cluster to another node, has a fault, or is released by the node cluster, the node is switched from the C-AP mode to an inactive mode.

For another example, when a C-PCP/AP has a fault, or it is determined, in a management procedure of the node cluster, to upgrade a PCP/AP in an SC-AP mode to a C-AP mode, the PCP/AP in the SC-AP mode is switched to the C-AP mode.

When a C-PCP/AP has a fault, or it is determined, in a management procedure of the node cluster, to upgrade a PCP/AP in an M-AP mode to a C-AP mode, the PCP/AP in the M-AP mode is switched to the C-AP mode.

When a PCP/AP in an L-AP mode establishes a new node cluster, or when a C-PCP/AP has a fault, or when it is determined, in a management procedure of the node cluster, to upgrade a PCP/AP in the L-AP mode to a C-AP mode, the PCP/AP is switched from the L-AP mode the C-AP mode.

When a PCP/AP in an inactive mode establishes a new node cluster, the PCP/AP is switched from the inactive mode a C-AP mode.

Alternatively, when a PCP/AP in a C-AP mode hands over coordination rights and all association information of the node cluster to another PCP/AP and obtains/has a backup function (for example, the C-PCP/AP exchanges a function with a PCP/AP in an SC-AP mode), the PCP/AP is switched from the C-AP mode to the SC-AP mode.

When it is determined, in a management procedure of the node cluster, to provide a backup function to a PCP/AP in an M-AP mode, the PCP/AP in the M-AP mode is switched to an SC-AP mode.

Alternatively, when a PCP/AP in a C-AP mode hands over coordination rights and all association information of the node cluster to another PCP/AP (for example, when it is determined, in a management procedure of the node cluster, to select another PCP/AP as a C-PCP/AP), has no backup function, and does not serve an earlier-version STA, an original C-PCP/AP is switched from the C-AP mode to an M-AP mode.

When it is determined, in a management procedure of the node cluster, to hand over a backup function of a PCP/AP in an SC-AP mode to another PCP/AP (for example, a new PCP/AP is selected to the SC-AP mode), the PCP/AP in the SC-AP mode is switched to an M-AP mode.

When it is determined, in a management procedure of the node cluster, to switch a PCP/AP in an L-AP mode to an M-AP mode, the PCP/AP in the L-AP mode is switched to the M-AP mode.

When a PCP/AP in an inactive mode joins a node cluster but is not in an L-AP mode, the PCP/AP is switched from the inactive mode to an M-AP mode.

Alternatively, when a PCP/AP in a C-AP mode hands over coordination rights and all association information of the node cluster to another PCP/AP and starts to serve an earlier-version STA, the original C-PCP/AP is switched from the C-AP mode to an L-AP mode.

When it is determined, in a management procedure of the node cluster if necessary, to hand over a backup function of a PCP/AP in an SC-AP mode to another PCP/AP (for example, a new PCP/AP is selected to the SC-AP mode), and to switch the PCP/AP to an L-AP mode to serve an earlier-version STA, the PCP/AP in the SC-AP mode is switched to the L-AP mode.

When it is determined, in a management procedure of the node cluster if necessary, to switch a PCP/AP in an M-AP mode to an L-AP mode to serve an earlier-version STA, the PCP/AP in the M-AP mode is switched to the L-AP mode.

When a PCP/AP in an inactive mode joins a node cluster and starts to serve an earlier-version STA, the PCP/AP is switched from the inactive mode to an L-AP mode.

903: The target node is switched from the first operation mode to the second operation mode based on the operation mode switching message.

Further, when it is determined by the system to switch the operation mode of the target node, the central coordinator node may send the operation mode switching message to the target node. Alternatively, the central coordinator node may directly determine to switch the operation mode of the target node. In this way, when the operation mode switching message sent by the central coordinator node is received, the target node may be switched from the first operation mode to the second operation mode, thereby implementing operation mode switching of the node.

Optionally, when the operation mode switching message is received, the target node may start a first timer. The operation mode switching message may carry the effective time of the second operation mode. In this way, when the first timer reaches the effective time, the target node is switched from the first operation mode to the second operation mode. In other words, the central coordinator node may adjust time of operation mode switching of the target node, thereby improving flexibility of adjusting mode switching of the target node by the central coordinator node.

It may be understood that the effective time may be becoming effective immediately (immediate). To be specific, the target node is immediately switched from the first operation mode to the second operation mode after receiving the operation mode switching message.

Optionally, after the step 902, the target node may further send an operation mode switching response message to the central coordinator node. The operation mode switching response message is used to notify the central coordinator node that the target node is to be switched from the first operation mode to the second operation mode.

Optionally, after the step 902 or the step 903, the target node may send an operation mode switching response message (AP_MODE_CHANGE_RSP) to the central coordinator node. In this way, the central coordinator node may learn that the target node is to be switched from the first operation mode to the second operation mode.

Optionally, the central coordinator node may send a change request message (BPAC_UPDATE_REQ) to another node in the plurality of nodes such that the other node learns of operation mode switching of the target node.

In a possible implementation, the central coordinator node may directly send the change request message to the other node in the plurality of nodes. In other words, the central coordinator node may directly send the change request message without performing the foregoing steps 901 to 903 and/or other steps. For example, the central coordinator node may actively or directly send the change request message periodically. This is not limited in this application.

In another possible implementation, the central coordinator node may send the change request message after AP_MODE_CHANGE_RSP is received.

It may be understood that content or a format of the change request message may be each message format in the change request message in the foregoing "details of messages exchanged between nodes", or may be the same as content or a format of the first change request message in the embodiment shown in FIG. 4.

It may be understood that the central coordinator node starts a timer 1 when sending the operation mode switching message to the target node, or starts a timer 2 when receiving the operation mode switching response message, or starts a timer 3 when sending a notification message to another node. In this way, the central coordinator node may determine that the target node has been switched from the first operation mode to the second operation mode when the timer expires. Time of the timer 1, the timer 2, and the timer 3 may be preset. The time of the timer may be a moment, or may be a period of time.

It may be further understood that the change request message in the embodiment shown in FIG. 9 may be similar to or the same as the first change request message shown in FIG. 4. When there is no logical contradiction, the change request message in FIG. 9 may be combined with any content in the first change request message in FIG. 4.

It may be further understood that the other node may alternatively start a timer 4 when receiving the change request message. In this way, when the timer expires, it is determined that the target node has been switched from the first operation mode to the second operation mode. Time of the timer 4 may be preset.

Optionally, each member PCP/AP that receives the change request message (BPAC_UPDATE_REQ) starts a timer based on mode change effective time, and replies a response message (BPAC_UPDATE_RSP) of the change request message to the central coordinator node.

Optionally, if the first operation mode is the SC-AP mode or the M-AP mode, and the second operation mode is the L-AP mode, after the AP_MODE_CHANGE_RSP message is sent to the C-PCP/AP, a demoted PCP/AP sends a broadcast/unicast/multicast message to a STA served by the demoted PCP/AP, to indicate another PCP/AP in a PCP/AP cluster (for example, a BPAC) and the STA served by the demoted PCP/AP to perform BF training.

It should be noted that, if some STAs served by the demoted PCP/AP originally have BF links with another PCP/AP, the STAs do not need to perform BF training. In addition, after a new BF link is established, the STA served by the demoted PCP/AP may notify the demoted PCP/AP and delete BF information with the demoted PCP/AP (or delete old BF information after a timer expires).

If the first operation mode is the SC-AP mode and the second operation mode is the M-AP mode, there may be a plurality of cases for the message format of the change request message as follows:

Manner A (a) reason code: PCP/AP mode change
(b) old AP mode: SC-AP
(c) new AP mode: M-AP
(d) AP AID: AID of the demoted PCP/AP
(e) optionally, PCP/AP mode change num=1, or more PCP/AP mode changes=0
(f) mode change effective time Manner B (a) reason code: PCP/AP mode change to M-AP
(b) new AP mode: is invalid or does not exist
(c) AP AID: AID of the demoted PCP/AP
(d) mode change effective time Manners C and D (a) reason code: PCP/AP mode change
(b) new AP mode: M-AP
(c) AP AID: AID of the demoted PCP/AP
(d) optionally, PCP/AP mode change num=1, or more PCP/AP mode changes=0
(e) mode change effective time Manner E (a) reason code: SC-AP to M-AP
(b) AP AID: AID of the demoted PCP/AP
(c) mode change effective time If the first operation mode is the SC-AP mode or the M-AP mode, and the second operation mode is the L-AP mode, there may be a plurality of cases for the message format of the change request message as follows:

Manner A (a) reason code: PCP/AP mode change
(b) old AP mode: M-AP or SC-AP
(c) new AP mode: L-AP
(d) AP AID: AID of the demoted PCP/AP
(e) optionally, PCP/AP mode change num=1, or more PCP/AP mode changes=0
(f) mode change effective time
(g) BF timer (beamforming timer): a beamforming/beamforming training timer (note: a value of the BF timer may be different from a value of a BF timer in AP_MODE_CHANGE_REQ in step 1, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP)
(h) STA INFO: information about the STA served by the demoted PCP/AP Manner B (a) reason code: PCP/AP mode change to L-AP
(b) new AP mode: is invalid or does not exist
(c) AP AID: AID of the demoted PCP/AP
(d) mode change effective time
(e) BF timer (beamforming timer): a beamforming/beamforming training timer (note: a value of the BF timer may be different from a value of a BF timer in AP_MODE_CHANGE_REQ in step 1, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP)

(f) STA INFO: information about the STA served by the demoted PCP/AP

Manner C (a) reason code: PCP/AP mode change (b) new AP mode: L-AP (c) AP AID: AID of the demoted PCP/AP (d) optionally, PCP/AP mode change num=1, or more PCP/AP mode changes=0

(e) mode change effective time (f) BF timer (beamforming timer): a beamforming/beamforming training timer (note: a value of the BF timer may be different from a value of a BF timer in AP_MODE_CHANGE_REQ in step 1, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP)

(g) STA INFO: information about the STA served by the demoted PCP/AP

Manner D (a) reason code: PCP/AP mode change (b) new AP mode: L-AP (c) AP AID: AID of the demoted PCP/AP (d) optionally, PCP/AP mode change num=1, or more PCP/AP mode changes=0

(e) mode change effective time (f) BF timer (beamforming timer): a beamforming/beamforming training timer (note: a value of the BF timer may be different from a value of a BF timer in AP_MODE_CHANGE_REQ in step 1, and depends on sending time of BPAC_UPDATE_REQ) BF timer=0 indicates that BF training is not needed. For example, when the demoted PCP/AP does not serve any STA, a BF training process may be omitted (the C-PCP/AP learns a number of STAs that are not served by the demoted PCP/AP).

(g) STA INFO: information about the STA served by the demoted PCP/AP

Manner E (a) reason code: M-AP to L-AP or SC-AP to L-AP (b) AP AID: AID of a leaving PCP/AP (c) mode change effective time (d) BF timer (beamforming timer): a beamforming/beamforming training timer (note: a value of the BF timer may be different from a value of a BF timer in AP_MODE_CHANGE_REQ in step 1, and depends on sending time of BPAC_UPDATE_REQ) BF timer=0 indicates that BF training is not needed. For example, when the demoted PCP/AP does not serve any STA, a BF training process may be omitted (the C-PCP/AP learns a number of STAs that are not served by the demoted PCP/AP)

(e) STA INFO: information about the STA served by the demoted PCP/AP

If the first operation mode is the M-AP mode and the second operation mode is the SC-AP mode, there may be a plurality of cases for the message format of the change request message as follows:

Manner A (a) reason code: PCP/AP mode change (b) old AP mode: M-AP (c) new AP mode: SC-AP (d) AP AID: AID of a promoted PCP/AP (e) optionally, PCP/AP mode change num=1, or more PCP/AP mode changes=0

(f) mode change effective time

Manner B (a) reason code: PCP/AP mode change to SC-AP (b) new AP mode: is invalid or does not exist (c) AP AID: AID of a promoted PCP/AP (d) mode change effective time Manners C and D (a) reason code: PCP/AP mode change (b) new AP mode: SC-AP (c) AP AID: AID of a promoted PCP/AP (d) optionally, PCP/AP mode change num=1, or more PCP/AP mode changes=0

(e) mode change effective time

Manner E (a) reason code: M-AP to SC-AP (b) AP AID: AID of the demoted PCP/AP (c) mode change effective time FIG. 10 is a schematic flowchart of an operation mode switching method according to another embodiment of this application.

Figure 10:
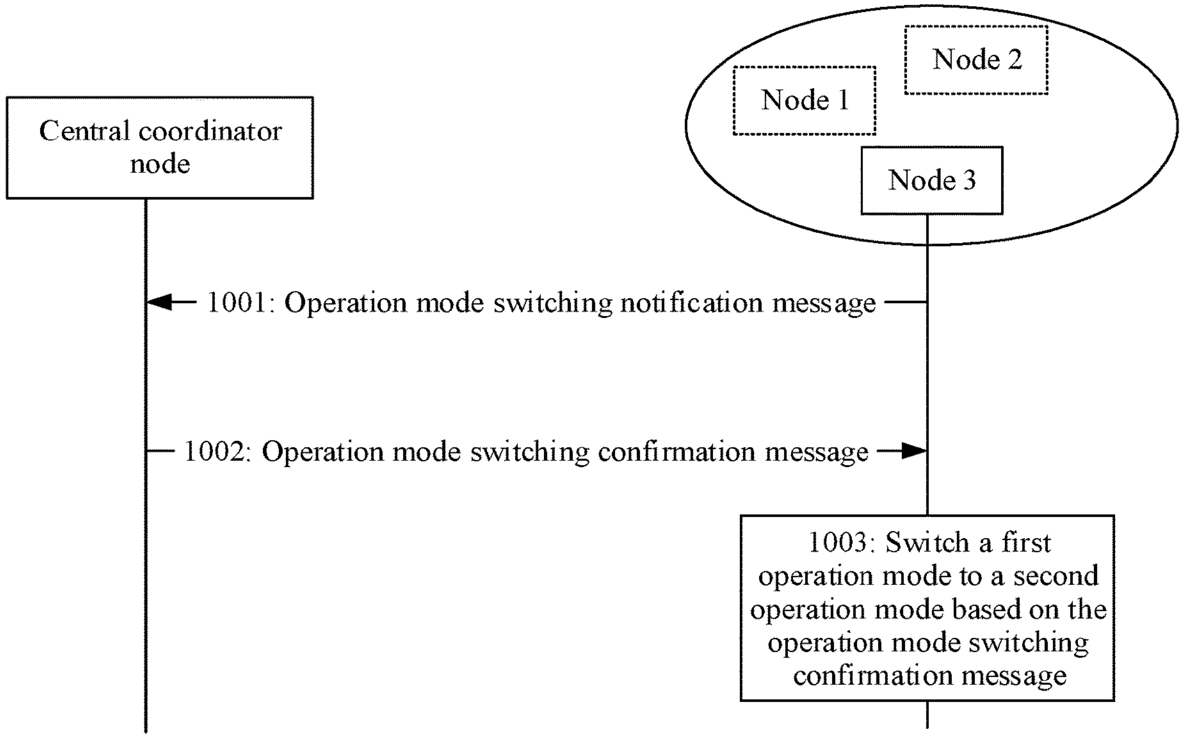
FIG. 10 is a schematic flowchart of an operation mode switching method according to another embodiment of this application.

FIG. 10 may be applied to a system including a plurality of nodes and a central coordinator node. There is a communication channel between each of the plurality of nodes and the central coordinator node. The system may be the systems shown in FIG. 3 and FIG. 5 to FIG. 8. This is not limited in this application.

1001: A target node sends an operation mode switching notification message to the central coordinator node. The operation mode switching notification message indicates that the target node requests to be switched from a first operation mode to a second operation mode. Correspondingly, the central coordinator node receives the operation mode switching notification message from the target node.

Specifically, a node (namely, the target node) in the plurality of nodes may autonomously determine to perform mode switching, and send the operation mode switching notification message (AP MODE CHANGE IND) to the central coordinator node, to notify the central coordinator node that the central coordinator node is to be switched from the first operation mode to the second operation mode. For example, the operation mode switching request message includes the second operation mode.

Optionally, the operation mode switching notification message includes a transmitter identifier, a receiver identifier, a message type, and an identifier of the second operation mode.

Specifically, in the embodiment shown in FIG. 10, the transmitter identifier may be an identifier of the target node, and the receiver identifier may be an identifier of the central coordinator node.

Optionally, the first operation mode is a backup central coordinator node mode. The second operation mode is a member node mode.

Further, an operation mode of the target node may be switched from the backup central coordinator node mode to the member node mode.

Optionally, the first operation mode is a backup central coordinator node mode. The second operation mode is a central coordinator node mode.

Optionally, the first operation mode is the backup central coordinator node mode. The second operation mode is a mode of a node that performs a function of an earlier version.

Further, the operation mode of the target node may be switched from the backup central coordinator node mode to the mode of a node that performs a function of an earlier version.

Optionally, the first operation mode is a member node mode. The second operation mode is a mode of a node that performs a function of an earlier version.

Further, the operation mode of the target node may be switched from the member node mode to the mode of a node that performs a function of an earlier version.

Optionally, the first operation mode is a member node mode. The second operation mode is a central coordinator node mode.

Optionally, the first operation mode is a member node mode. The second operation mode is a backup central coordinator node mode.

Optionally, the first operation mode is a mode of a node that performs a function of an earlier version. The second operation mode is a member node mode.

Optionally, the first operation mode is a central coordinator node mode. The second operation mode is a backup central coordinator node mode.

Optionally, the first operation mode is a central coordinator node mode. The second operation mode is a mode of a node that performs a function of an earlier version.

Optionally, the first operation mode is a central coordinator node mode. The second operation mode is a member node mode.

1002: The target node receives an operation mode switching confirmation message from the central coordinator node. The operation mode switching confirmation message indicates that the central coordinator node receives the operation mode switching notification message. Correspondingly, the central coordinator node sends the operation mode switching confirmation message to the target node.

Further, after receiving the operation mode switching request, the central coordinator node sends the operation mode switching confirmation message (AP_MODE_CHANGE_CFM) to the target node.

Optionally, the operation mode switching confirmation message includes effective time of the second operation mode and context parameters of the plurality of nodes.

1003: The target node is switched from the first operation mode to the second operation mode based on the operation mode switching confirmation message.

Further, the target node may be switched from the first operation mode to the second operation mode after receiving the operation mode switching confirmation message.

Optionally, the central coordinator node may send a change request message to another node other than the target node in the plurality of nodes, to notify the other node that the target node is to be switched from the first operation mode to the second operation mode, and request a node to change a node parameter.

In a possible implementation, the central coordinator node may directly send the change request message to the other node in the plurality of nodes. In other words, the central coordinator node may directly send the change request message without performing the foregoing steps 1001 to 1003 and/or other steps. For example, the central coordinator node may actively or directly send the change request message periodically. This is not limited in this application.

In another possible implementation, after receiving the operation mode switching confirmation message, the central coordinator node may send the change request message to the other node in the plurality of nodes. For example, the central coordinator node may send the change request message after performing the step 1002 or after performing the step 1003.

It may be understood that content or a format of the change request message may be each message format in the change request message in the foregoing "details of messages exchanged between nodes", or may be the same as content or a format of the first change request message in the embodiment shown in FIG. 4.

Optionally, each member PCP/AP that receives the change request message (BPAC_UPDATE_REQ) starts a timer based on mode change effective time, and replies a response message (BPAC_UPDATE_RSP) of the change request message to the central coordinator node.

Optionally, if the first operation mode is an SC-AP mode or an M-AP mode, and the second operation mode is an L-AP mode, after the AP_MODE_CHANGE_CFM message is sent to a C-PCP/AP, a demoted PCP/AP sends a broadcast/unicast/multicast message to a STA served by the demoted PCP/AP, to indicate another PCP/AP in a PCP/AP cluster (for example, a BPAC) and the STA served by the demoted PCP/AP to perform BF training.

It should be noted that, if some STAs served by the demoted PCP/AP originally have BF links with another PCP/AP, the STAs do not need to perform BF training. In addition, after a new BF link is established, the STA served by the demoted PCP/AP may notify the demoted PCP/AP and delete BF information with the demoted PCP/AP (or delete old BF information after a timer expires).

If the first operation mode is an SC-AP mode and the second operation mode is an M-AP mode, a structure of the change request message is shown as follows:

Manner A (a) reason code: PCP/AP mode change
(b) old AP mode: SC-AP
(c) new AP mode: M-AP
(d) AP AID: AID of the demoted PCP/AP
(e) optionally, PCP/AP mode change num=1, or more PCP/AP mode changes=0
(f) mode change effective time: optionally, a value of the mode change effective time is IMMEDIATE Manner B (a) reason code: PCP/AP mode change to M-AP
(b) new AP mode: is invalid or does not exist
(c) AP AID: AID of the demoted PCP/AP
(d) mode change effective time: optionally, a value of the mode change effective time is IMMEDIATE Manners C and D (a) reason code: PCP/AP mode change
(b) new AP mode: M-AP
(c) AP AID: AID of the demoted PCP/AP
(d) optionally, PCP/AP mode change num=1, or more PCP/AP mode changes=0
(e) mode change effective time: optionally, a value of the mode change effective time is IMMEDIATE Manner E (a) reason code: SC-AP to M-AP
(b) AP AID: AID of the demoted PCP/AP
(c) mode change effective time: optionally, a value of the mode change effective time is IMMEDIATE If the first operation mode is an M-AP mode and the second operation mode is an L-AP mode, a structure of the change request message is shown as follows:

Manner A
(a) reason code: PCP/AP mode change
(b) old AP mode: M-AP or SC-AP
(c) new AP mode: L-AP
(d) AP AID: AID of the demoted PCP/AP
(e) optionally, PCP/AP mode change num=1, or more PCP/AP mode changes=0
(f) mode change effective time
(g) BF timer (beamforming timer): a beamforming/beamforming training timer (note: a value of the BF timer may be different from a value of a BF timer in AP_MODE_CHANGE_CFM in step 2, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP)
(h) STA INFO: information about the STA served by the demoted PCP/AP Manner B
(a) reason code: PCP/AP mode change to L-AP
(b) new AP mode: is invalid or does not exist
(c) AP AID: AID of the demoted PCP/AP
(d) mode change effective time
(e) BF timer (beamforming timer): a beamforming/beamforming training timer (note: a value of the BF timer may be different from a value of a BF timer in AP_MODE_CHANGE_CFM in step 2, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP)
(f) STA INFO: information about the STA served by the demoted PCP/AP Manner C
(a) reason code: PCP/AP mode change
(b) new AP mode: L-AP
(c) AP AID: AID of the demoted PCP/AP
(d) optionally, PCP/AP mode change num=1, or more PCP/AP mode changes=0
(e) mode change effective time
(f) BF timer (beamforming timer): a beamforming/beamforming training timer (note: a value of the BF timer may be different from a value of a BF timer in AP_MODE_CHANGE_CFM in step 2, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP)
(g) STA INFO: information about the STA served by the demoted PCP/AP Manner D
(a) reason code: PCP/AP mode change
(b) new AP mode: L-AP
(c) AP AID: AID of the demoted PCP/AP
(d) optionally, PCP/AP mode change num=1, or more PCP/AP mode changes=0
(e) mode change effective time
(f) BF timer (beamforming timer): a beamforming/beamforming training timer (note: a value of the BF timer may be different from a value of a BF timer in AP_MODE_CHANGE_CFM in step 2, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP).
(g) STA INFO: information about the STA served by the demoted PCP/AP Manner E
(a) reason code: M-AP to L-AP or SC-AP to L-AP
(b) AP AID: AID of a leaving PCP/AP
(c) mode change effective time
(d) BF timer (beamforming timer): a beamforming/beamforming training timer (note: a value of the BF timer may be different from a value of a BF timer in AP_MODE_CHANGE_CFM in step 2, and depends on sending time of BPAC_UPDATE_REQ) BF timer=0 indicates that BF training is not needed, for example, when the demoted PCP/AP does not serve any STA, a BF training process may be omitted (the C-PCP/AP learns a number of STAs that are not served by the demoted PCP/AP).
(e) STA INFO: information about the STA served by the demoted PCP/AP If the first operation mode is an M-AP mode and the second operation mode is an SC-AP mode, a structure of the change request message is shown as follows:

Manner A
(g) reason code: PCP/AP mode change
(h) old AP mode: M-AP
(i) new AP mode: SC-AP
(j) AP AID: AID of a promoted PCP/AP
(k) optionally, PCP/AP mode change num=1, or more PCP/AP mode changes=0
(l) mode change effective time: optionally, a value of the mode change effective time is IMMEDIATE Manner B
(e) reason code: PCP/AP mode change to SC-AP
(f) new AP mode: is invalid or does not exist
(g) AP AID: AID of a promoted PCP/AP
(h) mode change effective time: optionally, a value of the mode change effective time is IMMEDIATE Manners C and D
(f) reason code: PCP/AP mode change
(g) new AP mode: SC-AP
(h) AP AID: AID of a promoted PCP/AP
(i) optionally, PCP/AP mode change num=1, or more PCP/AP mode changes=0
(j) mode change effective time: optionally, a value of the mode change effective time is IMMEDIATE Manner E
(a) reason code: M-AP to SC-AP
(b) AP AID: AID of a promoted PCP/AP
(c) mode change effective time=IMMEDIATE FIG. 11 is a schematic flowchart of a method for accessing a node cluster according to an embodiment of this application.

Figure 11:
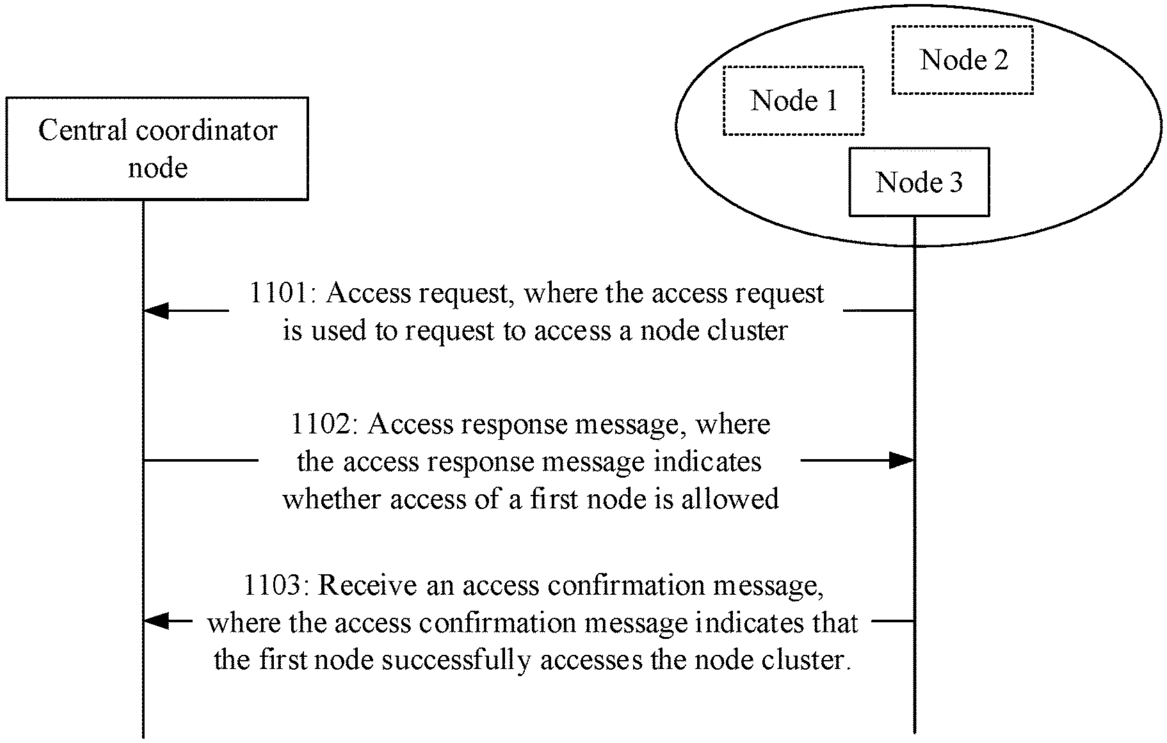
FIG. 11 is a schematic flowchart of a method for accessing a node cluster according to an embodiment of this application.

FIG. 11 may be applied to a system including a plurality of nodes and a central coordinator node. There is a communication channel between each of the plurality of nodes and the central coordinator node. The system may be the systems shown in FIG. 3 and FIG. 5 to FIG. 8. This is not limited in this application. The plurality of nodes and the central coordinator node may be considered as a node cluster.

1101: The central coordinator node receives an access request (BPAC_JOIN_REQ) from a first node. The access request indicates that the first node requests to access the node cluster. Correspondingly, the first node sends the access request to the central coordinator node.

Further, the first node may be the node 3 in FIG. 11. If a new member PCP/AP (for example, the first node) intends to join the node cluster, the access request may be sent to the central coordinator node in the node cluster.

It may be understood that the access request may include a transmitter identifier, a receiver identifier, and a message type. The message type indicates that the message is the access request.

It may be further understood that an operation mode before the first node accesses the node cluster may be an inactive operation mode, or may be an operation mode in which a function of an earlier version is performed. This is not limited in this application.

Optionally, the access request may further include a capability of the first node and a desired operation mode after the first node accesses the node cluster. Further, the capability of the first node may be an operation mode supported by the first node. The operation mode supported by the first node may be indicated in a bitmap manner, an enumeration manner, or another manner.

1102: The central coordinator node sends an access response message to the first node. The access response message indicates whether access of the first node is allowed. Correspondingly, the first node receives the access response message sent by the central coordinator node.

Further, the central coordinator node determines whether the first node can access the node cluster, and sends an access response message (BPAC_JOIN_RSP) to the first node. The access response message indicates a result (result code) that the first node accesses the node cluster. For example, in the result, "1" may indicate that the access succeeds (YES/SUCCESS), and "0" may indicate that the access fails (NO/FAILURE).

Optionally, the access response message further includes an identifier of the central coordinator node, an identifier allocated to the first node, a rank of the first node, an active timer base value of the central coordinator node, an active timer offset unit of the central coordinator node, and parameter information of the node cluster.

Further, when the access response message indicates successful access of the first node, the rank of the node, the active timer base value of the central coordinator node, the active timer offset unit (C-PCP/AP active timer offset unit) of the central coordinator node, and the parameter information of the node cluster are valid. The active timer base value of the central coordinator node and the C-PCP/AP active timer offset unit are used to calculate an active timer offset value of a C-PCP/AP C-AP.

Optionally, the access response message further includes the operation mode of the first node. Optionally, the operation mode may be the same as or different from a requested AP mode in BPAC_JOIN_REQ. Alternatively, if the C-PCP/AP uses the requested AP mode included in BPAC_JOIN_REQ as an AP mode, this parameter may be omitted.

Optionally, the active timer base value of the central coordinator node and the active timer offset unit of the central coordinator node may be carried in the parameter information of the node cluster.

Optionally, the active timer base value of the central coordinator node, the active timer offset unit of the central coordinator node, and the identifier of the central coordinator node may be carried in parameters of the node cluster.

For example, a structure of BPAC_JOIN_RSP may include:

(a) result code: YES/SUCCESS/success
(b) C-AP AID (AID of the C-PCP/AP)
(c) AP AID (AID allocated to the new member)
(d) optionally, AP mode=M-AP or L-AP, or does not exist (for example, the requested AP mode in BPAC_JOIN_REQ is reused)
(e) AP rank (rank for the new member)
(f) C-PCP/AP active timer base value (base timer to calculate C-PCP/AP active timer)
(g) C-PCP/AP active timer offset unit (time unit to calculate C-PCP/AP active timer offset)
(h) BPAC parameters (other parameters in BPAC, e.g. AID and rank of other member PCP/APs, etc.)

Optionally, the operation mode before the first node accesses the node cluster may be an operation mode in an inactive state, or may be a node mode in which a function of an earlier version is performed.

Further, if the operation mode of the first node before accessing the node cluster is the inactive operation mode, when the first node starts to serve an earlier-version station after accessing the node cluster, the operation mode of the first node is switched from the operation mode in an inactive state to an operation mode in which the function of the earlier version is performed.

Optionally, the operation mode after the first node accesses the node cluster may be an operation mode of a member node, or may be an operation mode of a backup central coordinator node, or may be an operation mode in which the function of the earlier version is executed.

Further, if the operation mode of the first node before accessing the node cluster is the operation mode in an inactive state, the operation mode of the first node after accessing the node cluster may be the operation mode of a member node, or the operation mode in which the function of the earlier version is performed.

1103: The central coordinator node receives an access confirmation message (BPAC_JOIN_CFM) from the first node. The access confirmation message is used to confirm that the first node successfully accesses the node cluster. Correspondingly, the first node sends the access confirmation message to the central coordinator node.

Optionally, the central coordinator node sends a change request message to the plurality of nodes. The change request message indicates that the first node successfully accesses the node cluster.

In a possible implementation, the central coordinator node may directly send the change request message to the plurality of nodes. In other words, the central coordinator node may directly send the change request message without performing the foregoing steps 1101 to 1103 and/or other steps. For example, the central coordinator node may actively or directly send the change request message periodically. This is not limited in this application.

In another possible implementation, the central coordinator node may send the change request message after receiving BPAC_JOIN_CFM.

It may be understood that content or a format of the change request message may be each message format in the change request message in the foregoing "details of messages exchanged between nodes", or may be the same as content or a format of the first change request message in the embodiment shown in FIG. 4.

For example, the format of the change request message may be:

Manner A (a) reason code: PCP/AP mode change (b) old AP mode: inactive (c) new AP mode: M-AP or L-AP (d) AP AID: AID of a new member PCP/AP (e) optionally, PCP/AP mode change num=1, or more PCP/AP mode changes=0

(f) mode change effective time: optionally, a value of the mode change effective time is IMMEDIATE Manner B (a) reason code: new PCP/AP join (b) new AP mode: M-AP or L-AP (c) AP AID: AID of a new member PCP/AP (d) mode change effective time: optionally, a value of the mode change effective time is IMMEDIATE Manners C and D (a) reason code: new PCP/AP join (b) new AP mode: M-AP or L-AP (c) AP AID: AID of a new member PCP/AP (d) optionally, PCP/AP mode change num=1, or more PCP/AP mode changes=0

(e) mode change effective time: optionally, a value of the mode change effective time is IMMEDIATE Manner E (a) reason code: inactive to M-AP or inactive to L-AP (b) AP AID: AID of a new member PCP/AP (c) mode change effective time: optionally, a value of the mode change effective time is IMMEDIATE It should be noted that, if the first node establishes a new node cluster, the first node may send a discovery frame (BPAC discovery frame) to another node, to trigger a node in another operation mode to search for the node cluster. The first node may be used as the central coordinator node. In this way, the operation mode of the first node may be switched from an inactive mode to a C-AP mode.

In another embodiment, before the step 1101, if a node in an inactive mode establishes a new node cluster, the node may send a BPAC discovery frame (discovery frame). In this way, the node may be switched from an inactive mode to a C-AP mode.

It may be understood that a solution of establishing the new node cluster may be separately implemented, or may be combined with any embodiment of this application. This is not limited in this application.

In still another embodiment, that a node is switched from an L-AP mode to a C-AP mode may be similar to that a node in an inactive mode establishes a new node cluster. Inactive is changed to L-AP.

It should be noted that, before sending the BPAC discovery frame, the node in the L-AP mode needs to release all legacy STAs (if any).

In still another embodiment, that a node is switched from an L-AP mode to an M-AP mode may be similar to the embodiment shown in FIG. 11. Inactive is changed to L-AP, and the M-AP/L-AP mode is changed to M-AP.

It should be noted that, before the new member PCP/AP (originally L-AP) sends the BPAC_JOIN_REQ message to the C-PCP/AP, the new member PCP/AP needs to release all legacy STAs (if any).

Figure 12:
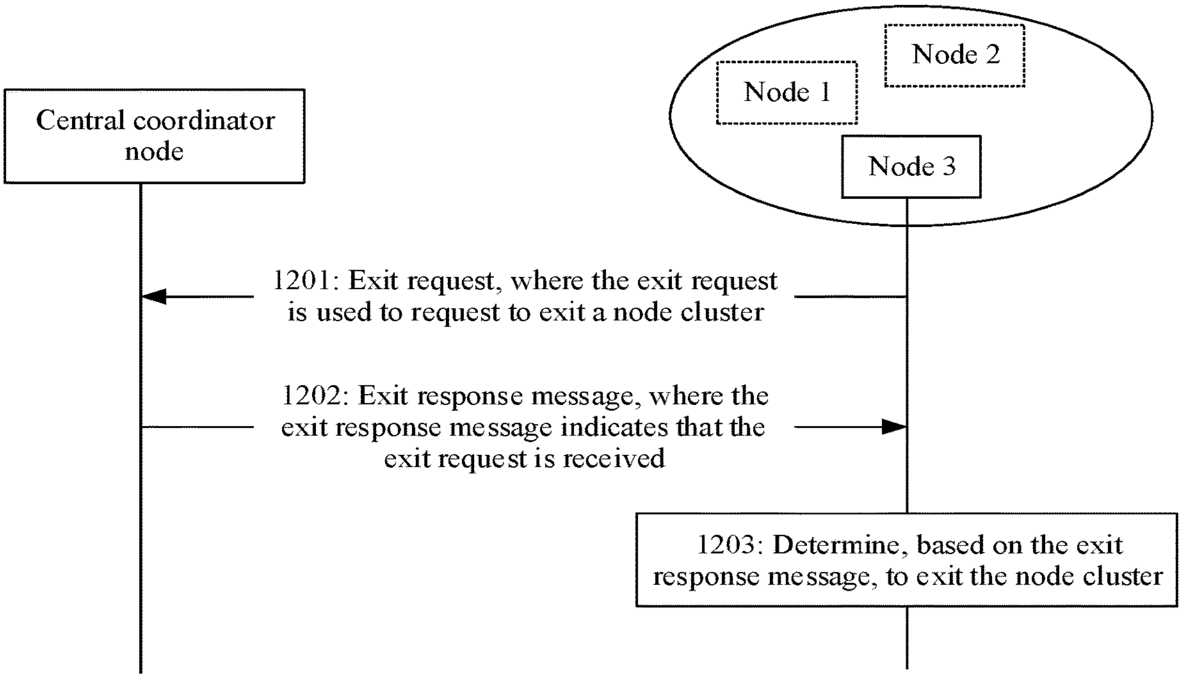
FIG. 12 is a schematic flowchart of a method for exiting a node cluster according to an embodiment of this application.

FIG. 12 is a schematic flowchart of a method for exiting a node cluster according to an embodiment of this application.

FIG. 12 may be applied to a system including a plurality of nodes and a central coordinator node. There is a communication channel between each of the plurality of nodes and the central coordinator node. The system may be the systems shown in FIG. 3 and FIG. 5 to FIG. 8. This is not limited in this application. The plurality of nodes and the central coordinator node may be considered as a node cluster.

1201: The central coordinator node receives an exit request from a first node in the plurality of nodes. The exit request is used to request the first node to exit the node cluster. Correspondingly, the first node sends the exit request to the central coordinator node.

Further, when a node in an SC-AP mode, an L-AP mode, or an M-AP mode is to leave the node cluster, the node may send BPAC_LEAVE_REQ to the central coordinator node.

For example, when a node in an SC-AP mode hands over a backup function to another PCP/AP, releases the backup function, has a fault, or is released by the node cluster, the node is switched from the SC-AP mode to an inactive mode.

When a node in an M-AP mode has a fault or is released by the node cluster, the node is switched from the M-AP mode to an inactive mode.

When a node in an L-AP mode has a fault or is released by the node cluster, the node is switched from the L-AP mode to an inactive mode.

1202: The central coordinator node sends an exit response message (BPAC_LEAVE_RSP) to the first node. The exit response message indicates that the exit request is received. Correspondingly, the first node sends the exit response message to the central coordinator node.

Optionally, BPAC_LEAVE_RSP may include the following parameter:

a. BF timer (beamforming/beamforming training timer: indicates a beamforming/beamforming training duration between a STA originally served by a leaving PCP/AP and a new serving PCP/AP).

It may be understood that, after receiving BPAC_LEAVE_RSP, the leaving PCP/AP starts the BF timer, and then sends a broadcast/unicast/multicast message to the STA served by the leaving PCP/AP, to indicate the STA served by the leaving PCP/AP and another PCP/AP in a PCP/AP cluster (for example, a BPAC) to perform BF training.

It should be noted that, if some STAs served by the leaving PCP/AP originally have BF links with another PCP/AP, the STAs do not need to perform BF training. In addition, after a new BF link is established, the STA served by the leaving PCP/AP may notify the leaving PCP/AP and delete BF information with the leaving PCP/AP (or delete old BF information after a timer expires).

Optionally, the central coordinator node may send a change request message to another node other than the first node in the node cluster. The change request message indicates the first node to exit the node cluster.

In a possible implementation, the central coordinator node may directly send the change request message to another node. In other words, the central coordinator node may directly send the change request message without performing the foregoing steps 1201 and 1202 and/or other steps. For example, the central coordinator node may actively or directly send the change request message periodically. This is not limited in this application.

In another possible implementation, the central coordinator node may send the change request message after or when sending the BPAC_LEAVE_RSP message.

It may be understood that content or a format of the change request message may be each message format in the change request message in the foregoing "details of messages exchanged between nodes", or may be the same as content or a format of the first change request message in the embodiment shown in FIG. 4.

Optionally, the change request message indicates a reason why the first node exits the node cluster and/or the beamforming training duration.

Further, if the first node is in the SC-AP mode or the M-AP mode, a structure of the change request message is specifically shown as follows:

Manner A (a) reason code: PCP/AP mode change
(b) old AP mode: M-AP or SC-AP
(c) new AP mode: inactive
(d) AP AID: AID of the leaving PCP/AP
(e) optionally, PCP/AP mode change num=1, or more PCP/AP mode changes=0
(f) mode change effective time
(g) BF timer (beamforming timer): a beamforming/beamforming training timer (note: a value of the BF timer may be different from a value of a BF timer in BPA-C_LEAVE_RSP, and depends on sending time of BPA-C_UPDATE_REQ) BF timer=0 indicates that BF training is not needed, for example, when the leaving PCP/AP does not serve any STA, a BF training process may be omitted (the C-PCP/AP learns a number of STAs that are not served by the leaving PCP/AP)
(h) STA INFO: information about the STA served by the leaving PCP/AP Manner B (a) reason code: PCP/AP leave (mode change to inactive)
(b) new AP mode: is invalid or does not exist
(c) AP AID: AID of the leaving PCP/AP
(d) mode change effective time
(e) BF timer (beamforming timer): a beamforming/beamforming training timer (note: a value of the BF timer may be different from a value of a BF timer in BPA-C_LEAVE_RSP, and depends on sending time of BPA-C_UPDATE_REQ) BF timer=0 indicates that BF training is not needed, for example, when the leaving PCP/AP does not serve any STA, a BF training process may be omitted (the C-PCP/AP learns a number of STAs that are not served by the leaving PCP/AP).
(f) STA INFO: information about the STA served by the leaving PCP/AP Manner C (a) reason code: PCP/AP leave (mode change to inactive)
(b) new AP mode: is invalid or does not exist
(c) AP AID: AID of the leaving PCP/AP
(d) optionally, PCP/AP mode change num=1, or more PCP/AP mode changes=0
(e) mode change effective time
(f) BF timer (beamforming timer): a beamforming/beamforming training timer (note: a value of the BF timer may be different from a value of a BF timer in BPA-C_LEAVE_RSP, and depends on sending time of BPA-C_UPDATE_REQ) BF timer=0 indicates that BF training is not needed, for example, when the leaving PCP/AP does not serve any STA, a BF training process may be omitted (the C-PCP/AP learns a number of STAs that are not served by the leaving PCP/AP)
(g) STA INFO: information about the STA served by the leaving PCP/AP Manner D (a) reason code: PCP/AP mode change
(b) new AP mode: inactive
(c) AP AID: AID of the leaving PCP/AP
(d) optionally, PCP/AP mode change num=1, or more PCP/AP mode changes=0
(e) mode change effective time
(f) BF timer (beamforming timer): a beamforming/beamforming training timer (note: a value of the BF timer may be different from a value of a BF timer in BPA-C_LEAVE_RSP, and depends on sending time of BPA-C_UPDATE_REQ) BF timer=0 indicates that BF training is not needed, for example, when the leaving PCP/AP does not serve any STA, a BF training process may be omitted (the C-PCP/AP learns a number of STAs that are not served by the leaving PCP/AP)
(g) STA INFO: information about the STA served by the leaving PCP/AP Manner E (a) reason code: M-AP to inactive or SC-AP to inactive
(b) AP AID: AID of the leaving PCP/AP
(c) mode change effective time
(d) BF timer (beamforming timer): a beamforming/beamforming training timer (note: a value of the BF timer may be different from a value of a BF timer in BPA-C_LEAVE_RSP, and depends on sending time of BPA-C_UPDATE_REQ) BF timer=0 indicates that BF training is not needed, for example, when the leaving PCP/AP does not serve any STA, a BF training process may be omitted (the C-PCP/AP learns a number of STAs that are not served by the leaving PCP/AP).
(e) STA INFO: information about the STA served by the leaving PCP/AP Further, if the first node is in the L-AP mode, a structure of the change request message is specifically shown as follows:

Manner A (i) reason code: PCP/AP mode change
(j) old AP mode: L-AP
(k) new AP mode: inactive
(l) AP AID: AID of the leaving PCP/AP
(m) optionally, PCP/AP mode change num=1, or more PCP/AP mode changes=0
(n) mode change effective time: optionally, a value of the mode change effective time is IMMEDIATE Manner B (g) reason code: PCP/AP leave (mode change to inactive)
(h) new AP mode: is invalid or does not exist
(i) AP AID: AID of the leaving PCP/AP
(j) mode change effective time: optionally, a value of the mode change effective time is IMMEDIATE Manner C (h) reason code: PCP/AP leave (mode change to inactive)
(i) new AP mode: is invalid or does not exist
(j) AP AID: AID of the leaving PCP/AP
(k) optionally, PCP/AP mode change num=1, or more PCP/AP mode changes=0
(l) mode change effective time: optionally, a value of the mode change effective time is IMMEDIATE Manner D (h) reason code: PCP/AP mode change
(i) new AP mode: inactive
(j) AP AID: AID of the leaving PCP/AP
(k) optionally, PCP/AP mode change num=1, or more PCP/AP mode changes=0
(l) mode change effective time: optionally, a value of the mode change effective time is IMMEDIATE Manner E (c) reason code: L-AP to inactive
(d) AP AID: AID of the leaving PCP/AP
(e) mode change effective time: optionally, a value of the mode change effective time is IMMEDIATE

1203: The first node determines, based on the exit response message, to exit the node cluster.

Optionally, each member PCP/AP that receives BPAC_UPDATE_REQ starts the BF timer indicated by the message, and then performs BF training with the STA served by the leaving PCP/AP.

Optionally, when the started BF timer indicated by BPAC_UPDATE_REQ expires, the corresponding PCP/AP sends a BPAC_UPDATE_RSP message to the C-PCP/AP. The BPAC_UPDATE_RSP message includes the following parameter. a. STAINFO: information about a STA that is originally served by the leaving PCP/AP and that has established a BF link with the member PCP/AP Optionally, when a BF timer of the leaving PCP/AP expires, the leaving PCP/AP releases a STA (if any) that has not established a BF link with another PCP/AP, and then is switched to the inactive mode.

It may be understood that, if the first node is L-AP, when receiving BPAC_UPDATE_RSP, the first node may directly release all STAs, and is switched to the inactive mode.

Embodiments described in this specification may be independent solutions, or may be combined based on internal logic. All these solutions fall within the protection scope of this application.

It may be understood that, in the foregoing method embodiments, the methods and the operations that are implemented by the devices may alternatively be implemented by a component (for example, a chip or a circuit) of a corresponding device.

The foregoing mainly describes the solutions provided in embodiments of this application from a perspective of interaction between the devices. It may be understood that, to implement the foregoing functions, each network element such as a transmitter device or a receiver device includes a corresponding hardware structure and/or software module for performing each function. A person skilled in the art may be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional modules may be performed on a transmitter device or a receiver device based on the foregoing method examples. For example, each functional module may be obtained through division corresponding to each function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used. Descriptions are provided below by using an example in which each functional module is obtained through division corresponding to each function.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in embodiments of this application. The execution sequences of the processes should be determined based on functions and internal logic of the processes, and should not be construed as any limitation on implementation processes of embodiments of this application.

The foregoing describes in detail the methods provided in embodiments of this application with reference to FIG. 4 to FIG. 12. The following describes in detail apparatuses provided in embodiments of this application with reference to FIG. 13 to FIG. 18. It should be understood that descriptions of apparatus embodiments correspond to the descriptions of the method embodiments. Therefore, for content that is not described in detail, refer to the foregoing method embodiments. For brevity, details are not described herein again.

Figure 13:
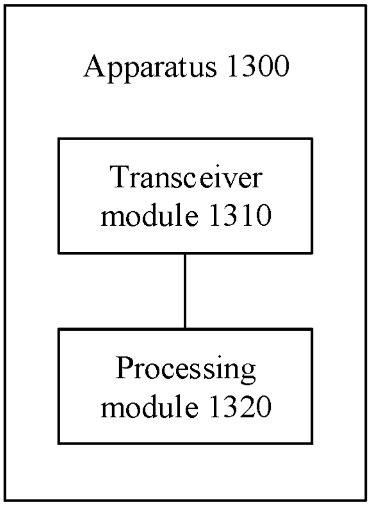
FIG. 13 is a schematic block diagram of an apparatus for performing a central coordination function according to an embodiment of this application.

FIG. 13 is a schematic block diagram of an apparatus 1300 for performing a central coordination function according to an embodiment of this application.

It should be understood that the apparatus 1300 may correspond to the candidate central coordinator node in the embodiment shown in FIG. 4, and may have any function of the candidate central coordinator node in the method. The apparatus 1300 includes a transceiver module 1310 and a processing module 1320. The apparatus 1300 is used in a system including a plurality of nodes and a first central coordinator node. There is a communication channel between each of the plurality of nodes and the first central coordinator node.

The transceiver module 1310 is configured to: when it is determined that the first central coordinator node does not perform a central coordination function, send a first change request message to other nodes other than a candidate central coordinator node in the plurality of nodes. The first change request message is used to request a node to change a node parameter.

The transceiver module 1310 is further configured to receive a change request response message from a second node in the other nodes. The change request response message indicates that the second node receives the first change request message.

The processing module 1320 is configured to perform the central coordination function when a change request response message from each of the other nodes is received.

Optionally, the processing module 1320 is further configured to start a first timer when it is determined that the first central coordinator node does not perform the central coordination function.

The processing module 1320 is further configured to perform the central coordination function when the change request response message from each of the other nodes is received and the first timer expires.

Optionally, the first change request message includes at least one of a reason for changing the node parameter, a to-be-changed operation mode of the candidate central coordinator node, or effective time at which the candidate central coordinator node performs the central coordination function.

Optionally, the candidate central coordinator node sending the first change request message to the other nodes other than the candidate central coordinator node in the plurality of nodes includes:

The candidate central coordinator node sends the first change request message to the second node. The first change request message is used to request the second node to change the node parameter.

Optionally, the first change request message is used to request each of the other nodes to change the node parameter.

Optionally, the transceiver module 1310 is further configured to receive a node operation mode switching message from the first central coordinator node. The node operation mode switching message indicates that a node operation mode of the first central coordinator node is switched to skipping performing the central coordination function. The processing module 1320 is further configured to: when the node operation mode switching message is received, determine that the first central coordinator node does not perform the central coordination function.

Optionally, the node operation mode switching message includes at least one of: context parameters of the plurality of nodes, the to-be-changed operation mode of the candidate central coordinator node, the effective time at which the candidate central coordinator node performs the central coordination function, a to-be-changed operation mode of the first central coordinator node, information about a station served by the first central coordinator node, and a beamforming training duration between the station served by the first central coordinator node and the plurality of nodes.

Optionally, the transceiver module 1310 is further configured to receive a second change request message. The second change request message includes at least one of the information about the station served by the first central coordinator node and the beamforming training duration between the station served by the first central coordinator node and the plurality of nodes. The processing module 1320 is further configured to perform, based on at least one of the information about the station served by the first central coordinator node and the beamforming training duration between the station served by the first central coordinator node and the plurality of nodes, beamforming training with the station served by the first central coordinator node.

Optionally, the processing module 1320 is further configured to start a second timer when a detection message from the first central coordinator node is received. The processing module 1320 is further configured to: when the second timer expires, determine that the first central coordinator node does not perform the central coordination function.

Optionally, the candidate central coordinator node is any one of a node in an inactive state, a member node, a node that performs a function of an earlier version, or a backup central coordinator node in the plurality of nodes.

Figure 14:
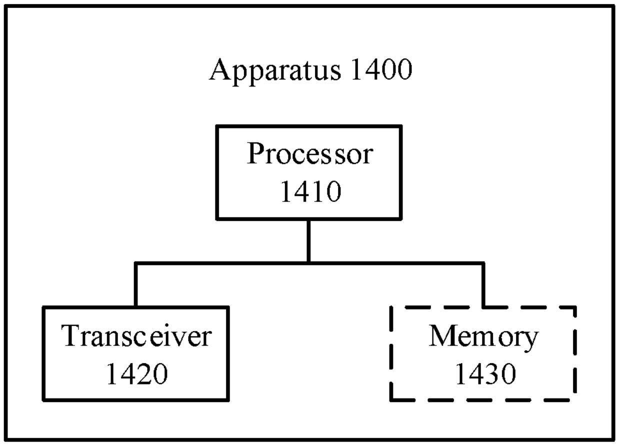
FIG. 14 is a schematic diagram of a structure of an apparatus for performing a central coordination function according to an embodiment of this application.

FIG. 14 shows an apparatus 1400 for performing a central coordination function according to an embodiment of this application. The apparatus 1400 may be the candidate central coordinator node in FIG. 4. The apparatus may use a hardware architecture shown in FIG. 14. The apparatus may include a processor 1410 and a transceiver 1430. Optionally, the apparatus may further include a memory 1440. The processor 1410, the transceiver 1430, and the memory 1440 communicate with each other through an internal connection path. A related function implemented by the processing module 1320 in FIG. 8 may be implemented by the processor 1410, and a related function implemented by the transceiver module 1310 may be implemented by the processor 1410 by controlling the transceiver 1430.

Optionally, the processor 1410 may be a general-purpose CPU, a microprocessor, an ASIC, a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to: control the apparatus (for example, a base station, a terminal, or a chip) for performing a central coordination function, execute a software program, and process data of the software program.

Optionally, the processor 1410 may include one or more processors, for example, include one or more CPUs. When the processor is one CPU, the CPU may be a single-core CPU, or may be a multi-core CPU.

The transceiver 1430 is configured to send and receive data and/or a signal, and receive data and/or a signal. The transceiver may include a transmitter and a receiver. The transmitter is configured to send data and/or a signal, and the receiver is configured to receive data and/or a signal.

The memory 1440 includes but is not limited to a RAM, a ROM, an erasable programmable ROM (EPROM), and a compact disc (CD) ROM. The memory 1440 is configured to store related instructions and data.

The memory 1440 is configured to store program code and data of a terminal, and may be a separate device or integrated into the processor 1410.

Specifically, the processor 1410 is configured to control the transceiver to perform information transmission with another node in a node cluster. For details, refer to the descriptions in the method embodiments. Details are not described herein again.

During specific implementation, in an embodiment, the apparatus 1400 may further include an output device and an input device. The output device communicates with the processor 1410, and may display information in a plurality of manners. For example, the output device may be a liquid-crystal display (LCD), a light-emitting diode (LED) display device, a cathode-ray tube (CRT) display device, or a projector. The input device communicates with the processor 601, and may receive an input from a user in a plurality of manners. For example, the input device may be a mouse, a keyboard, a touchscreen device, or a sensing device.

It may be understood that FIG. 14 shows only a simplified design of the apparatus for performing a central coordination function. During actual application, the apparatus may further separately include other necessary components, including but not limited to any number of transceivers, processors, controllers, memories, and the like, and all terminals that can implement this application shall fall within the protection scope of this application.

In a possible design, the apparatus 1400 may be a chip, for example, may be a communication chip that may be used in the candidate central coordinator node, and is configured to implement a related function of the processor 1410 in the candidate central coordinator node. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a candidate central coordinator node or a circuit. The apparatus may be configured to perform actions performed by the candidate central coordinator node in the foregoing method embodiments.

Figure 15:
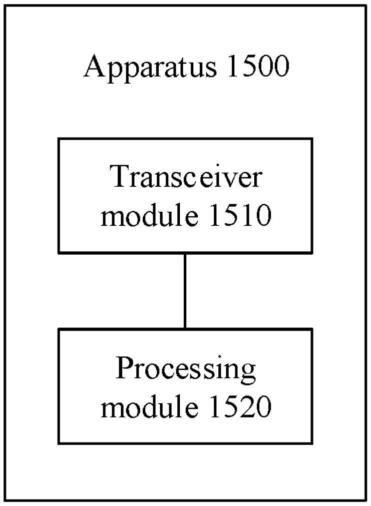
FIG. 15 is a schematic block diagram of an operation mode switching apparatus according to an embodiment of this application.

FIG. 15 is a schematic block diagram of an operation mode switching apparatus 1500 according to an embodiment of this application.

It should be understood that the apparatus 1500 may correspond to the central coordinator node in the embodiment shown in FIG. 9, and may have any function of the central coordinator node in the method. The apparatus 1500 includes a transceiver module 1510 and a processing module 1520. The apparatus 1500 is used in a system including a plurality of nodes and a central coordinator node. There is a communication channel between each of the plurality of nodes and the central coordinator node.

The transceiver module 1510 is configured to receive an operation mode switching message from the central coordinator node. The operation mode switching message indicates a target node to be switched from a first operation mode to a second operation mode.

The processing module 1520 is configured to switch the first operation mode to the second operation mode based on the operation mode switching message.

Optionally, the operation mode switching message further indicates effective time at which the target node is switched from the first operation mode to the second operation mode. The processing module 1520 is further configured to start a first timer when the operation mode switching message from the central coordinator node is received. The processing module 1520 is specifically configured to switch the first operation mode to the second operation mode when the first timer reaches the effective time.

Optionally, the transceiver module 1510 is further configured to send an operation mode switching response message to the central coordinator node. The operation mode switching response message is used to notify the central coordinator node that the target node is to be switched from the first operation mode to the second operation mode.

Optionally, the first operation mode is a backup central coordinator node mode. The second operation mode is a member node mode.

Optionally, the first operation mode is a backup central coordinator node mode or a member node mode. The second operation mode is a mode of a node that performs a function of an earlier version.

Optionally, the first operation mode is a member node mode. The second operation mode is a backup central coordinator node mode.

Figure 16:
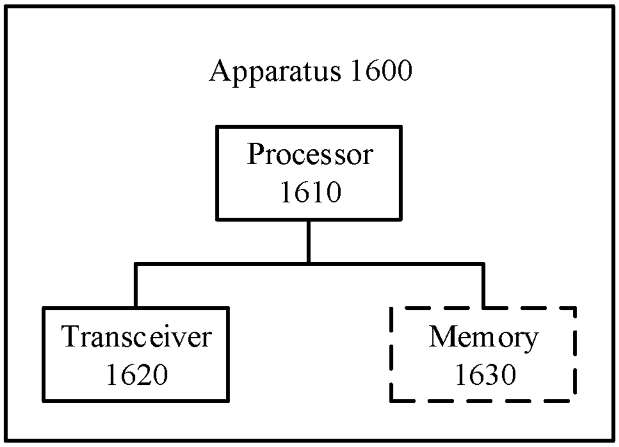
FIG. 16 is a schematic diagram of a structure of an operation mode switching apparatus according to an embodiment of this application.

FIG. 16 shows an operation mode switching apparatus 1600 according to an embodiment of this application. The apparatus 1600 may be the central coordinator node in FIG. 9. The apparatus may use a hardware architecture shown in FIG. 16. The apparatus may include a processor 1610 and a transceiver 1620. Optionally, the apparatus may further include a memory 1630. The processor 1610, the transceiver 1620, and the memory 1630 communicate with each other through an internal connection path. A related function implemented by the processing module 1520 in the embodiment shown in FIG. 15 may be implemented by the processor 1610, and a related function implemented by the transceiver module 1510 may be implemented by the processor 1610 by controlling the transceiver 1620.

Optionally, the processor 1610 may be a general-purpose CPU, a microprocessor, an ASIC, a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the operation mode switching apparatus (for example, a central coordinator node or a chip), execute a software program, and process data of the software program.

Optionally, the processor 1610 may include one or more processors, for example, include one or more CPUs. When the processor is one CPU, the CPU may be a single-core CPU, or may be a multi-core CPU.

The transceiver 1620 is configured to send and receive data and/or a signal, and receive data and/or a signal. The transceiver may include a transmitter and a receiver. The transmitter is configured to send data and/or a signal, and the receiver is configured to receive data and/or a signal.

The memory 1630 includes but is not limited to a RAM, a ROM, an EPROM, and a CD-ROM. The memory 1630 is configured to store related instructions and data.

The memory 1630 is configured to store program code and data of the central coordinator node, and may be a separate device or integrated into the processor 1610.

Specifically, the processor 1610 is configured to control the transceiver to perform information transmission with another node in a node cluster. For details, refer to the descriptions in the method embodiments. Details are not described herein again.

During specific implementation, in an embodiment, the apparatus 1600 may further include an output device and an input device. The output device communicates with the processor 1610, and may display information in a plurality of manners. For example, the output device may be an LCD, an LED display device, a CRT display device, or a projector. The input device communicates with the processor 601, and may receive an input from a user in a plurality of manners. For example, the input device may be a mouse, a keyboard, a touchscreen device, or a sensing device.

It may be understood that FIG. 16 shows only a simplified design of the operation mode switching apparatus. During actual application, the apparatus may further separately include other necessary components, including but not limited to any number of transceivers, processors, controllers, memories, and the like, and all central coordinator nodes that can implement this application shall fall within the protection scope of this application.

In a possible design, the apparatus 1600 may be a chip, for example, may be a communication chip that may be used in the central coordinator node, and is configured to implement a related function of the processor 1610 in the central coordinator node. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a central coordinator node or a circuit. The apparatus may be configured to perform actions performed by the central coordinator node in the foregoing method embodiments.

Figure 17:
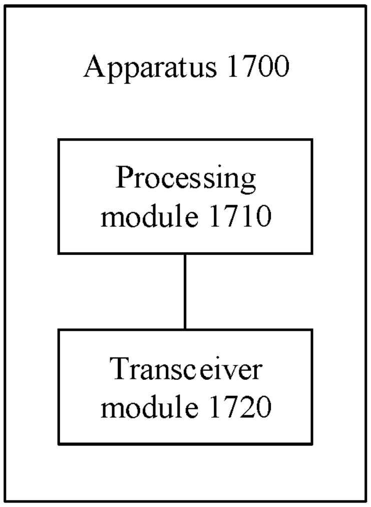
FIG. 17 is a schematic block diagram of an operation mode switching apparatus according to another embodiment of this application.

FIG. 17 is a schematic block diagram of an operation mode switching apparatus 1700 according to an embodiment of this application.

It should be understood that the apparatus 1700 may correspond to the node 3 (namely, a target node) in the embodiment shown in FIG. 9, and may have any function of the target node in the method. The apparatus 1700 includes a processing module 1710 and a transceiver module 1720. The apparatus 1700 is used in a system including a plurality of nodes and a central coordinator node. There is a communication channel between each of the plurality of nodes and the central coordinator node.

The processing module 1710 is configured to determine a target node whose operation mode is to be switched in the plurality of nodes.

The transceiver module 1720 is configured to send an operation mode switching message to the target node. The operation mode switching message indicates the target node to be switched from a first operation mode to a second operation mode.

Optionally, the operation mode switching message further indicates effective time at which the target node is switched from the first operation mode to the second operation mode.

Optionally, the transceiver module 1720 is further configured to receive the operation mode switching response message from the target node. The operation mode switching response message indicates that the target node is to be switched from the first operation mode to the second operation mode. The transceiver module 1720 is further configured to send a first change request message to a node other than the target node in the plurality of nodes. The first change request message is used to request the node to change a node parameter.

Optionally, the first change request message includes a reason for switching an operation mode and/or effective time of the second operation mode.

Optionally, the first operation mode is a backup central coordinator node mode. The second operation mode is a member node mode.

Optionally, the first operation mode is a backup central coordinator node mode or a member node mode. The second operation mode is a mode of a node that performs a function of an earlier version.

Optionally, the first operation mode is a member node mode. The second operation mode is a backup central coordinator node mode.

Figure 18:
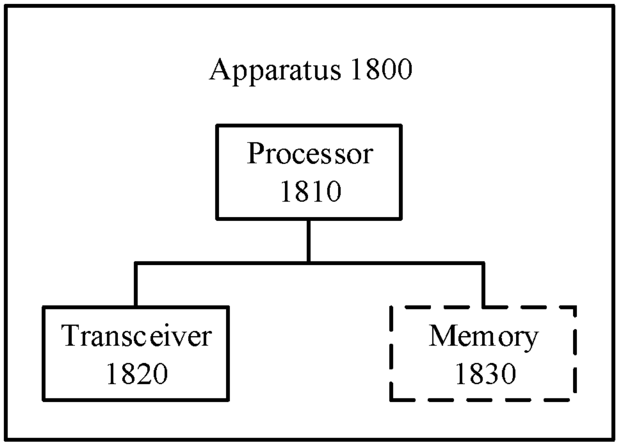
FIG. 18 is a schematic diagram of a structure of an operation mode switching apparatus according to another embodiment of this application.

FIG. 18 shows an operation mode switching apparatus 1800 according to an embodiment of this application. The apparatus 1800 may be the node 3 (namely, a target node) in FIG. 9. The apparatus may use a hardware architecture shown in FIG. 18. The apparatus may include a processor 1810 and a transceiver 1820. Optionally, the apparatus may further include a memory 1830. The processor 1810, the transceiver 1820, and the memory 1830 communicate with each other through an internal connection path. A related function implemented by the processing module 1710 in the embodiment shown in FIG. 17 may be implemented by the processor 1810, and a related function implemented by the transceiver module 1720 may be implemented by the processor 1810 by controlling the transceiver 1820.

Optionally, the processor 1810 may be a general-purpose CPU, a microprocessor, an ASIC, a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the apparatus (for example, a target node or a chip), execute a software program, and process data of the software program.

Optionally, the processor 1810 may include one or more processors, for example, include one or more CPUs. When the processor is one CPU, the CPU may be a single-core CPU, or may be a multi-core CPU.

The transceiver 1820 is configured to send and receive data and/or a signal, and receive data and/or a signal. The transceiver may include a transmitter and a receiver. The transmitter is configured to send data and/or a signal, and the receiver is configured to receive data and/or a signal.

The memory 1830 includes but is not limited to a RAM, a ROM, an EPROM, and a CD-ROM. The memory 1830 is configured to store related instructions and data.

The memory 1830 is configured to store program code and data of the target node, and may be a separate device or integrated into the processor 1810.

Further, the processor 1810 is configured to control the transceiver to perform information transmission with another node in a node cluster. For details, refer to the descriptions in the method embodiments. Details are not described herein again.

During specific implementation, in an embodiment, the apparatus 1800 may further include an output device and an input device. The output device communicates with the processor 1810, and may display information in a plurality of manners. For example, the output device may be an LCD, an LED display device, a CRT display device, or a projector. The input device communicates with the processor 601, and may receive an input from a user in a plurality of manners. For example, the input device may be a mouse, a keyboard, a touchscreen device, or a sensing device.

It may be understood that FIG. 18 shows only a simplified design of the operation mode switching apparatus. During actual application, the apparatus may further separately include other necessary components, including but not limited to any number of transceivers, processors, controllers, memories, and the like, and all target nodes that can implement this application shall fall within the protection scope of this application.

In a possible design, the apparatus 1800 may be a chip, for example, may be a communication chip that may be used in the target node, and is configured to implement a related function of the processor 1810 in the target node. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a target node or a circuit. The apparatus may be configured to perform actions performed by the target node in the foregoing method embodiments.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented by software, hardware, firmware, or any combination thereof. When software is used to implement embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

It should be understood that the processor may be an integrated circuit chip, and has a signal processing capability. In an implementation process, the steps in the foregoing method embodiments may be completed by using a hardware integrated logic circuit in the processor, or by using instructions in a form of software. The foregoing processor may be a general-purpose processor, a DSP, an ASIC, an FPGA or another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps of the methods disclosed with reference to embodiments of this application may be directly performed and completed by using a hardware decoding processor, or may be performed and completed by using a combination of hardware and software modules in the decoding processor. A software module may be located in a mature storage medium in the art, such as a RAM, a flash memory, a ROM, a PROM, an EEPROM, or a register. The storage medium is located in the memory, and the processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM that is used as an external cache. By way of example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink (SL) DRAM, and a direct rambus (DR) RAM.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists. A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to embodiments are included in at least one embodiment of the present disclosure. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in embodiments of the present disclosure. The execution sequences of the processes should be determined based on functions and internal logic of the processes, and should not be construed as any limitation on implementation processes of embodiments of the present disclosure.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be further understood that "first", "second", and various numbers in this specification are merely used for differentiation for ease of description, and are not construed as a limitation to the scope of embodiments of this application.

It should be understood that the term "and/or" in this specification describes only an association relationship between associated objects and represents that three relationships may exist. For example, A and/or B may represent the following three cases: Only A exists, both A and B exist, and only B exists. When only A or only B exists, a number of A or B is not limited. In an example in which only A exists, it may be understood as that there is one or more As.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electric, mechanical, or other forms.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus applied to a system, comprising:
- a memory configured to store instructions; and
- a processor coupled to the memory and configured to execute the instructions to cause the communication apparatus to be configured to:
  - receive, from a central coordinator node, an operation mode switching message indicating a target node is to be switched from a first operation mode to a second operation mode, wherein the operation mode switching message comprises a new operation mode field indicating the second operation mode, wherein the system comprises a plurality of nodes and the central coordinator node, wherein a communication channel exists between each of the plurality of nodes and the central coordinator node, and wherein the communication apparatus is the target node in the plurality of nodes; and
  - switch the target node from the first operation mode to the second operation mode based on the new operation mode field.

2. The communication apparatus of claim 1, wherein the operation mode switching message further indicates an effective time at which the target node is switched from the first operation mode to the second operation mode, and wherein the processor is further configured to execute the instructions to cause the communication apparatus to be configured to:
- start a first timer when receiving the operation mode switching message; and
- further switch the target node from the first operation mode to the second operation mode when the first timer reaches the effective time.

3. The communication apparatus of claim 1, wherein the processor is further configured to execute the instructions to cause the communication apparatus to be configured to send an operation mode switching response message to the central coordinator node, and wherein the operation mode switching response message notifies the central coordinator node that the target node is to be switched from the first operation mode to the second operation mode.

4. The communication apparatus of claim 1, wherein the first operation mode is a backup central coordinator node mode, and wherein the second operation mode is a member node mode.

5. The communication apparatus of claim 1, wherein the first operation mode is a backup central coordinator node mode or a member node mode, and wherein the second operation mode is a node that performs a function of an earlier version.

6. The communication apparatus of claim 1, wherein the first operation mode is a member node mode, and wherein the second operation mode is a backup central coordinator node mode.

7. A central coordinator node applied to a system, comprising:
- a memory configured to store instructions; and
- a processor coupled to the memory and configured to execute the instructions to cause the central coordinator node to be configured to:
  - determine, from among a plurality of nodes, a target node whose operation mode is to be switched, wherein the system comprises the plurality of nodes and the central coordinator node, and wherein a communication channel exists between each of the plurality of nodes and the central coordinator node; and send, to the target node, an operation mode switching message indicating the target node is to be switched from a first operation mode to a second operation mode, wherein the operation mode switching message comprises a new operation mode field indicating the second operation mode.

8. The central coordinator node of claim 7, wherein the operation mode switching message further indicates an effective time at which the target node is switched from the first operation mode to the second operation mode.

9. The central coordinator node of claim 7, wherein the processor is further configured to execute the instructions to cause the central coordinator node to be configured to:

receive, from the target node, an operation mode switching response message indicating that the target node is to be switched from the first operation mode to the second operation mode; and send a change request message to a node other than the target node in the plurality of nodes, wherein the change request message requests the node to change a node parameter.

10. The central coordinator node of claim 9, wherein the change request message comprises a reason for switching an operation mode and/or an effective time of the second operation mode.

11. A computer program product comprising instructions that are stored on a non-transitory computer-readable storage medium, and that when executed by at least one processor, cause a communication apparatus to:

receive, from a central coordinator node, an operation mode switching message indicating a target node is to be switched from a first operation mode to a second operation mode, wherein the operation mode switching message comprises a new operation mode field indicating the second operation mode, wherein the system comprises a plurality of nodes and the central coordinator node, wherein a communication channel exists between each of the plurality of nodes and the central coordinator node, and wherein the communication apparatus is the target node in the plurality of nodes; and switch the target node from the first operation mode to the second operation mode based on the new operation mode field.

12. The computer program product of claim 11, wherein the operation mode switching message further indicates an effective time at which the target node is switched from the first operation mode to the second operation mode, and wherein the instructions further cause the communication apparatus to:

start a first timer when receiving the operation mode switching message; and further switch the target node from the first operation mode to the second operation mode when the first timer reaches the effective time.

13. The computer program product of claim 11, wherein the instructions further cause the communication apparatus to send an operation mode switching response message to the central coordinator node, and wherein the operation mode switching response message notifies the central coordinator node that the target node is to be switched from the first operation mode to the second operation mode.

14. The computer program product of claim 11, wherein the first operation mode is a backup central coordinator node mode, and wherein the second operation mode is a member node mode.

15. The computer program product of claim 11, wherein the first operation mode is a backup central coordinator node mode or a member node mode, and wherein the second operation mode is a node that performs a function of an earlier version.

16. The computer program product of claim 11, wherein the first operation mode is a member node mode, and wherein the second operation mode is a backup central coordinator node mode.

17. The computer program product of claim 11, wherein the operation mode switching message comprises context parameters of the plurality of nodes.

18. The computer program product of claim 17, wherein the context parameters comprise configuration parameters of a node cluster in which the plurality of nodes is located, all nodes currently included in the node cluster, or information about a station that can be served by the node cluster.

19. The computer program product of claim 17, wherein the context parameters are valid when the second operation mode is a central coordinator node mode or a backup central coordinator node mode.

20. The computer program product of claim 17, wherein the operation mode switching message further comprises a next mode field indicating a subsequent operation mode of the central coordinator node after the target node is switched to the second operation mode.

* * * * *